(12) United States Patent
Watanabe et al.

(10) Patent No.: US 7,154,616 B2
(45) Date of Patent: Dec. 26, 2006

(54) APPLICATION CHARGING SYSTEM, INFORMATION PROCESSING APPARATUS, AND CONTROL METHOD THEREFOR AND MEMORY MEDIUM STORING PROGRAM THEREFOR

(75) Inventors: Yoshihiko Watanabe, Yokohama (JP); Jiro Kojima, Kawasaki (JP); Masayuki Yoshida, Yokohama (JP); Tsuneaki Kurumida, Kawasaki (JP); Tsutomu Negishi, Tokyo (JP); Yuichiro Yamasawa, Kawasaki (JP); Yoshio Kimura, Kawasaki (JP); Yoshiji Kanamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 835 days.

(21) Appl. No.: 09/840,157

(22) Filed: Apr. 24, 2001

(65) Prior Publication Data

US 2002/0051164 A1 May 2, 2002

(30) Foreign Application Priority Data

| Apr. 27, 2000 | (JP) | ............................. 2000-127885 |
| Oct. 3, 2000 | (JP) | ............................. 2000-304066 |
| Oct. 6, 2000 | (JP) | ............................. 2000-308110 |
| Oct. 11, 2000 | (JP) | ............................. 2000-311020 |
| Oct. 13, 2000 | (JP) | ............................. 2000-314318 |
| Oct. 18, 2000 | (JP) | ............................. 2000-318364 |
| Oct. 23, 2000 | (JP) | ............................. 2000-322992 |
| Oct. 27, 2000 | (JP) | ............................. 2000-328833 |

(51) Int. Cl.
  *G06Q 99/00* (2006.01)
(52) U.S. Cl. ...................... 358/1.13; 358/1.15; 705/52; 705/54; 705/59
(58) Field of Classification Search ................ 705/39, 705/26, 14, 52, 54, 59; 395/186, 701; 358/1.15, 358/1.13
See application file for complete search history.

(56) References Cited

U.S. PATENT DOCUMENTS

| 5,771,289 | A | * | 6/1998 | Kuzma ........................ 713/153 |
| 5,771,354 | A | * | 6/1998 | Crawford .................... 709/229 |
| 5,819,092 | A | * | 10/1998 | Ferguson et al. ........... 717/113 |
| 5,943,650 | A | | 8/1999 | Kanno ............................ 705/1 |
| 6,401,243 | B1 | * | 6/2002 | Suzuki ......................... 725/86 |
| 6,615,183 | B1 | * | 9/2003 | Kolls ............................ 705/26 |

* cited by examiner

Primary Examiner—King Y. Poon
(74) Attorney, Agent, or Firm—Fitzpatrick, Cella, Harper & Scinto

(57) ABSTRACT

In case a file is prepared by executing an application, the fee for the use of the application is charged according to whether such file is subjected to an output process. Thus the user of the application need not pay the fee for the use of the application for the mere preparation of the file by using the application.

6 Claims, 83 Drawing Sheets

| APPLICATION TYPE | TOTAL AMOUNT (YEN) | DISTRIBUTION COMPANY'S SHARE (YEN) | PROVIDER'S SHARE (YEN) |
|---|---|---|---|
| NORMAL PRINT | 28008 | 28008 | 0 |
| APPLICATION A | 5025 | 2680 | 2345 |
| APPLICATION B | 20340 | 5424 | 14916 |
| ⋮ | ⋮ | ⋮ | ⋮ |
| APPLICATION X | 1840 | 184 | 1656 |

FIG. 4

| APPLICATION TYPE | CHARGE AMOUNT PER ONE SHEET (YEN) |
|---|---|
| NORMAL PRINT | 8 |
| APPLICATION A | 15 |
| APPLICATION B | 30 |
| ⋮ | ⋮ |
| APPLICATION X | 80 |

FIG. 5

| APPLICATION TYPE | NUMBER OF PRINT |
|---|---|
| NORMAL PRINT | 3501 |
| APPLICATION A | 335 |
| APPLICATION B | 678 |
| ⋮ | ⋮ |
| APPLICATION X | 23 |

FIG. 7

| APPLICATION TYPE | TOTAL AMOUNT (YEN) | DISTRIBUTION COMPANY'S SHARE (YEN) | PROVIDER'S SHARE (YEN) |
|---|---|---|---|
| NORMAL PRINT | 28008 | 28008 | 0 |
| APPLICATION A | 5025 | 2680 | 2345 |
| APPLICATION B | 20340 | 5424 | 14916 |
| ...... | ...... | ...... | ...... |
| APPLICATION X | 1840 | 184 | 1656 |

FIG. 12

| COPY | FAX | SCANNER | FILE |

APPLICATION FEE LIST/SELECT

| APPLICATION TYPE | CHARGE AMOUNT FOR APPLICATION | | |
|---|---|---|---|
| | PRINT PROCESS (YEN/SHEET) | E-MAIL SEND (YEN/kbyte) | FAX SEND (YEN/SHEET) |
| APPLICATION C | 15 | 20 | 10 |
| APPLICATION D | 30 | 100 | 10 |
| APPLICATION E | 20 | 15 | 15 |
| APPLICATION F | 15 | 40 | 15 |
| APPLICATION G | 10 | 30 | 20 |

FIG. 24A

STANDARD CHARGE TABLE

| APPLICATION TYPE | CHARGE FOR PROCESS | | | |
|---|---|---|---|---|
| | PRINT PROCESS (YEN/SHEET) | E-MAIL SEND (YEN/kbyte) | FAX SEND (YEN/SHEET) | CONTENTS RETRIEVAL (TIMES) |
| APPLICATION A | 15 | 1 | 10 | 1000 |
| APPLICATION B | 30 | 100 | 10 | 2000 |
| ⋮ | ⋮ | ⋮ | ⋮ | ⋮ |
| APPLICATION X | 80 | 20 | 20 | 4000 |

FIG. 24B

DISCOUNT CHARGE TABLE

| APPLICATION TYPE | CHARGE FOR PROCESS | | | |
|---|---|---|---|---|
| | PRINT PROCESS (YEN/SHEET) | E-MAIL SEND (YEN/kbyte) | FAX SEND (YEN/SHEET) | CONTENTS RETRIEVAL (TIMES) |
| APPLICATION A | 15 | 0.8 | 10 | 800 |
| APPLICATION B | 30 | 80 | 10 | 1600 |
| ⋮ | ⋮ | ⋮ | ⋮ | ⋮ |
| APPLICATION X | 80 | 16 | 20 | 3200 |

FIG. 26

| APPLICATION TYPE | USER ID | PRINT PROCESS (SHEET) | E-MAIL SEND (kbyte) | FAX SEND (SHEET) | CONTENTS RETRIEVAL (TIMES) |
|---|---|---|---|---|---|
| APPLICATION A | 0001 | 102 | 42 | 13 | 2 |
| APPLICATION B | 0001 | 32 | 247 | 43 | 0 |
| .... | .... | .... | .... | .... | .... |
| APPLICATION X | 0001 | 8 | 335 | 0 | 3 |
| APPLICATION A | 0002 | 24 | 22 | 35 | 0 |
| APPLICATION B | 0002 | 24 | 478 | 35 | 4 |
| .... | .... | .... | .... | .... | .... |
| APPLICATION X | nnnn | 7 | 2 | 2 | 1 |

FIG. 27

| APPLICATION TYPE | USER ID | PRINT PROCESS (SHEET) | E-MAIL SEND (Kbyte) | FAX SEND (SHEET) | CONTENTS RETRIEVAL (TIMES) | TOTAL (YEN) |
|---|---|---|---|---|---|---|
| APPLICATION A | 0001 | 1530 | 42 | 130 | 2000 | 3702 |
| APPLICATION B | 0001 | 960 | 24700 | 430 | 0 | 26822 |
| .... | .... | .... | .... | .... | .... | .... |
| APPLICATION X | 0001 | 640 | 6700 | 0 | 12000 | 19340 |
| APPLICATION A | 0002 | 360 | 22 | 350 | 0 | 732 |
| APPLICATION B | 0002 | 720 | 47800 | 350 | 8000 | 56870 |
| .... | .... | .... | .... | .... | .... | .... |
| APPLICATION X | nnnn | 560 | 40 | 40 | 4000 | 4640 |

FIG. 34

APPLICATION SERVER CONNECTION SOFTWARE

A APPLICATION SERVER TO BE CONNECTED
  [Application Server 1 ▽]

B DOWNLOAD APPLICATION AND FEE LIST

| APPLICATION TYPE | CHARGE FOR PROCESS | | | |
|---|---|---|---|---|
| | PRINT PROCESS (YEN/SHEET) | E-MAIL SEND (YEN/kbyte) | FAX SEND (YEN/SHEET) | CONTENTS RETRIEVAL (YEN/TIMES) |
| APPLICATION A | 15 | 1 | 10 | 1000 |
| APPLICATION B | 30 | 100 | 10 | 2000 |
| ……… | ……… | ……… | ……… | ……… |
| APPLICATION X | 80 | 20 | 20 | 4000 |

| APPLICATION TYPE | FEE FOR ONE IMPRESSION (YEN) |
|---|---|
| NORMAL SCAN | 0 |
| OCR | 100 |
| COLOR IMAGE PROCESS | 30 |
| ⋮ | ⋮ |
| APPLICATION X | 500 |

FIG. 47

| APPLICATION TYPE | NUMBER OF SCAN IMPRESSION |
|---|---|
| NORMAL SCAN | 335 |
| OCR | 258 |
| COLOR IMAGE PROCESS | 441 |
| ⋮ | ⋮ |
| APPLICATION X | 50 |

FIG. 48

| APPLICATION TYPE | TOTAL AMOUNT (YEN) |
|---|---|
| NORMAL SCAN | 0 |
| OCR | 25800 |
| COLOR IMAGE PROCESS | 13230 |
| ⋮ | ⋮ |
| APPLICATION X | 25000 |

FIG. 52

| APPLICATION TYPE | OPERATING TIME ZONE | CHARGE AMOUNT PER ONE SHEET (YEN) |
|---|---|---|
| NORMAL PRINT | 8-17 O'CLOCK | 8 |
| | 17-22 O'CLOCK | 6 |
| | 22-8 O'CLOCK | 4 |
| APPLICATION A | 8-17 O'CLOCK | 15 |
| | 17-22 O'CLOCK | 12 |
| | 22-8 O'CLOCK | 8 |
| APPLICATION B | 8-17 O'CLOCK | 30 |
| | 17-22 O'CLOCK | 25 |
| | 22-8 O'CLOCK | 15 |
| ⋮ | | ⋮ |
| APPLICATION X | 8-17 O'CLOCK | 80 |
| | 17-22 O'CLOCK | 75 |
| | 22-8 O'CLOCK | 60 |

FIG. 56

| APPLICATION TYPE | OPERATING TIME ZONE | NUMBER OF PRINT |
|---|---|---|
| NORMAL PRINT | 8-17 O'CLOCK | 3501 |
| | 17-22 O'CLOCK | 205 |
| | 22-8 O'CLOCK | 115 |
| APPLICATION A | 8-17 O'CLOCK | 335 |
| | 17-22 O'CLOCK | 20 |
| | 22-8 O'CLOCK | 11 |
| APPLICATION B | 8-17 O'CLOCK | 678 |
| | 17-22 O'CLOCK | 50 |
| | 22-8 O'CLOCK | 32 |
| ⋮ | | ⋮ |
| APPLICATION X | 8-17 O'CLOCK | 23 |
| | 17-22 O'CLOCK | 40 |
| | 22-8 O'CLOCK | 11 |

FIG. 57

| APPLICATION TYPE | OPERATING TIME ZONE | TOTAL AMOUNT (YEN) | DISTRIBUTION COMPANY'S SHARE (YEN) | PROVIDER'S SHARE (YEN) |
|---|---|---|---|---|
| NORMAL PRINT | 8-17 O'CLOCK | 28008 | 28008 | 0 |
| | 17-22 O'CLOCK | 1230 | 1230 | 0 |
| | 22-8 O'CLOCK | 460 | 460 | 0 |
| APPLICATION A | 8-17 O'CLOCK | 5025 | 2680 | 2345 |
| | 17-22 O'CLOCK | 240 | 120 | 120 |
| | 22-8 O'CLOCK | 88 | 44 | 44 |
| APPLICATION B | 8-17 O'CLOCK | 20340 | 5424 | 14916 |
| | 17-22 O'CLOCK | 1250 | 300 | 950 |
| | 22-8 O'CLOCK | 480 | 128 | 352 |
| ...... | | | ...... | ...... |
| APPLICATION X | 8-17 O'CLOCK | 1840 | 184 | 1656 |
| | 17-22 O'CLOCK | 3000 | 240 | 2760 |
| | 22-8 O'CLOCK | 660 | 44 | 616 |

FIG. 58A
STANDARD CHARGE TABLE

| APPLICATION TYPE | OPERATING TIME ZONE | CHARGE FOR PROCESS | | | |
| --- | --- | --- | --- | --- | --- |
| | | PRINT PROCESS (YEN/SHEET) | E-MAIL SEND (YEN/kbyte) | FAX SEND (YEN/SHEET) | CONTENTS RETRIEVAL (TIMES) |
| APPLICATION A | 8–17 O'CLOCK | 15 | 1 | 10 | 1000 |
| | 17–22 O'CLOCK | 12 | 0.9 | 10 | 950 |
| | 22–8 O'CLOCK | 8 | 0.8 | 10 | 900 |
| APPLICATION B | 8–17 O'CLOCK | 30 | 100 | 10 | 2000 |
| | 17–22 O'CLOCK | 25 | 90 | 10 | 1900 |
| | 22–8 O'CLOCK | 15 | 80 | 10 | 1800 |
| ..... | | | | ..... | |
| APPLICATION X | 8–17 O'CLOCK | 80 | 20 | 20 | 4000 |
| | 17–22 O'CLOCK | 75 | 18 | 20 | 3800 |
| | 22–8 O'CLOCK | 60 | 16 | 20 | 3600 |

FIG. 58B

DISCOUNT CHARGE TABLE

| APPLICATION TYPE | OPERATING TIME ZONE | CHARGE FOR PROCESS | | | |
|---|---|---|---|---|---|
| | | PRINT PROCESS (YEN/SHEET) | E-MAIL SEND (YEN/kbyte) | FAX SEND (YEN/SHEET) | CONTENTS RETRIEVAL (TIMES) |
| APPLICATION A | 8-17 O'CLOCK | 15 | 0.8 | 10 | 800 |
| | 17-22 O'CLOCK | 12 | 0.7 | 10 | 750 |
| | 22-8 O'CLOCK | 8 | 0.6 | 10 | 700 |
| APPLICATION B | 8-17 O'CLOCK | 30 | 80 | 10 | 1600 |
| | 17-22 O'CLOCK | 25 | 72 | 10 | 1500 |
| | 22-8 O'CLOCK | 15 | 65 | 10 | 1400 |
| ..... | | ..... | ..... | ..... | ..... |
| APPLICATION X | 8-17 O'CLOCK | 80 | 16 | 20 | 3200 |
| | 17-22 O'CLOCK | 75 | 14 | 20 | 3000 |
| | 22-8 O'CLOCK | 60 | 12 | 20 | 2800 |

FIG. 59

| APPLICATION TYPE | USER ID | OPERATING TIME ZONE | PRINT PROCESS (SHEET) | E-MAIL SEND (kbyte) | FAX SEND (SHEET) | CONTENTS RETRIEVAL (TIMES) |
|---|---|---|---|---|---|---|
| APPLICATION A | 0001 | 8-17 O'CLOCK<br>17-22 O'CLOCK<br>22-8 O'CLOCK | 102<br>0<br>0 | 42<br>0<br>0 | 13<br>0<br>0 | 2<br>0<br>0 |
| APPLICATION B | 0001 | 8-17 O'CLOCK<br>17-22 O'CLOCK<br>22-8 O'CLOCK | 32<br>0<br>0 | 247<br>0<br>0 | 43<br>0<br>0 | 0<br>0<br>0 |
| .... | .... | | .... | .... | .... | .... |
| APPLICATION X | 0001 | 8-17 O'CLOCK<br>17-22 O'CLOCK<br>22-8 O'CLOCK | 8<br>0<br>0 | 335<br>0<br>0 | 0<br>0<br>0 | 3<br>0<br>0 |
| APPLICATION A | 0002 | 8-17 O'CLOCK<br>17-22 O'CLOCK<br>22-8 O'CLOCK | 24<br>0<br>0 | 22<br>0<br>0 | 35<br>0<br>0 | 0<br>0<br>0 |
| APPLICATION B | 0002 | 8-17 O'CLOCK<br>17-22 O'CLOCK<br>22-8 O'CLOCK | 24<br>0<br>0 | 478<br>0<br>0 | 35<br>0<br>0 | 4<br>0<br>0 |
| .... | .... | | .... | .... | .... | .... |
| APPLICATION X | nnnn | 8-17 O'CLOCK<br>17-22 O'CLOCK<br>22-8 O'CLOCK | 7<br>0<br>0 | 2<br>0<br>0 | 2<br>0<br>0 | 1<br>0<br>0 |

FIG. 60

| APPLICATION TYPE | OPERATING TIME ZONE | FEE FOR ONE IMPRESSION (YEN) |
|---|---|---|
| NORMAL SCAN | 8-17 O'CLOCK | 0 |
|  | 17-22 O'CLOCK | 0 |
|  | 22-8 O'CLOCK | 0 |
| OCR | 8-17 O'CLOCK | 100 |
|  | 17-22 O'CLOCK | 80 |
|  | 22-8 O'CLOCK | 60 |
| COLOR IMAGE PROCESS | 8-17 O'CLOCK | 30 |
|  | 17-22 O'CLOCK | 20 |
|  | 22-8 O'CLOCK | 10 |
| ⋮ | ⋮ | ⋮ |
| APPLICATION X | 8-17 O'CLOCK | 500 |
|  | 17-22 O'CLOCK | 450 |
|  | 22-8 O'CLOCK | 400 |

FIG. 61

| APPLICATION TYPE | OPERATING TIME ZONE | NUMBER OF SCAN IMPRESSION |
|---|---|---|
| NORMAL SCAN | 8-17 O'CLOCK | 335 |
|  | 17-22 O'CLOCK | 0 |
|  | 22-8 O'CLOCK | 0 |
| OCR | 8-17 O'CLOCK | 258 |
|  | 17-22 O'CLOCK | 30 |
|  | 22-8 O'CLOCK | 0 |
| COLOR IMAGE PROCESS | 8-17 O'CLOCK | 441 |
|  | 17-22 O'CLOCK | 4 |
|  | 22-8 O'CLOCK | 4 |
| ⋮ | ⋮ | ⋮ |
| APPLICATION X | 8-17 O'CLOCK | 50 |
|  | 17-22 O'CLOCK | 0 |
|  | 22-8 O'CLOCK | 10 |

FIG. 62

| APPLICATION TYPE | OPERATING TIME ZONE | TOTAL AMOUNT (YEN) |
|---|---|---|
| NORMAL SCAN | 8-17 O'CLOCK | 0 |
| | 17-22 O'CLOCK | 0 |
| | 22-8 O'CLOCK | 0 |
| OCR | 8-17 O'CLOCK | 25800 |
| | 17-22 O'CLOCK | 2400 |
| | 22-8 O'CLOCK | 0 |
| COLOR IMAGE PROCESS | 8-17 O'CLOCK | 13230 |
| | 17-22 O'CLOCK | 80 |
| | 22-8 O'CLOCK | 40 |
| ⋮ | | ⋮ |
| APPLICATION X | 8-17 O'CLOCK | 25000 |
| | 17-22 O'CLOCK | 0 |
| | 22-8 O'CLOCK | 4000 |

FIG. 66A

| TIME | 0 | 8 | 17 | 21 | 24 |
|---|---|---|---|---|---|
| DISCOUNT RATIO | C | A | | B | C |

A: NO DISCOUNT
B: 20% OFF
C: 40% OFF

FIG. 66B

| | MON | TUE | WED | THU | FRI | SAT | SUN |
|---|---|---|---|---|---|---|---|
| DISCOUNT RATIO | a | | | | b | c | | a: NO DISCOUNT
b: 10% OFF
c: 30% OFF

FIG. 67

| FEE SELECTION SCREEN | | |
|---|---|---|
| PRESENT TIME AND DATE: 2000/06/27 TUE  14:30 | FEE: AAAA YEN | |
| | FEE | DISCOUNT RATIO |
| ○ OUTPUT NOW | AAAA YEN | NONE |
| ○ OUTPUT BY TODAY'S 21 O'CLOCK | BBBB YEN | 20% |
| ● OUTPUT BY TOMORROW'S MORNING | CCCC YEN | 40% |
| ○ OUTPUT BY NEXT MONDAY | DDDD YEN | 58% |
| ○ DESIGNATED TIME  BY □O'CLOCK OF □DAY (□DAY OF THE WEEK) | EEEE YEN | XX% |

FIG. 68

| COMPANY | BASIC APPLICATION TYPE | CHARGE AMOUNT PER ONE SHEET OF BASIC APPLICATION (YEN) | CHARGE AMOUNT PER ONE SHEET OF SUB APPLICATION CORRESPONDING TO EACH BASIC APPLICATION (YEN) | | | | | | |
|---|---|---|---|---|---|---|---|---|---|
| | | | NORMAL PRINT | APPLICATION A | APPLICATION B | APPLICATION C | APPLICATION D | APPLICATION E | APPLICATION N |
| COMPANY | NORMAL PRINT | 8 | — | 15 | 30 | 25 | 36 | 18 | 80 |
| X COMPANY | APPLICATION A | 15 | 8 | — | 28 | 20 | 36 | 18 | 80 |
| | APPLICATION B | 30 | 8 | 14 | — | 22 | 36 | 18 | 80 |
| | APPLICATION C | 25 | 8 | 14 | 20 | — | 36 | 18 | 80 |
| Y COMPANY | APPLICATION D | 36 | 8 | 15 | 30 | 25 | | ⋮ | 80 |
| | APPLICATION E | 18 | 8 | 15 | 30 | 25 | 34 | | 80 |
| | | | | | | | | | |
| Z COMPANY | APPLICATION N | 80 | 8 | 15 | 30 | 25 | 36 | 18 | ⋮ |

FIG. 69

| APPLICATION TYPE | NUMBER OF BASIC APPLICATION PRINT | NUMBER OF SUB APPLICATION PRINT AT EACH BASIC APPLICATION PRINT | | | | | | |
|---|---|---|---|---|---|---|---|---|
| | | NORMAL PRINT | APPLICATION A | APPLICATION B | APPLICATION C | APPLICATION D | APPLICATION E | APPLICATION N |
| NORMAL PRINT | 3180 | ... | 2 | 0 | 15 | 0 | 0 | 0 |
| APPLICATION A | 1442 | 0 | ... | 31 | 102 | 45 | 2 | 31 |
| APPLICATION B | 180 | 0 | 3 | ... | 5 | 42 | 0 | 0 |
| APPLICATION C | 2228 | 0 | 25 | 102 | ... | 0 | 51 | 23 |
| APPLICATION D | 1080 | 0 | 0 | 33 | 2 | ... | 3 | 21 |
| APPLICATION E | 557 | 0 | 21 | 43 | 56 | 2 | ... | 31 |
| ... | — | — | — | — | — | — | — | ... |
| APPLICATION N | 712 | 0 | 35 | 0 | 41 | 78 | 32 | ... |

FIG. 71

| APPLICATION TYPE | BASIC APPLICATION CHARGE AMOUNT | CHARGE AMOUNT (YEN) SUB APPLICATION CHARGE AMOUNT AT EACH BASIC APPLICATION PRINT ||||||
|---|---|---|---|---|---|---|---|
| | | NORMAL PRINT | APPLICATION A | APPLICATION B | APPLICATION C | APPLICATION D | APPLICATION E | APPLICATION N |
| NORMAL PRINT | 25440 | ⋮ | 30 | 0 | 975 | 0 | 0 | 0 |
| APPLICATION A | 21630 | 0 | ⋮ | 620 | 2040 | 1620 | 36 | 2480 |
| APPLICATION B | 5400 | 0 | 42 | 2040 | 110 | 1512 | 0 | 0 |
| APPLICATION C | 55700 | 0 | 350 | 990 | 50 | 0 | 918 | 1840 |
| APPLICATION D | 38880 | 0 | 315 | 1290 | 1400 | 68 | 48 | 1680 |
| APPLICATION E | 10026 | — | — | — | — | — | ⋮ | 2480 |
| — | — | — | — | — | — | — | — | — |
| APPLICATION N | 56960 | 0 | 525 | 0 | 1025 | 2808 | 576 | ⋮ |

FIG. 72

| APPLICATION TYPE | NUMBER OF PRINT (SHEETS) |
|---|---|
| NORMAL PRINT | 3180 |
| APPLICATION A | 1528 |
| APPLICATION B | 389 |
| APPLICATION C | 2449 |
| APPLICATION D | 1247 |
| APPLICATION E | 645 |
| ⋮ | ⋮ |
| APPLICATION N | 818 |

FIG. 73

| APPLICATION TYPE | CHARGE AMOUNT (YEN) |
|---|---|
| NORMAL PRINT | 25440 |
| APPLICATION A | 22892 |
| APPLICATION B | 10340 |
| APPLICATION C | 60700 |
| APPLICATION D | 44888 |
| APPLICATION E | 11604 |
| ⋮ | ⋮ |
| APPLICATION N | 65440 |

FIG. 74

| APPLICATION TYPE | TOTAL CHARGE AMOUNT (YEN) | DISTRIBUTION COMPANY'S SHARE (YEN) | PROVIDER'S SHARE (YEN) |
|---|---|---|---|
| NORMAL PRINT | 25440 | 25440 | 25440 |
| APPLICATION A | 22892 | 12224 | 10668 |
| APPLICATION B | 10340 | 3112 | 7228 |
| APPLICATION C | 60700 | 19592 | 41108 |
| APPLICATION D | 44888 | 9976 | 34912 |
| APPLICATION E | 11604 | 5160 | 6444 |
| ...... | ...... | ...... | ...... |
| APPLICATION N | 65440 | 6544 | 58896 |

FIG. 80

| APPLICATION PROVIDER CONNECTION | | | | |
|---|---|---|---|---|
| A APPLICATION PROVIDER TO BE CONNECTED | | | | |
| Application Provider 1 ▽ | | | | |
| B DOWNLOAD APPLICATION AND FEE LIST | | | | |
| APPLICATION TYPE | CHARGE FOR PROCESS | | | |
| | PRINT PROCESS (YEN/SHEET) | E-MAIL SEND (YEN/kbyte) | FAX SEND (YEN/SHEET) | CONTENTS RETRIEVAL (YEN/TIMES) |
| APPLICATION A | 15 | 1 | 10 | 1000 |
| APPLICATION B | 30 | 100 | 10 | 2000 |
| APPLICATION X | 80 | 20 | 20 | 4000 |

| APPLICATION TYPE | PRINT METHOD | CHARGE AMOUNT PER ONE SHEET (YEN) |
|---|---|---|
| NORMAL PRINT | — | 8 |
| APPLICATION A | PRINT METHOD A | 30 |
| | PRINT METHOD B | 15 |
| | ⋮ | ⋮ |
| | PRINT METHOD X | 10 |
| APPLICATION B | PRINT METHOD A | 60 |
| | PRINT METHOD B | 30 |
| | ⋮ | ⋮ |
| | PRINT METHOD X | 15 |
| ⋮ | ⋮ | ⋮ |
| APPLICATION X | PRINT METHOD A | 160 |
| | PRINT METHOD B | 80 |
| | ⋮ | ⋮ |
| | PRINT METHOD X | 60 |

FIG. 82

| APPLICATION TYPE | PRINT METHOD | NUMBER OF PRINT (SHEETS) |
|---|---|---|
| NORMAL PRINT | − | 3501 |
| APPLICATION A | PRINT METHOD A | 20 |
| | PRINT METHOD B | 335 |
| | ⋮ | ⋮ |
| | PRINT METHOD X | 522 |
| APPLICATION B | PRINT METHOD A | 30 |
| | PRINT METHOD B | 678 |
| | ⋮ | ⋮ |
| | PRINT METHOD X | 836 |
| ⋮ | ⋮ | ⋮ |
| APPLICATION X | PRINT METHOD A | 7 |
| | PRINT METHOD B | 23 |
| | ⋮ | ⋮ |
| | PRINT METHOD X | 31 |

FIG. 84

| COPY | FAX | SCANNER | FILE |

APPLICATION FEE LIST/SELECT

| APPLICATION TYPE | CHARGE AMOUNT FOR APPLICATION | | |
|---|---|---|---|
| | NORMAL PRINT (YEN/SHEET) | PRIORITY PRINT (YEN/SHEET) | LATER PRINT (YEN/SHEET) |
| APPLICATION C | 15 | 20 | 10 |
| APPLICATION D | 30 | 100 | 10 |
| APPLICATION E | 20 | 15 | 15 |
| APPLICATION F | 15 | 40 | 15 |
| APPLICATION G | 10 | 30 | 20 |

| APPLICATION TYPE | TOTAL NUMBER OF PRINT | CHARGE AMOUNT PER ONE SHEET (YEN) |
|---|---|---|
| NORMAL PRINT | – | 8 |
| APPLICATION A | 1-1000 | 30 |
| | 1001-2000 | 15 |
| | ⋮ | ⋮ |
| | xxxx- | 8 |
| APPLICATION B | 1-2000 | 60 |
| | 2001-4000 | 30 |
| | ⋮ | ⋮ |
| | yyyy- | 8 |
| ⋮ | ⋮ | ⋮ |
| APPLICATION X | 1-500 | 160 |
| | 501-1000 | 80 |
| | ⋮ | ⋮ |
| | zzzz- | 8 |

FIG. 88

| APPLICATION TYPE | TOTAL NUMBER OF PRINT | NUMBER OF PRINT (SHEETS) |
|---|---|---|
| NORMAL PRINT | — | 3501 |
| APPLICATION A | 1-1000 | 21 |
| | 1001-2000 | 435 |
| | ⋮ | ⋮ |
| | xxxx- | 0 |
| APPLICATION B | 1-2000 | 0 |
| | 2001-4000 | 513 |
| | ⋮ | ⋮ |
| | yyyy- | 0 |
| ⋮ | ⋮ | ⋮ |
| APPLICATION X | 1-500 | 0 |
| | 501-1000 | 0 |
| | ⋮ | ⋮ |
| | zzzz- | 253 |

FIG. 90

| APPLICATION TYPE | TOTAL NUMBER OF PRINT | APPLICATION FEE FOR ONE SHEET (YEN) |
|---|---|---|
| NORMAL PRINT | — | 0 |
| APPLICATION A | 1-1000 | 22 |
| | 1001-2000 | 7 |
| | ⋮ | ⋮ |
| | xxxx- | 0 |
| APPLICATION B | 1-2000 | 52 |
| | 2001-4000 | 22 |
| | ⋮ | ⋮ |
| | yyyy- | 0 |
| ⋮ | ⋮ | ⋮ |
| APPLICATION X | 1-500 | 152 |
| | 501-1000 | 72 |
| | ⋮ | ⋮ |
| | zzzz- | 0 |

APPLICATION CHARGING SYSTEM, INFORMATION PROCESSING APPARATUS, AND CONTROL METHOD THEREFOR AND MEMORY MEDIUM STORING PROGRAM THEREFOR

BACKGROUND OF THE INVENTION

1. Field of the Invention

The present invention relates to an application charging system adapted for use in a system for providing the user with an application and charging a fee for the use of the application to the user, an information processing apparatus therefor, a control method therefor and a memory medium storing a program therefor.

2. Related Background Art

There have conventionally been developed various technologies for enabling, in the system of the above-described type, the application service provider (hereinafter represented as ASP), who provides the application, to charge the fee for using the application to the user.

For example the U.S. Pat. No. 5,943,650 discloses a system capable of assigning a weight to each of the functions contained in the application, calculating a fee for using the application based on a count of the weights of the used functions, and charging such fee to the user. Thus the fee for using the application is calculated in the unit of each function in the application and increases as such functions are used more.

There is also known a system capable of calculating a fee only for a function actually used by the user among plural functions contained in the application and charging such fee to the user.

There is further known a system in which a user terminal informs an ASP terminal of the time of use at the execution of the application and the ASP terminal calculates a fee for using the application based on the time of use informed from the user terminal and charges such fee to the user.

There is further known a system in which the user acquires a ticket bearing a time permitting the use to use the application, and which thereby enables the use of the application for the time recorded on the ticket. Thus, such system calculates the fee for using the application according to the time of use of the application and charges such fee to the user.

There is further known a system capable of calculating a fee for the use of the application according to the number of uses thereof and charging such fee to the user.

Thus, in the conventional technologies described in the foregoing, the fee for using the application, to be charged to the user, is calculated (1) in the unit of the function used in the application, (2) according to the time of use of the application, or (3) according to the number of uses of the application.

In the case (1), for example if plural functions of the application are used for preparing a single file, the fee becomes higher because the fee has to be paid for such plural functions. Also the fee becomes higher than in a case of preparing two files utilizing a single function.

In the case (2), the user cannot be satisfied with the charged fee because the user cannot judge whether the time actually required by the user in the preparation of a file is correctly measured as the time of use. Also in case the user is not accustomed to the use of the application, there may be encountered a situation where the time of use becomes exceptionally long or the desired file cannot be prepared even after a long time of use, so that the user is dissatisfied with the charging system.

In the case (3), the fee becomes exceptionally high in case the desired file cannot be prepared after a single use of the application but can only be prepared after the use of the application plural times.

SUMMARY OF THE INVENTION

The present invention is to realize charging for the use of an application with a fee satisfactory to the user, and is featured by calculating a fee for the use of the application based on the output result (result product) of a file prepared utilizing the application and charging such fee to the user.

Other objects and features of the present invention will become fully apparent from the following detailed description to be taken in conjunction with the accompanying drawings.

BRIEF DESCRIPTION OF THE DRAWINGS

FIG. 4 is a view showing a charge table to be used in the application charging system of the present invention;

FIG. 5 is a view showing an application use log to be used in the application charging system of the present invention;

FIG. 7 is a table representing the application use fee calculated from the charge table shown in FIG. 4 and the application use log shown in FIG. 5;

FIGS. 12, 13, 14, 15, 16 and 17 are schematic views showing a touch panel image displayed on an operation panel of the MFP to be used in the application charging system of the present invention;

FIGS. 24A and 24B are views showing a charge table to be used in the application charging system of the present invention;

FIG. 26 is a schematic view of the application use log to be used in the application charging system of the present invention;

FIG. 27 is a view showing a table indicating the result of calculation of the fee for using the application, derived in the application charging system of the present invention;

FIGS. 33, 34, 35, 36, 37, 38 and 39 are schematic views showing a UI image displayed on a user terminal to be used in the application charging system of the present invention;

FIG. 46 is a view showing a charge table to be used in the application charging system of the present invention;

FIG. 47 is a view showing an application use log to be used in the application charging system of the present invention;

FIG. 48 is a view showing a charge breakdown table to be used in the application charging system of the present invention;

FIG. 52 is a view showing a charge table to be used in the application charging system of the present invention;

FIGS. 53, 54, 55 and 56 are schematic views showing a touch panel image displayed on an operation panel of an MFP to be used in the application charging system of the present invention;

FIG. 57 is a view showing a charge breakdown table to be used in the application charging system of the present invention;

FIGS. 58A and 58B are views showing a charge table to be used in the application charging system of the present invention;

FIG. 59 is a view showing an application use log to be used in the application charging system of the present invention;

FIG. 60 is a view showing a charge table to be used in the application charging system of the present invention;

FIG. 61 is a view showing an application use log to be used in the application charging system of the present invention;

FIG. 62 is a table showing the application use fees calculated by the application charging system of the present invention;

FIGS. 66A and 66B are views showing discount rates of the application use fee by date and time in the application charging system of the present invention;

FIG. 67 is a view showing a fee selecting image displayed to the user in the application charging system of the present invention;

FIG. 68 is a view showing a charge table to be used in the application charging system of the present invention;

FIG. 69 is a view showing an application use log in the application charging system of the present invention;

FIG. 71 is a view showing a charge table to be used in the application charging system of the present invention;

FIGS. 72 and 73 are views showing a table to be used in the application charging system of the present invention;

FIG. 74 is a view showing a fee breakdown table to be used in the application charging system of the present invention;

FIGS. 79 and 80 are views showing a UI image displayed on a user terminal to be used in the application charging system of the present invention;

FIG. 81 is a view showing a charge table to be used in the application charging system of the present invention;

FIG. 82 is a view showing an application use log to be used in the application charging system of the present invention;

FIGS. 84, 85 and 86 are schematic views showing a touch panel image displayed on an operation panel of an MFP to be used in the application charging system of the present invention;

FIG. 87 is a view showing a charge table to be used in the application charging system of the present invention;

FIG. 88 is a view showing an application use log to be used in the application charging system of the present invention;

FIG. 90 is a view showing a charge table to be used in the application charging system of the present invention.

DESCRIPTION OF THE PREFERRED EMBODIMENTS

Now the present invention will be clarified in detail by preferred embodiments thereof, with reference to the accompanying drawings. However, the dimension, material, shape etc. of the components and the relative position thereof, described in such embodiments are not to limit the range of the present invention, unless stated otherwise.

In the accompanying drawings, components similar to those appearing in the preceding drawings are represented by same numbers. In the following there will be explained embodiments of the application charging system of the present invention.

[First Embodiment] [Application Server and Add-up Serving Being Realized by a Same Device]

At first there will be explained a first embodiment of the application charging system of the present invention, with reference to the accompanying drawings.

A first configuration of the system of the present embodiment will be explained with reference to FIG. 1.

There are shown a charge management server 1 of a distribution company for managing the charge information relating to the use fee of the application, an application service provider (ASP) 2 providing the applicationl, and a multi function peripheral (MFP) 3 having functions of plural output devices such as a copying apparatus, a facsimile apparatus and a printer, for outputting a file prepared with the application. The MFP 3 also manages the application provided by the ASP 2. There is also shown a network 4 connecting the charge management server 1, the ASP 2 and the MFP 3. In FIG. 1, the network 4 is composed of the internet, but it may also be composed of a network utilizing a protocol other than TCP/IP. Also the network may be a wireless one or a wired one.

Figure 1:
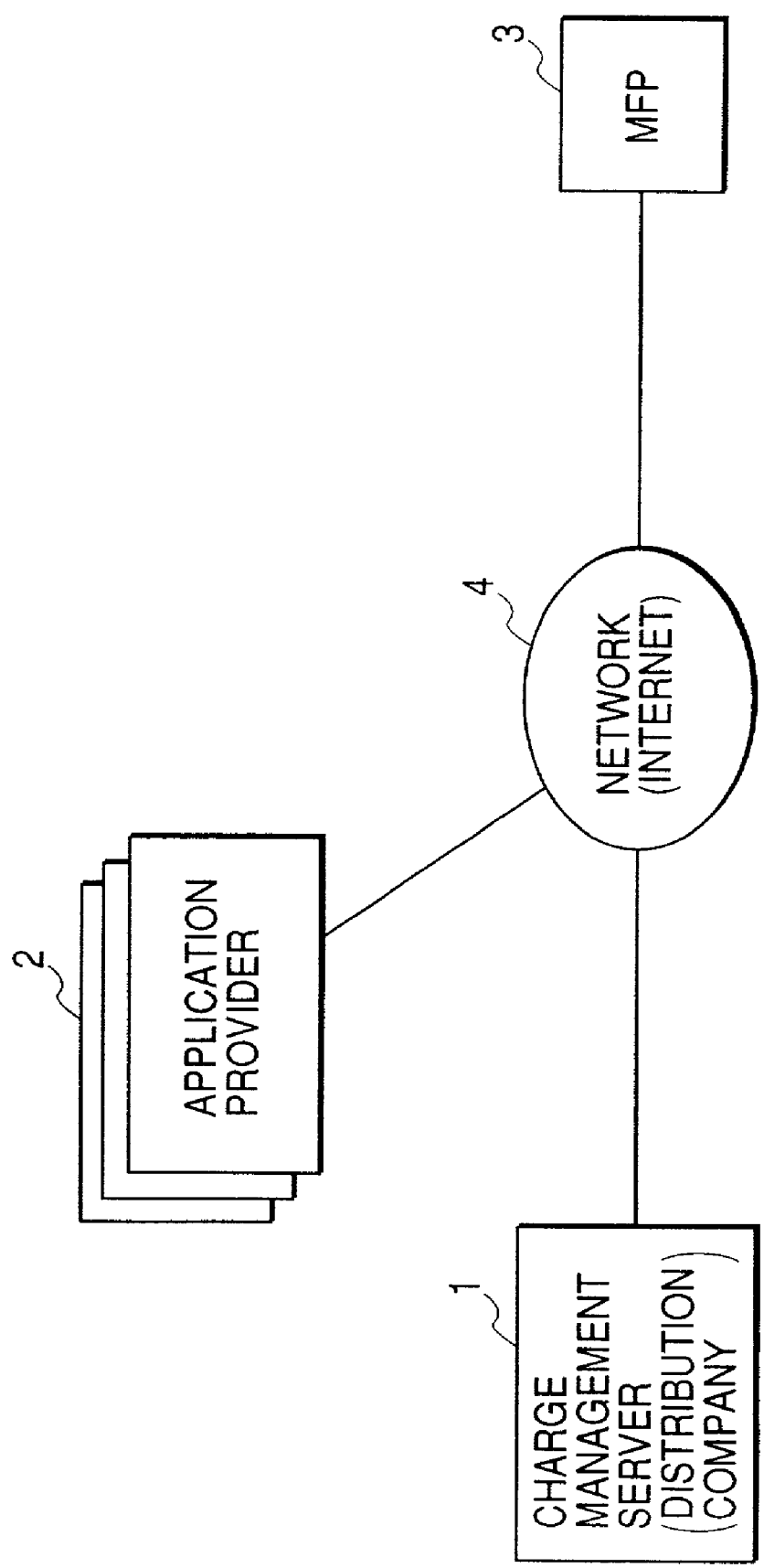
FIGS. 1 and 2 are views showing the configuration of an application charging system of the present invention.

In the configuration shown in FIG. 1, the MFP 3 is connected with the network 4 but is used in a standalone environment not locally connected with a personal computer or a server utilizing the MFP 3.

In the following there will be explained a second configuration of the system of the present embodiment, with reference to FIG. 2.

Figure 2:
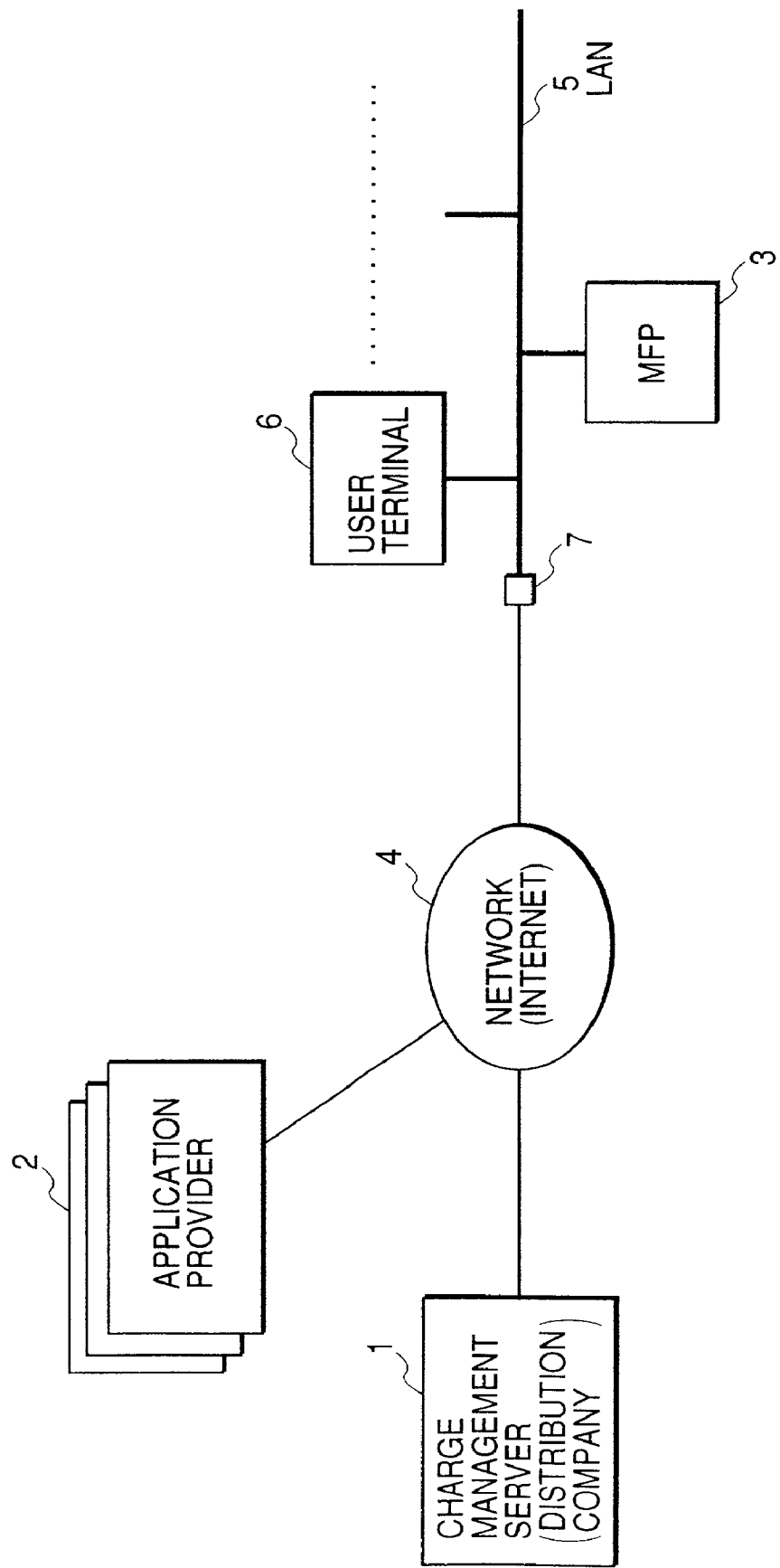

Referring to FIG. 2, there are shown a local area network (LAN) 5, a user terminal 6 for preparing a file utilizing the application provided from the ASP 2, and a router 7.

In the configuration shown in FIG. 2, the MFP 3 is connected together with the user terminal 6 to the LAN 5, which is connected by the router 7 to the network 4. Thus, in the second configuration, different from the stand-alone environment in first configuration, the MFP 3 is locally connected to the user terminal 6 and is used within the LAN 5 or the intranet.

The system of the present embodiment may assume the configuration shown in FIG. 1 or that shown in FIG. 2.

Also the MFP need not be connected to the network 4. However, in case not connected with the network 4, the MFP 3 has to inform the distribution company of the charge information for example through a telephone line through a modem or the like.

Figure 3:
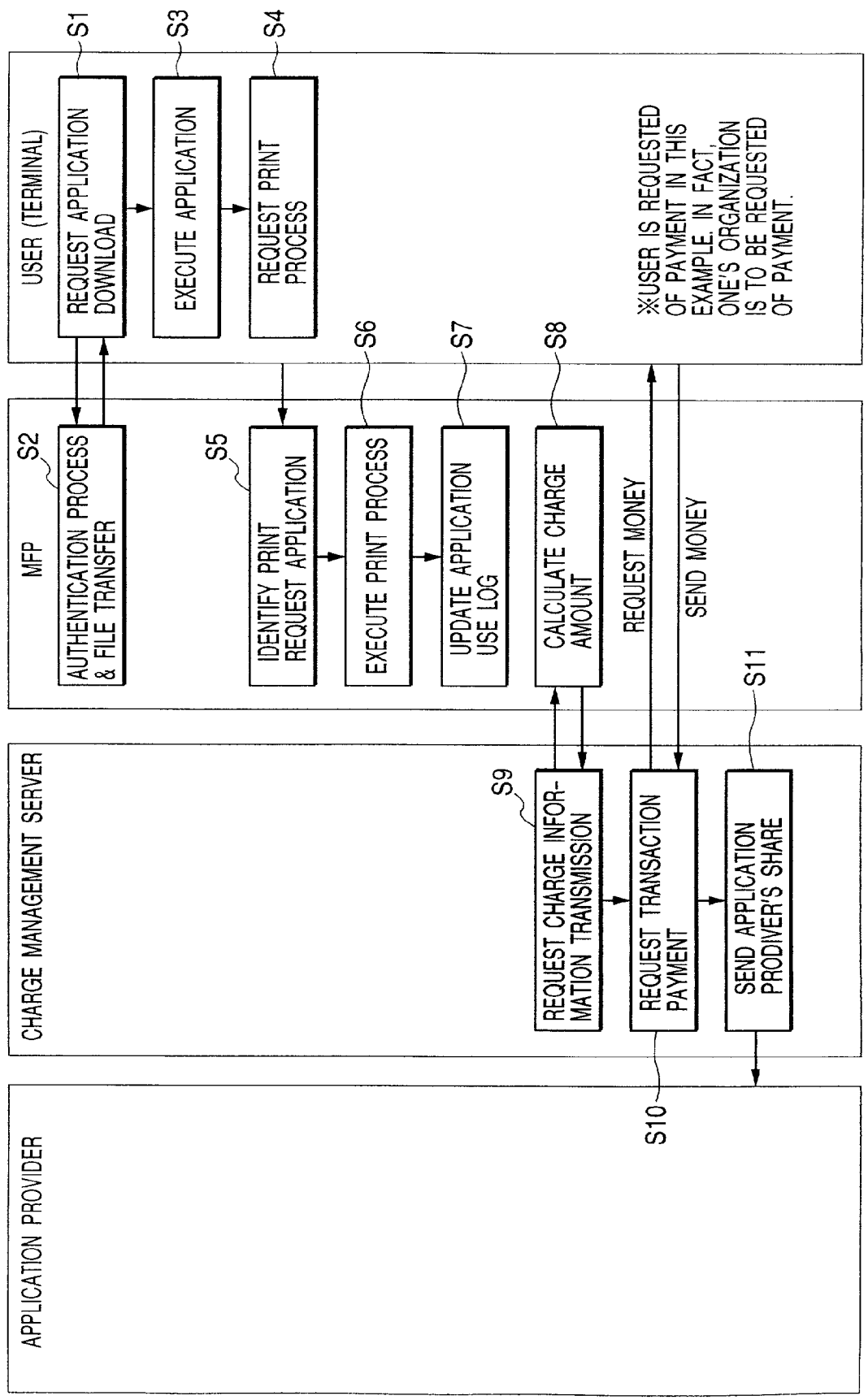
FIG. 3 is a view showing the operation sequence of the application charging system of the present invention.

In the following there will be explained, with reference to a sequence chart shown in FIG. 3, the function of the system of the present embodiment. FIG. 3 shows a case, in the second configuration shown in FIG. 2, of executing the application on the user terminal 6 to prepare a file and obtaining, as a product, a print of the file.

At first the user terminal 6 requests the downloading of the application to the MFP 3 (S1). In this operation, the user terminal 6 informs the MFP 3 of a user ID for identifying the user utilizing the application.

In response to the request from the user terminal 6 in the step S1, the MFP 3 executes an authentication process based on the user ID and an application transfer process to the user terminal 6 (S2).

Upon receiving the application transferred from the MFP 3 in the step S2 and completing the downloading of the application, the user terminal 6 executes the application thereby preparing a file (S3). In this operation, after the downloading of the application by the user terminal 6, the application may be executed after the MFP 3 issues an execution instructing command to such application.

Then the user terminal 6 requests (S4), to the MFP 3, a printing process for a file prepared by executing the application in the step S3. At this point, the user terminal 6 informs the MFP 3 of the user ID.

Upon receiving the request for the printing process from the user terminal 6 in the step S4, the MFP 3 identifies the type of the application used for preparing the file and the user ID of the user who requests the printing process (S5). Then it executes the printing process of the file (S6) and renews the application use log to be explained later (S7).

At a predetermined time, the charge management server 1 transmits a request for the transmission of charge information, to the MFP 3 (S9).

Upon receiving the request for transmitting the charge information from the charge management server 1 in the step S9, the MFP 3 calculates the application use fee for each user ID, based on the application use log renewed in the step S7, and transmits the information on thus calculated application use fee, as the charge information, to the charge management server 1 (S8).

Based on the charge information transmitted from the MFP 3 in the step S8 and on the user ID, the charge management server 1 transmits, to the user terminal 6, a request for payment of the application use fee (S10). In the step S8, the application use fee may be calculated not for each user (user ID) but for an organization to which plural users belong, and the request for payment in the step S9 may be made to such organization.

When the application use fee is sent from the user terminal 6, the charge management server 1 sends, to the application provider 2, a sum after the deduction of a printing process fee for the file from the sent application use fee (S11).

FIG. 4 shows a charge table showing, for each application, the fee required for the output process of the file prepared utilizing the application. FIG. 4 only shows the fees for the printing process as the output process, but the table also contains the fees for other output processes such as e-mail transmission or facsimile transmission. The MFP 3 calculates the application use fee in the step S8 shown in FIG. 3, based on such charge table. The fee for each application includes also the fee of the output process for the file.

According to FIG. 4, the fee for "normal print" is 8 Yen per sheet, while the fee of the printing process for the file prepared utilizing the "application A" is 15 Yen per sheet. Therefore, the fee for using the application A is "7 Yen" per sheet in case of printing the file prepared utilizing the application A.

FIG. 5 shows an application use log held by the MFP 3. Upon executing the printing process of the file in the step S6 shown in FIG. 3, the MFP 3 renews the application use log in the step S7. The application use log records the user ID of the user requesting the printing process of the file, the type of the application used for preparing the file, the number of printed sheets etc., and stores the information of a predetermined period (for example 1 month). The information having completed the charging process in the steps S9, S10 and S11 in FIG. 3 is erased from the application use log.

An example shown in FIG. 5 indicates that the "normal print" has 3501 print sheets and the file prepared utilizing the "application A" has 335 print sheets.

Figure 6:
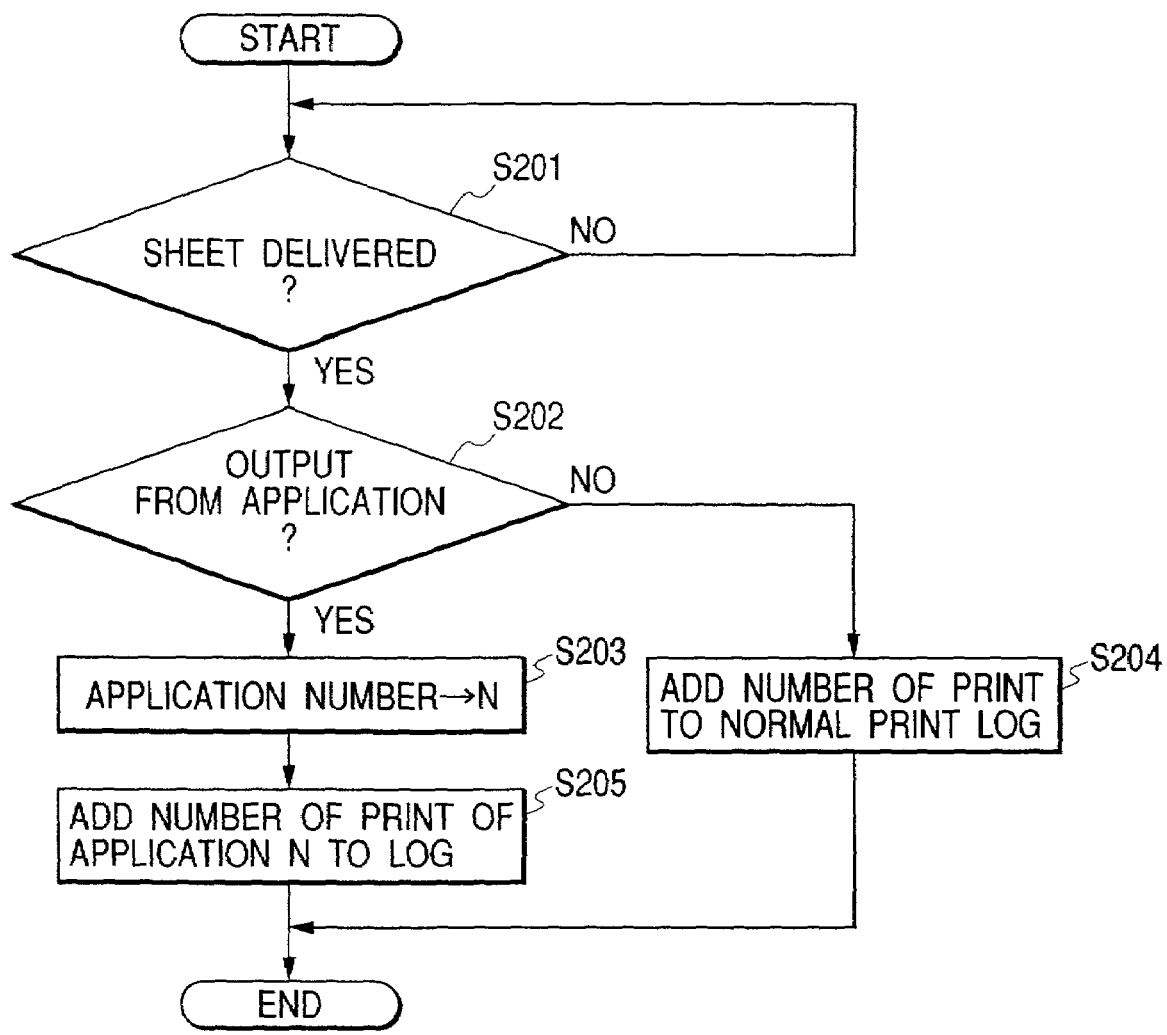
FIG. 6 is a flow chart showing a renewing operation for the application use log to be used in the the application charging system of the present invention.

Now reference is made to a flow chart shown in FIG. 6, for explaining an operation of the MFP 3 for renewing the application use log shown in FIG. 5 in the step S7 in FIG. 3.

At first, in a step S201, the MFP 3 discriminates whether a recording sheet bearing an image has been discharged. If not discharged (No), it enters a state for awaiting the sheet discharge, but, if discharged (Yes), the sequence proceeds to a step S202.

In a step S202, the MFP 3 discriminates whether the discharged sheet is an output from the application.

If the step S202 identifies that the sheet discharge is not an output from the application (No), the MFP 3 in a step S204 renews the "print number" of the "normal print" in the application use log (FIG. 5), whereupon the sequence is terminated.

On the other hand, if the step S202 identifies that the sheet discharge is an output from the application (Yes), the MFP 3 in a step S203 acquires, from the application, an application number N for identifying the type of the application. Then, in a step S205, the MFP 3 renews, in the application use log (FIG. 5), the "print number" of an "application type" corresponding to the application number N acquired in the step 203, whereupon the sequence is terminated.

FIG. 7 is a table showing the application use fee calculated by the MFP 3 in the step S8 in FIG. 3, based on the charge table (FIG. 4) and the application use log (FIG. 5). The application use fee is calculated, based on the "application type", by multiplying the charge amount per sheet in the charge table (FIG. 4) with the number of prints in the application use log (FIG. 5) for each field. Referring to FIG. 7, the "distribution company's share" is a charge for the normal printing process to be paid to the distribution company in charge of the sales, management and maintenance of the MFP 3, while the "provider's share" is a charge to be paid to the ASP 2 after the deduction of the distribution company's share from the application use fee.

In FIG. 7, the "normal print", not utilizing the application, does not include the application use fee to be paid to the ASP 2. Therefore, the total sum 28008 Yen is divided into the distribution company's share of 28008 Yen and the provider's share of 0 Yen. For the "application A", the total sum 5025 Yen is divided into the distribution company's share of 2680 Yen and the provider's share of 2345 Yen.

Figure 8:
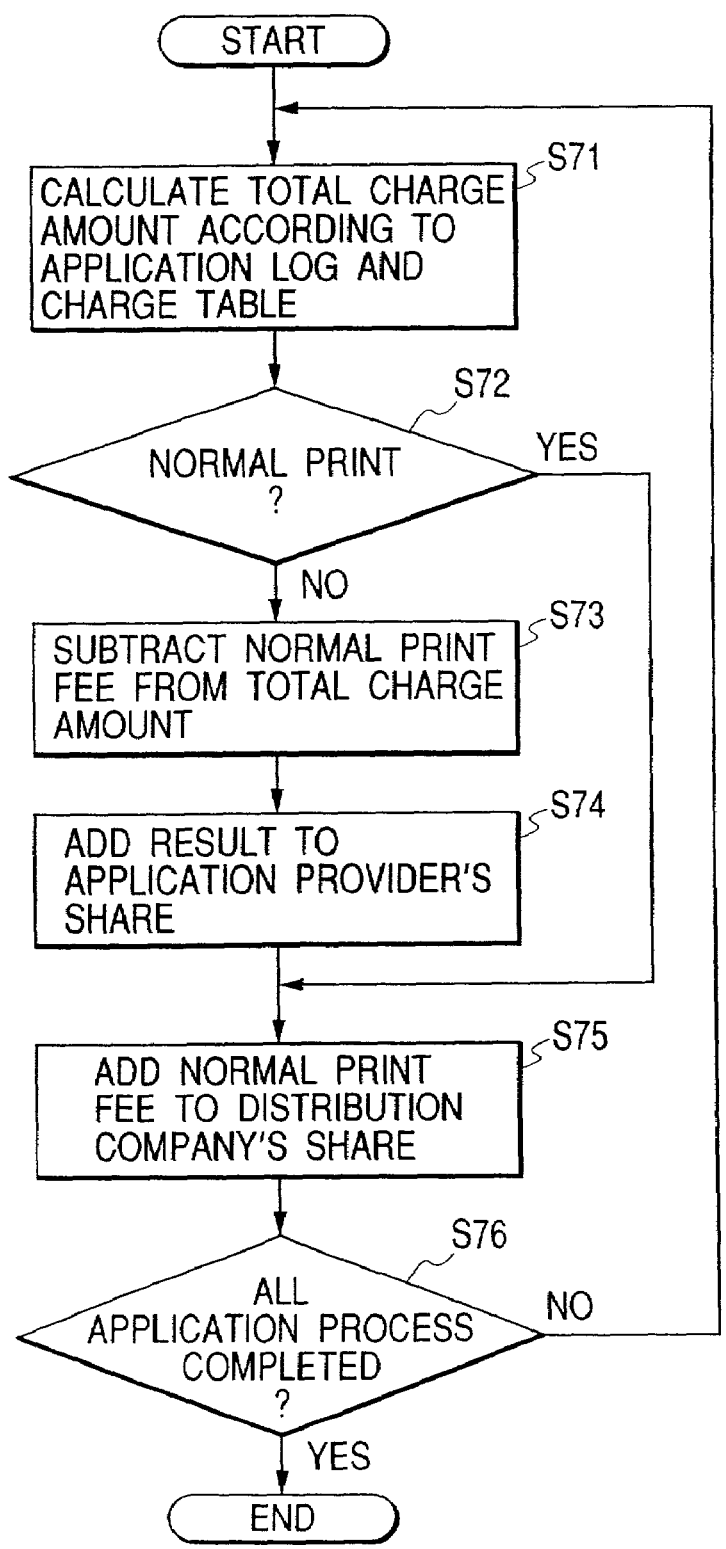
FIG. 8 is a flow chart showing the calculating method for the table shown in FIG. 7.

In the following there will be explained, with reference to a flow chart shown in FIG. 8, an operation of the MFP 8 for calculating the table (FIG. 7) of the application use fee.

At first, in a step S71, the MFP 3 calculates the application use fee, based on the "application type", by multiplying the charge per sheet in the charge table (FIG. 4) with the number of prints in the application use log (FIG. 5) for each field.

In a step S72, the MFP 3 discriminates whether the print process is for a file prepared not using the application (normal print).

If the step S72 identifies a normal print (Yes), the sequence proceeds to a step S75.

If the step S72 identifies that the print process is not a normal print (No), the MFP 3 in a step S73 subtracts the normal print fee from the application use fee calculated in the step S71.

Then, the MFP 3 in a step S74 adds the result of subtraction in the step S73 to the application provider's share, and, in a step S75, adds the normal print fee to the distribution company's share.

Then a step S76 discriminates whether the calculation of the application use fee has been completed for all the applications. If not completed (No), the sequence proceeds to the step S71, but, if completed (Yes), the sequence is terminated.

Figure 9:
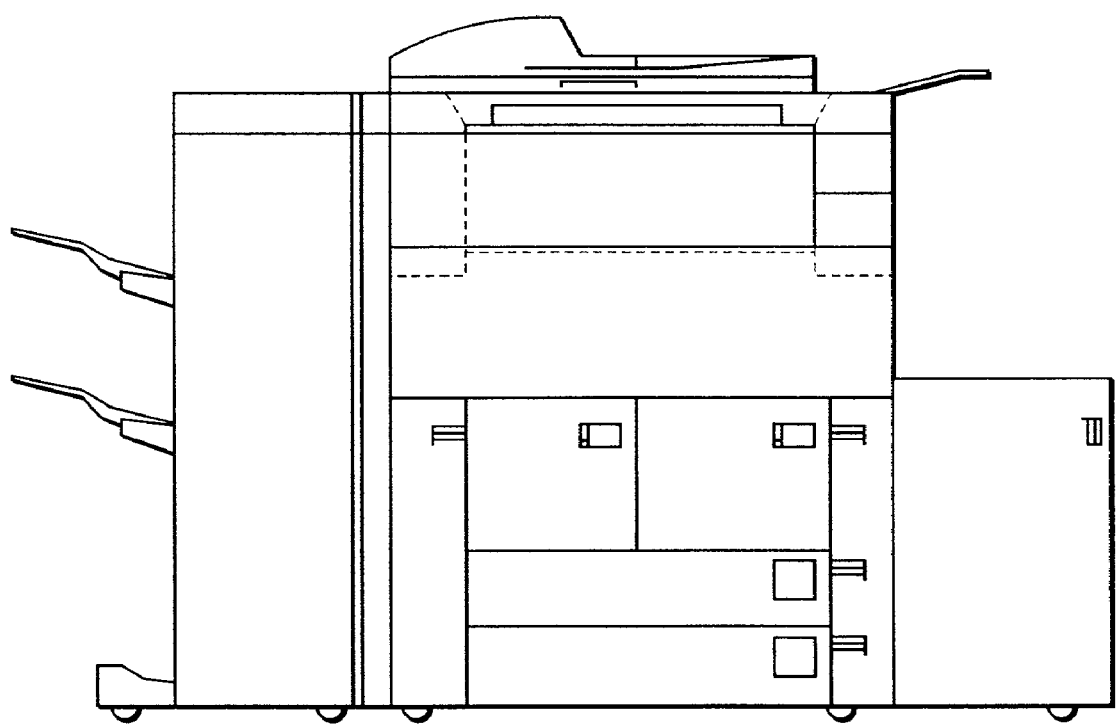
FIG. 9 is a schematic view of an MFP in the application charging system of the present invention.

FIG. 9 is a schematic view showing the MFP 3. In the present embodiment, the MFP 3 functions as an application server for managing the application provided from the ASP 2, and also as an add-up server for holding the charge table (FIG. 4) and the application use log (FIG. 5) and calculating the application use fee based thereon.

The MFP 3 is a composite apparatus having the plural output functions such as a printer, a facsimile apparatus, a copying apparatus etc., and is provided therein with hardware configuration including a central processing unit (CPU) and a hard disk required for the functions of the application server and the add-up server.

Figure 10:
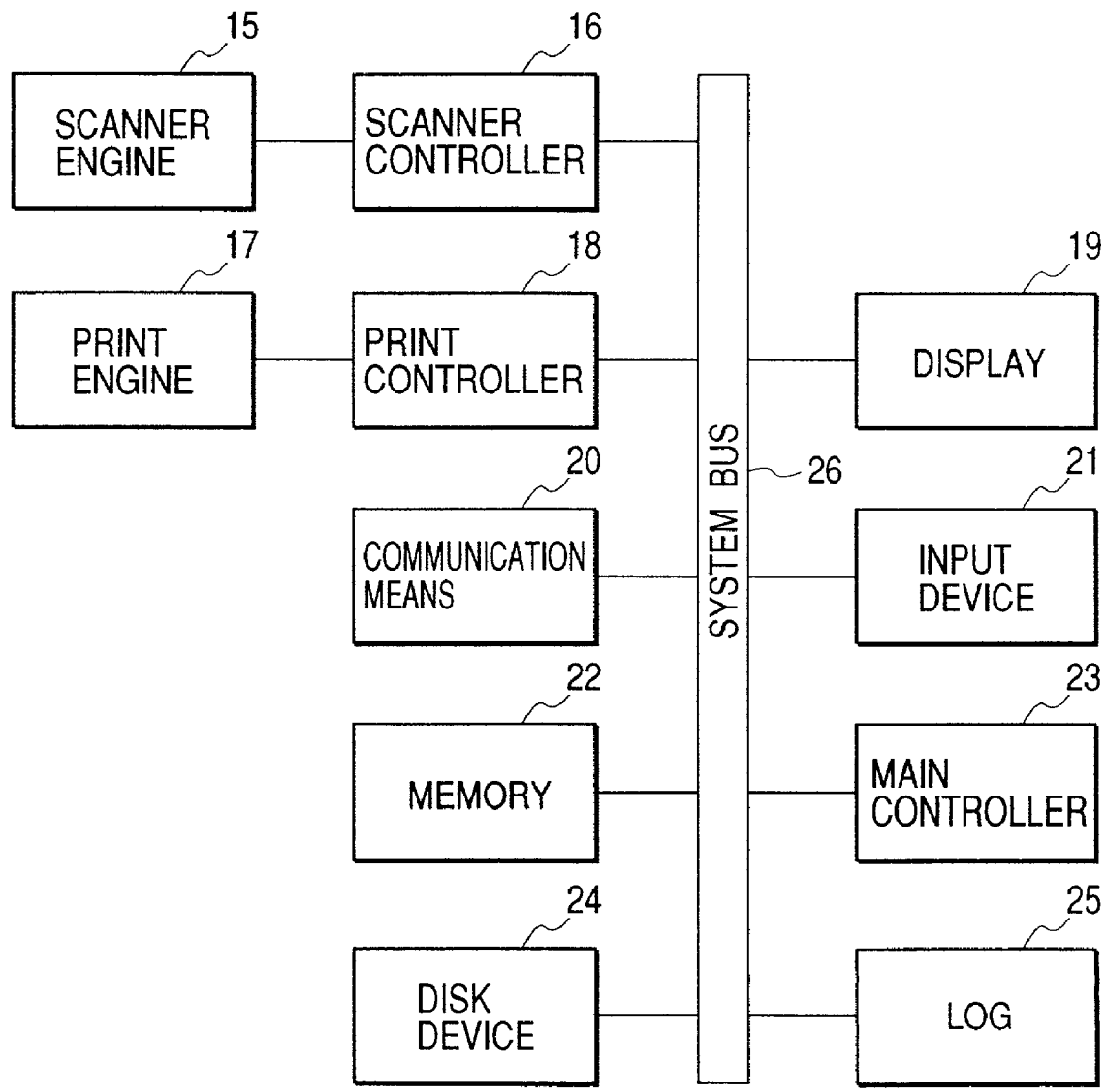
FIG. 10 is a hardware block diagram of the MFP to be used in the application charging system of the present invention.

FIG. 10 is a hardware block diagram showing the internal configuration of the MFP 3.

A scanner engine 15 drives a scanner in cooperation with a scanner controller 16, and a print engine 17 drives a printer in cooperation with a print controller 18.

A display 19 displays instructions and warnings to the user, an operation panel for operating the MFP 3, and the operation status thereof.

Communication means 20 is provided for data exchange between the MFP 3 and other devices, and executes communication by a predetermined protocol such as ICP/IP.

An input device 21, for entering data, can be composed for example of a touch panel, a pointing device, a mouse, a reset button, a start key and numeral keys.

A memory 22 is provided for storing image data, content of the input, a processing program of the MFP 3 etc.

A main controller 23, for controlling the entire MFP 3, is provided with a CPU and controls the functions of the various components.

A disk device 24 functions as a memory medium, storing for example various applications provided from the ASP 2.

A log 25 stores the status of use of the application within a predetermined period as the application use log (FIG. 5), and is used for determining the charge amount to the user.

A system bus 26 connects the various functions of the system.

Figure 11:
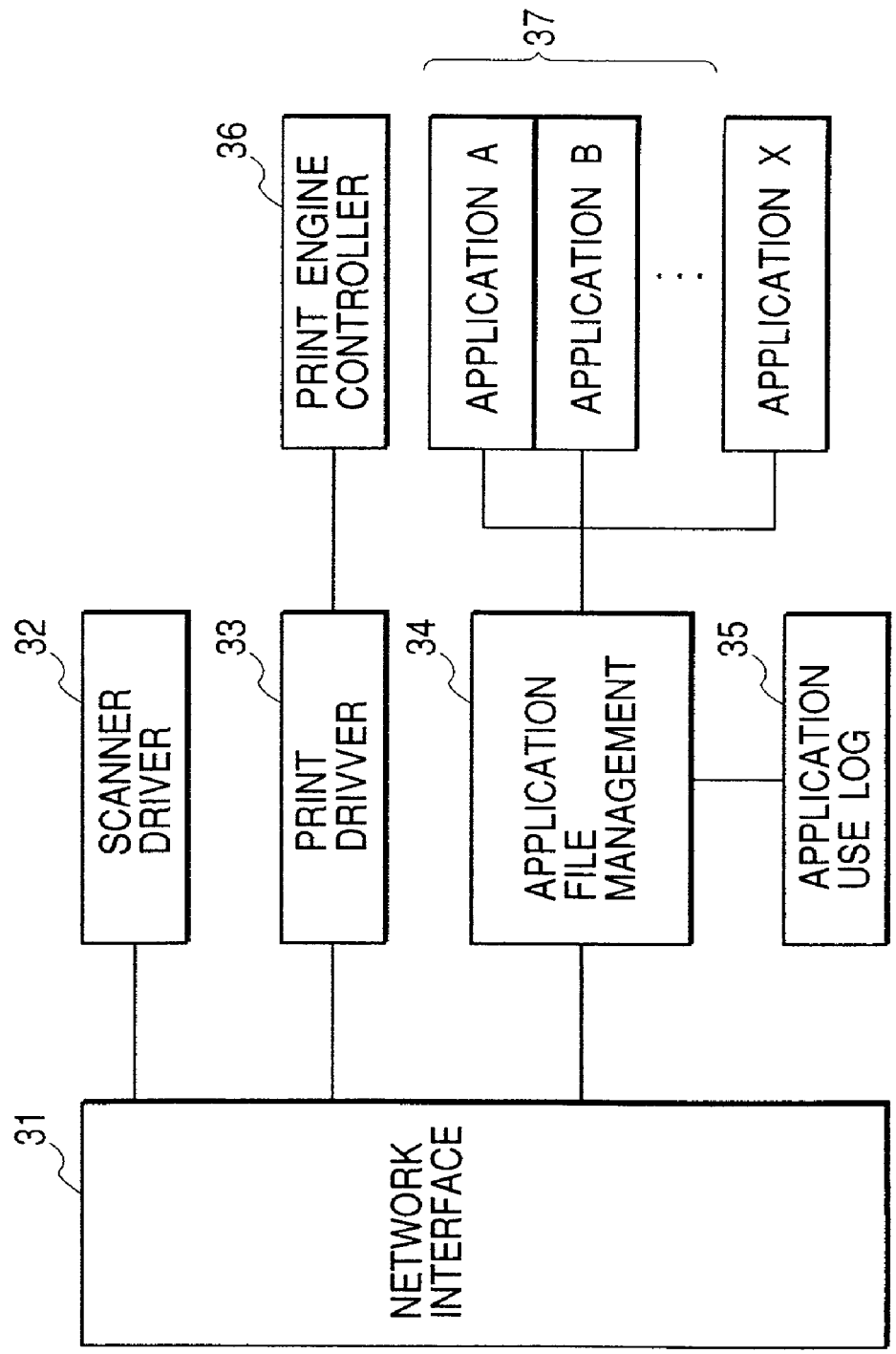
FIG. 11 is a software block diagram of the MFP to be used in the application charging system of the present invention.

FIG. 11 is a software block diagram showing the internal configuration of the MFP 3. The software of the MFP 3 incorporates, for example, the function of an ordinary composite apparatus, that of the application server, and that of the add-up server for managing the application use log. These functions are incorporated in a state capable of communication with the exterior through the network.

The software configuration of the MFP 3 in the system of the present embodiment is composed, as shown in FIG. 11, by connecting a scanner driver 32, a printer driver 33 and an application file management 34 to a network interface 31.

The scanner driver 32 is an application for driving the scanner, and the printer driver 33 is an application for driving the printer in cooperation with a print engine controller 36.

The application file management 34 executes control of various applications 37 provided from the ASP 2, and management of an application use log 35. The application use log 35 is a file recording the use status of the application, and the renewal of and reference to such log are managed by the application file management 34, which manages the renewal of and reference to plural applications.

In the following there will be explained the operation of the MFP 3 of the system of the present embodiment, with reference to FIGS. 12 to 17 schematically showing a touch panel image displayed on the operation panel of the MFP 3.

As shown in FIG. 12, tabs 41 representing output process functions of the MFP 3 are displayed in an upper part of the touch panel image, and the user can select the output process function by touching a tab 41 of a desired output process function with a finger. As an example, FIG. 12 shows the touch panel image in a state where a "file" function is selected.

Also FIG. 12 shows, to the user, a list of the fee for each type of the application managed by the application file management 34 of the MFP 3 and each output product of a file prepared using the application, where by the user can select an application to be used from the list of the fees of the applications.

The list of the fees shown in FIG. 12 also shows the fees in case the product file prepared using various applications is printed as a print, e-mail transmitted as an attachment to an e-mail and facsimile transmitted as image data by the facsimile function. The fee list shown in FIG. 12 is based on the charge table shown in FIG. 4.

On the touch panel image, the user selects an application to be used by touching a virtually displayed button with a finger.

In the following there will be explained a case where the user selects an application C on the image shown in FIG. 12, wherein the application C executes an OCR function.

Figure 13:
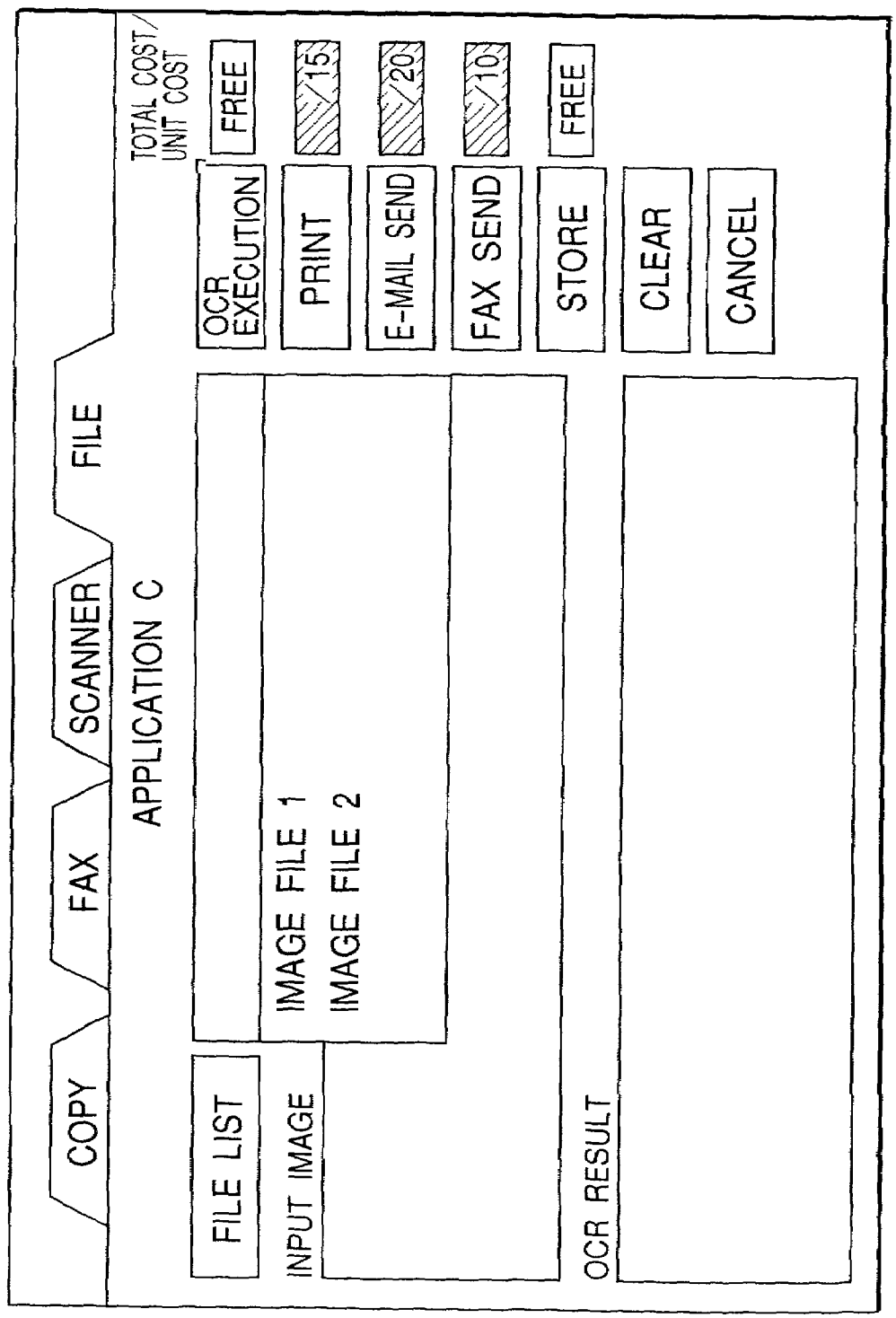

In response to the selection of the application C on FIG. 12, the application C is activated whereby the touch panel image is shifted to a state shown in FIG. 13. The touch panel image is shifted to a configuration corresponding to the selected application, and FIG. 13 shows an image configuration optimum for executing the OCR function of the application C selected by the user.

Then the user designates an image file to be subjected to the OCR process. More specifically, the user selects and designates an image file in a pull-down file list displayed by touching a file listg button. In response to the selection of an image file in FIG. 13, the name of the designated file is displayed in a file name field and the content of such file is displayed in an input image display field, as shown in FIG. 14.

Figure 14:
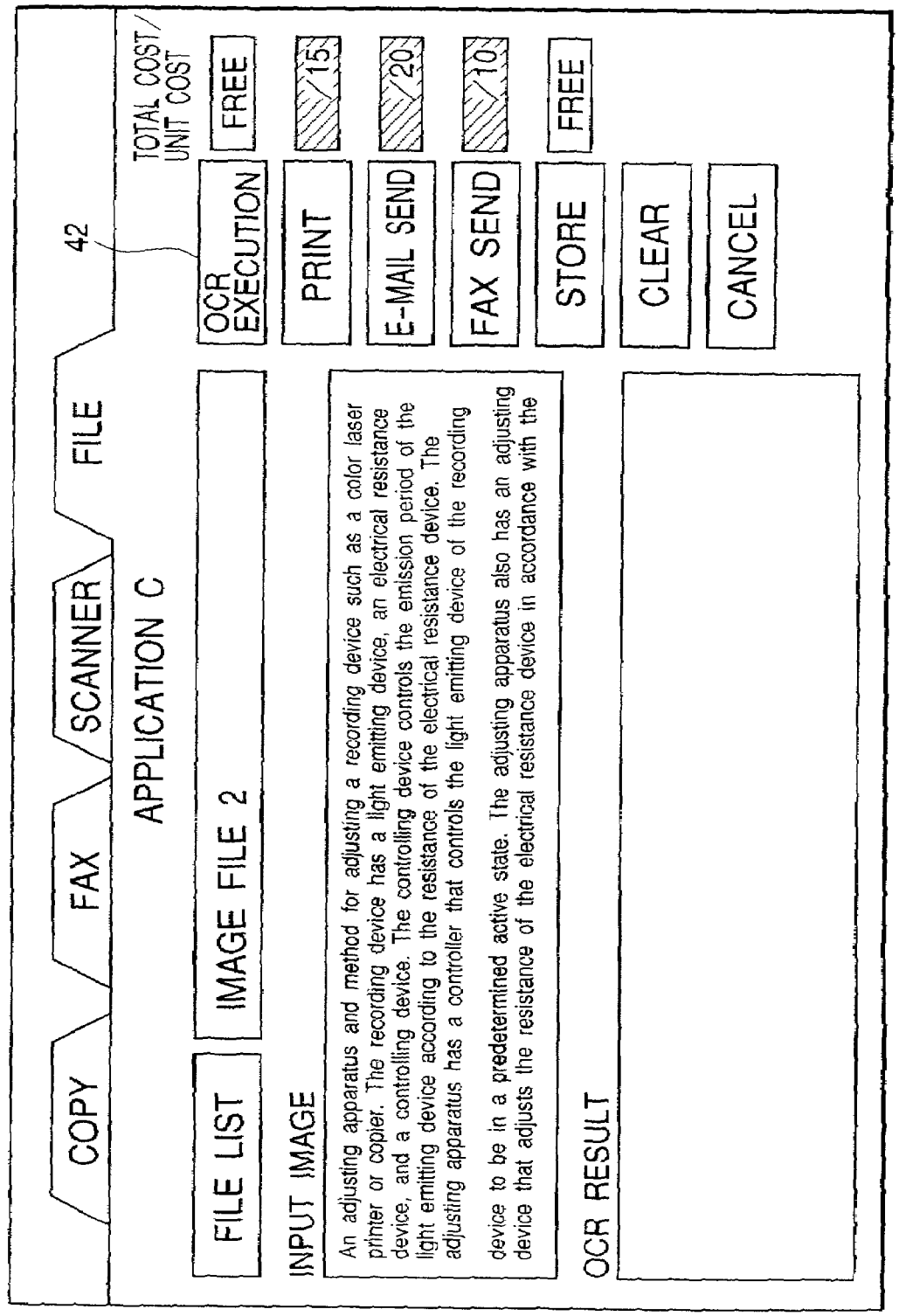
Figure 15:
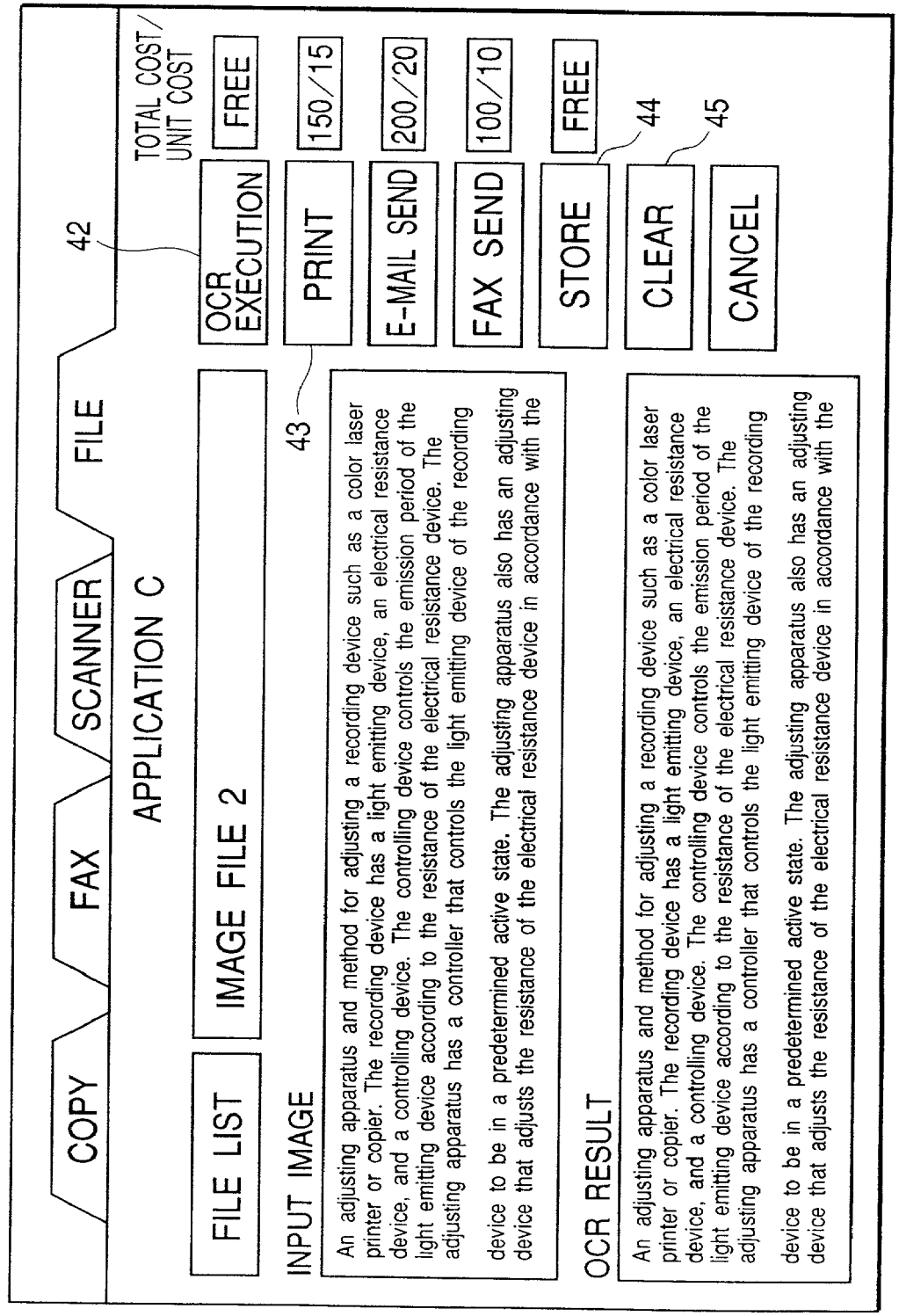

When the user touches an "OCR execution" button 42 in the touch panel image shown in FIG. 14, the OCR process is executed on the designated image file and the result of such execution is displayed in an OCR result field, as shown in FIG. 15.

In the present embodiment, the execution of the OCR process alone on the designated image file does not require an application use fee, so that no fee is charged to the user. Therefore the user can freely repeat the designation of the image file or the OCR process on the image file until a satisfactory OCR result can be obtained, without paying attention to the application use fee.

In the following there will be explained a case where the user is satisfied with the result of the OCR process of the image file, displayed on the OCR result field shown in FIG. 15 and executes an output process on the file obtained as the OCR result. In particular there will be explained a case where the user wishes a "print" process as the output process for the file.

Figure 16:
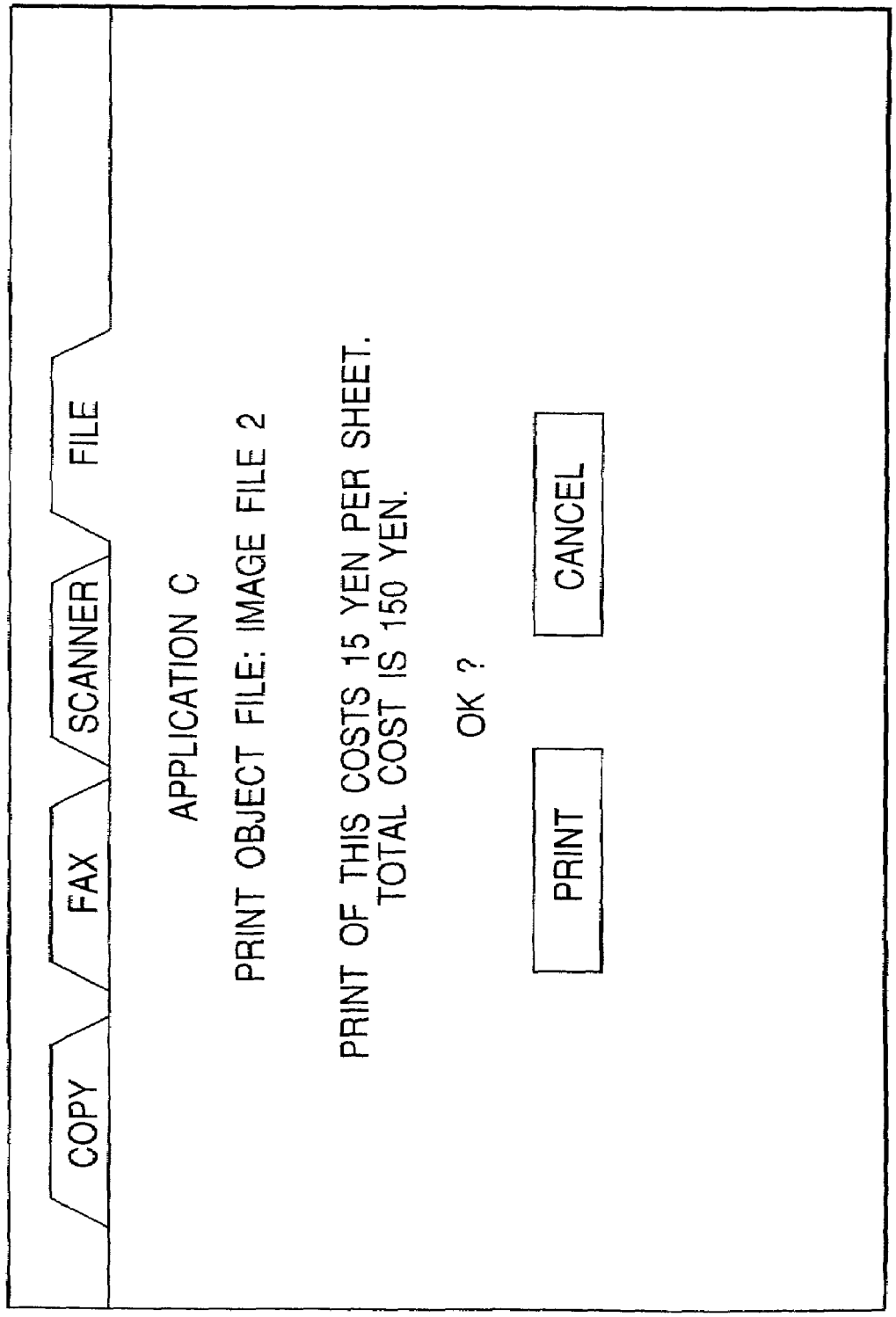

When the user touches a "print" button 43 in FIG. 15, the touch panel image is shifted to a state shown in FIG. 16.

FIG. 16 shows an image for designating printing for the file obtained as the result of the OCR process. In FIG. 16 there are displayed "application C" as the name of the used application and "image file 2" as the name of the image file subjected to such application. There are also displayed a unit fee and a total fee in case the file obtained as the result of the OCR process is printed. If satisfied with these displays, the user touches a "print" button. If the printing is canceled, the user touches a "cancel" button whereupon the print process is interrupted and the display returns to the state shown in FIG. 15. On the other hand, if the user touches a "store" button 44 in FIG. 15, the touch panel image is shifted to a state shown in FIG. 17.

Figure 17:
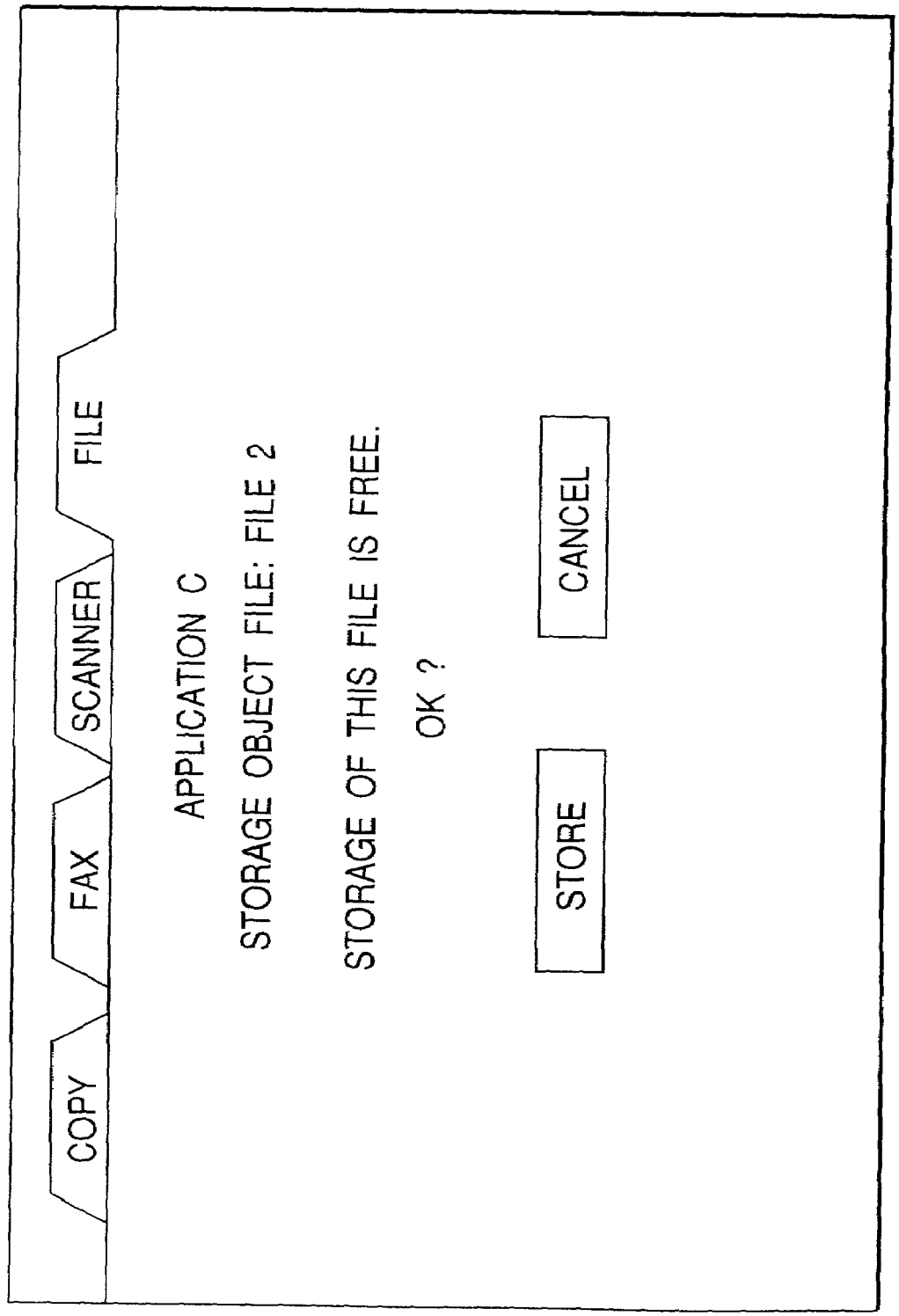

FIG. 17 shows an image for storing the file obtained as the result of the OCR process in memory means such as the memory 22 or the disk device 24 in the MFP 3. In FIG. 17, there are displayed the name of the used application and the name of the image file processed by the application.

In the present embodiment, the file storage alone does not require an application use fee, and there is displayed a message indicating that the file storage is charge free. For storing the file, the user touches a "store" button. It is also possible, when the "store" button is touched, to display an array of various character keys such as a keyboard thereby enabling the user to enter a file name and to store the file with an altered name. In case the file storage is to be canceled, the user touches a "cancel" button whereupon the touch panel image returns to a state shown in FIG. 15.

On the other hand, if the user touches a "clear" button 45 in the touch panel image shown in FIG. 15, the displays in the file name field, input image field and OCR result field are erased whereby the touch panel image returns to the state shown in FIG. 13. Also if the user touches a "cancel" button in the touch panel image shown in FIG. 15, the touch panel image returns to the state shown in FIG. 12.

In the touch panel images shown in FIGS. 13 to 15, to the right of the "OCR execution" button 42, "print" button 43 or "store" button 44, the application use fee for such process are displayed in the unit fee and the total fee.

In the present embodiment, the application use fee is charged only on the "printing", "e-mail transmission" and "facsimile transmittion" but not on the "OCR" process or the storage of the file obtained as the product of the process, so that the latter ones are displayed as charge free.

Also the fee for the "printing", "e-mail transmission" or "fax transmission" is displayed in a gray pattern in the touch panel image shown in FIG. 13 as such fee is not yet fixed in the strage of FIG. 13, and is displayed in a fixed manner when the fee for the various process is fixed after the OCR process on the touch panel image shown in FIG. 15.

In the present embodiment, as explained in the foregoing, the user prepares a file using the application, and then executes an output process of the file and the fee is charged when the user obtains the product of such output process. Stated differently, no fee is charged for the preparation only of the file utilizing the application.

Consequently, according to the present embodiment, the charge payable by the user corresponds to the product of the use of the application by the user and is reasonable for the use of the application.

Also in the present embodiment, the output process device for outputting the file has the function of an add-up server and the information on the application use fee is transmitted from the output devices to the charge management server through the network. Therefore the charge management server can execute the charging process on the application use fee regardless of the actual locations of the output devices or regardless of the time zone in which the user utilizes the output devices, whereby the charging process can be made more efficient.

Also the system of the present embodiment can be applied to the application of a wide range, thereby expanding the business range of the ASP.

[Second Embodiment] [Application Server and Add-up Server Being Realized by Different Devices]

In the following there will be explained, with reference to the accompanying drawings, a second embodiment of the application charging system of the present invention. In the present embodiment, different from the foregoing first embodiment, the functions of the application server, the add-up server and the output processes are provided separately.

Figure 18:
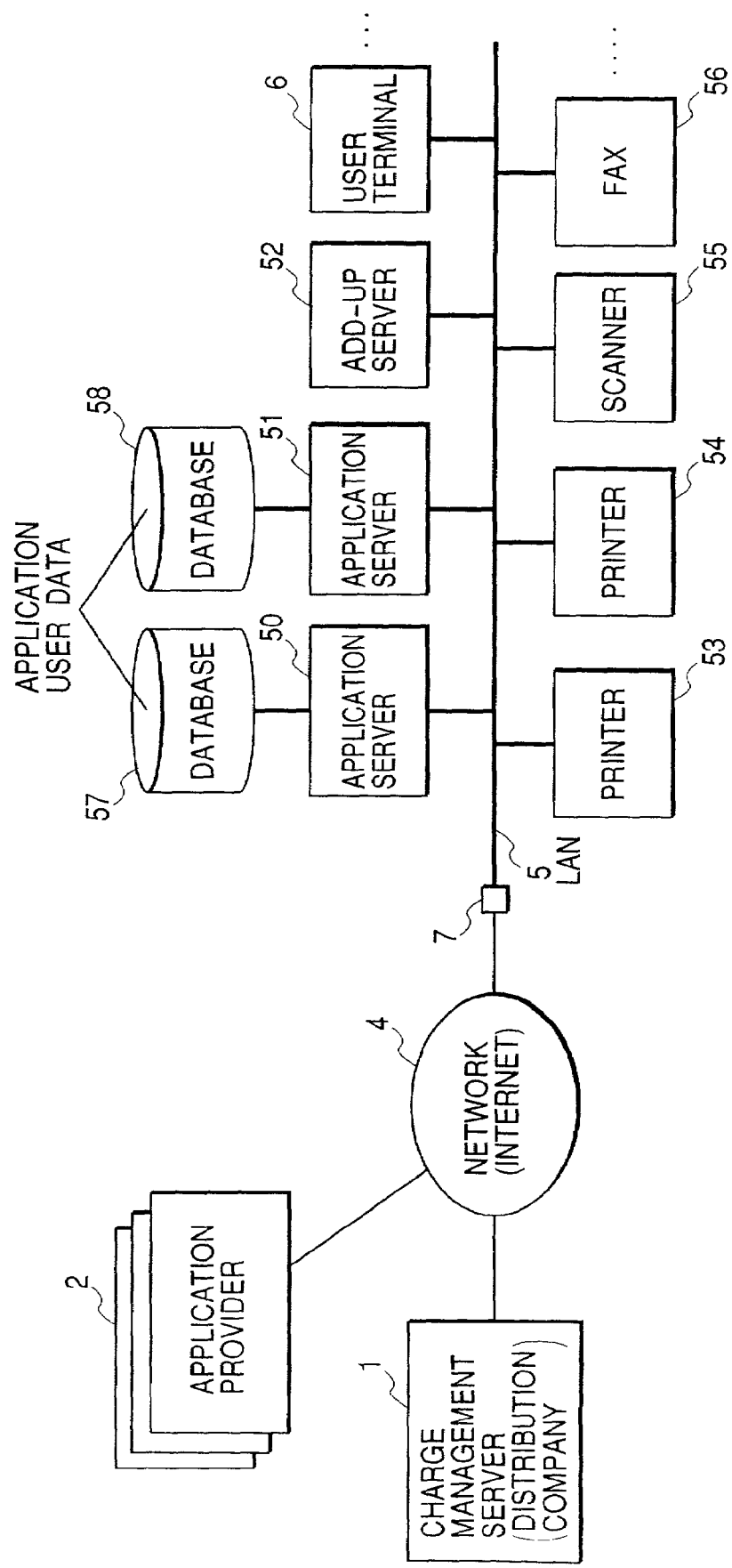
FIG. 18 is a view showing the system configuration of an application charging system of the present invention.

FIG. 18 shows the system configuration of the present embodiment, wherein provided are application servers 50, 51 which hold applications provided from the ASP 2 and whihc are respectively connected to data bases 57, 58 for storing the user files which user prepares using the application.

An add-up server 52 manages the use status of the applications held in the application servers 50, 51. Printers 53, 54, a scanner 55 and a facsimile device 56 execute output process for the user file prepared using the application. A user terminal 6, the application servers 50, 51, the add-up server 52, the printers 53, 54, the scanner 55 and the FAX 56 are connected to a LAN 5 and are used therein or in an intranet environment. The LAN 5 is connected by a router 7 to a network 4. A charge management server 1 of the distribution company, at least an application provider 2 and the router 7 are connected to the network 4.

Figure 19:
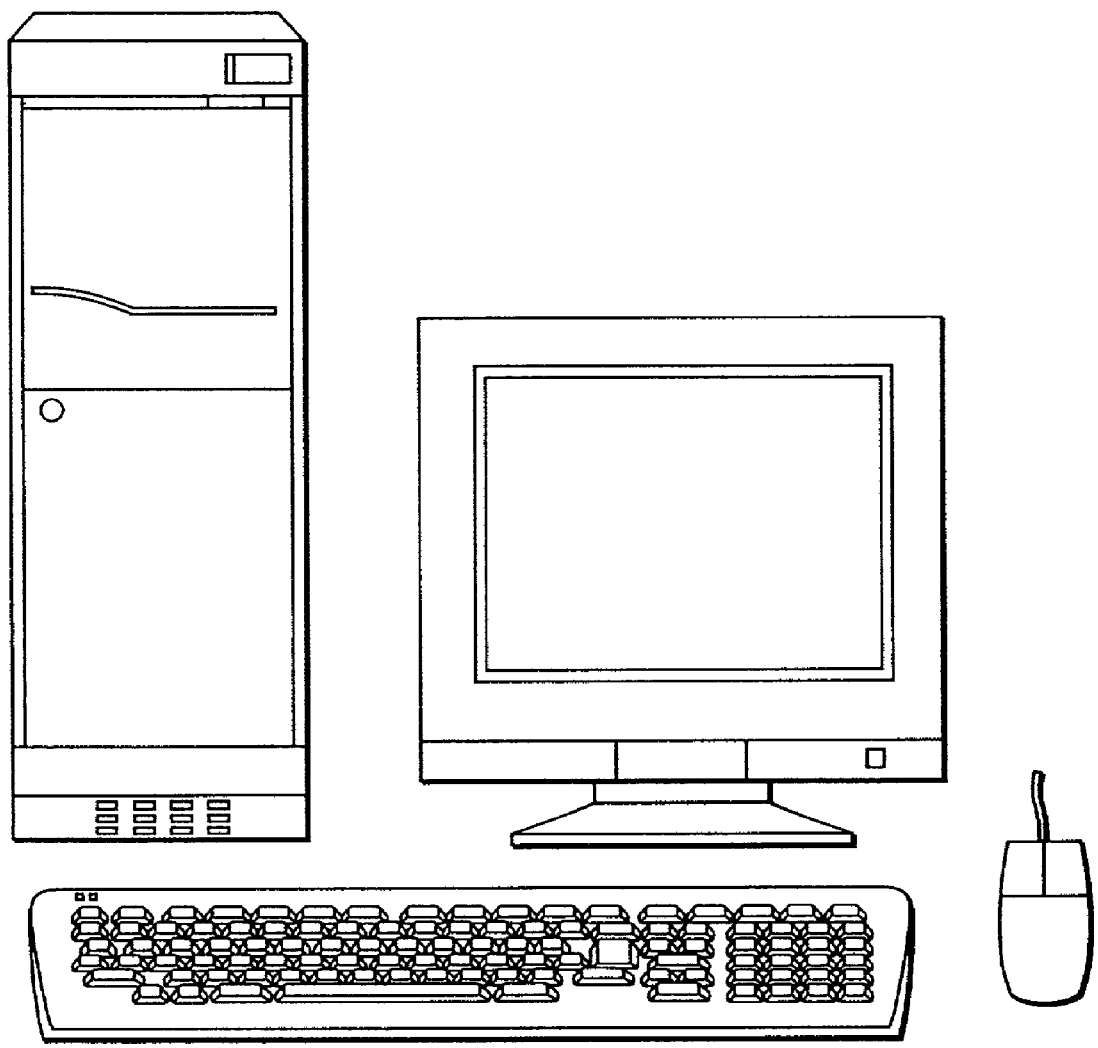
FIG. 19 is a schematic view of an application server and an add-up server to be used in the application charging system of the present invention.

FIG. 19 is a schematic view of the application servers 50, 51 and the add-up server 52 used in the present system. In the present embodiment, the application servers 50, 51 and the add-up server 52 are assumed to be realized by separate devices, but they may also be incorporated within a same device.

Figure 20:
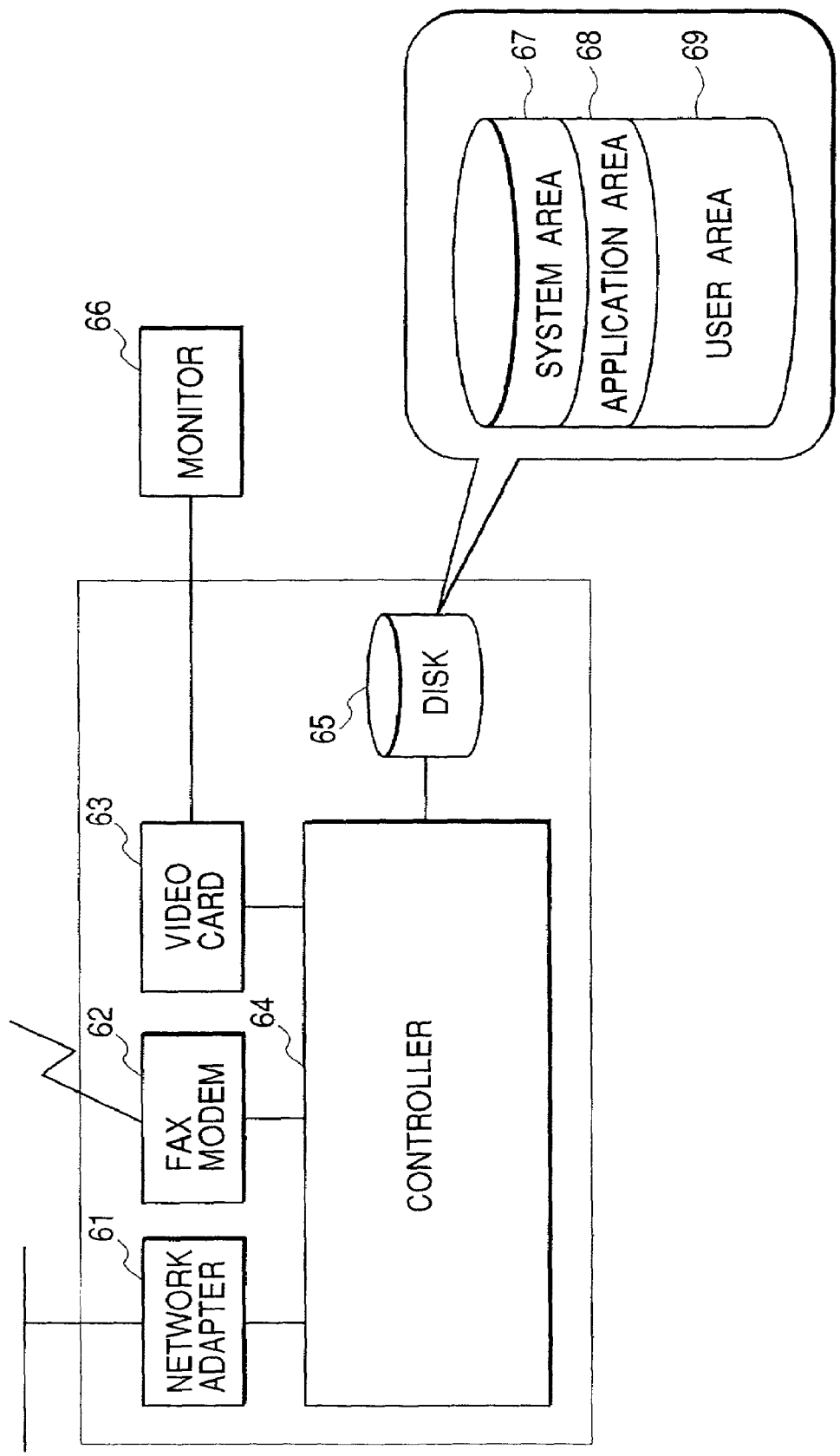
FIG. 20 is a schematic view showing the internal configuration of the application server to be used in the application charging system of the present invention.

In the following there will be explained the internal configuration of the application server 50, with reference to a schematic view shown in FIG. 20. The application server 51 has a similar internal configuration. The application server 50 is provided therein with a network adapter 61 constituting a connection interface with the LAN 5, a FAX modem 62 for data transmission on a telephone line, a video card 63 for image display on a monitor 66, a disk 65 constituting data memory means, and a controller 64 for controlling these components. The disk 65 is a memory device such as a hard disk, and includes a system area 67, an application area 68 for holding the application provided from the ASP 2, and a user area 69 for holding the user file which the user prepares using the application. These areas only need to be logically separated and may be composed of different disks 65 or may be separated by directories within a same disk 65.

Figure 21:
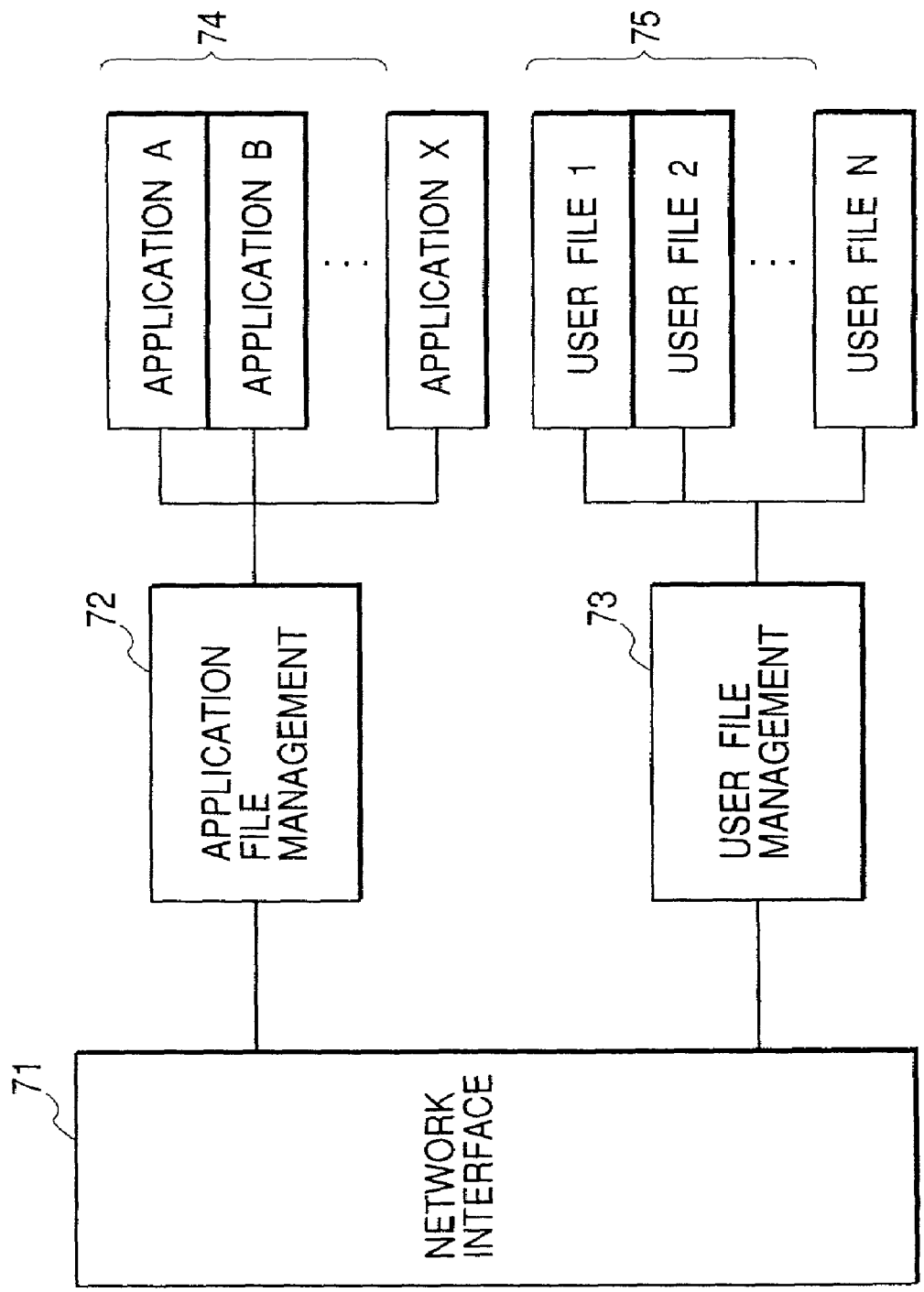
FIG. 21 is a software block diagram of the application server to be used in the application charging system of the present invention.

In the following there will be explained the internal software configuration of the application server 50 with reference to a software block diagram shown in FIG. 21. Also the application server 51 has a similar software configuration.

An application file management 72 and a user file management 73 are connected to a network interface 71, through which an external access is made possible. The application file management 72 is connected to the various applications 74 provided from the ASP 2. Also the user file management 73 is connected to a user file 75 which the user prepares using the application file.

Figure 22:
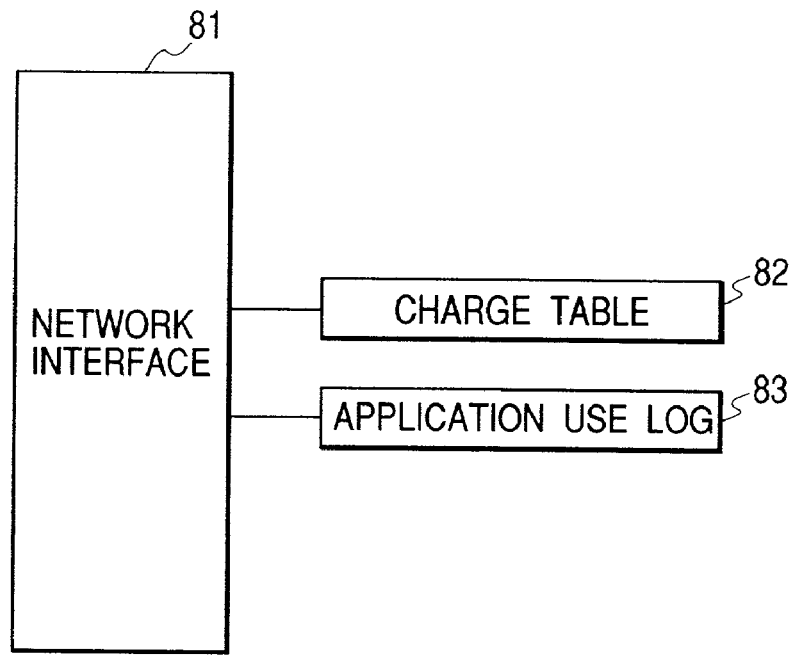
FIG. 22 is a software block diagram of the add-up server to ve used in the application charging system of the present invention.

In the following there will be explained the internal configuration of the add-up server 52 with reference to a software block diagram shown in FIG. 22.

A charge table 82 stores tables as shown in FIGS. 24A and 24B and as will be explained later, and an application use log 83 accumulates logs recording the uses of the applications held in the application servers 50, 51.

The charge table 82 and the application use log 83 are connected through a network interface 81, and the application use fee is calculated on the information stored in the charge table 82 and the application use log 83.

In the following there will be explained, with reference to a flow chart shown in FIG. 23, an operation of the add-up server 52 for renewing the application use log 83.

Figure 23:
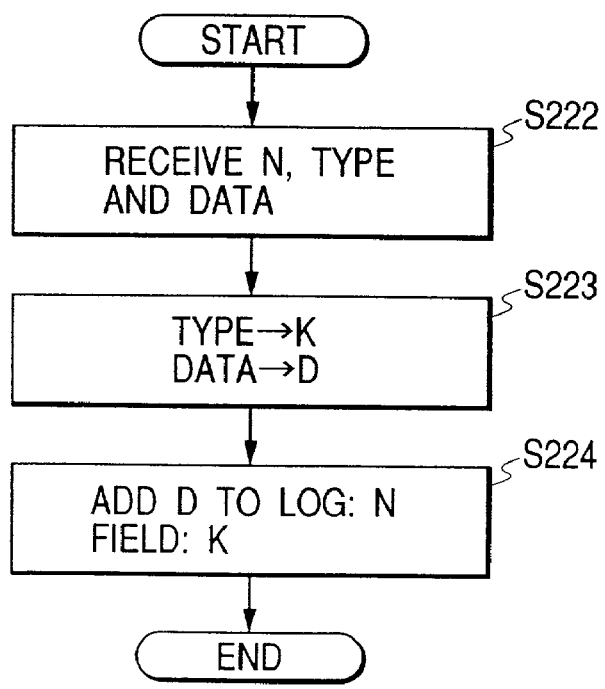
FIG. 23 is a flow chart of a renewing operation for the application use log to be used in the application charging system of the present invention.

Referring to FIG. 23, N is an application number of identifying the application type uses for preparing the user file, while K is a process number indicating the type of the output process for the user file, used for obtaining the product, and D is log information acumulated in the appllication use log 83. The types of the output process for the user file include, for example, printing, FAX transmission, e-mail transmission and OCR process. Also the log information accumulated inn the application use log 83 includes, for example, the number of prints, number of FAX transmissions and size of e-mail.

At first, in a step S222, the add-up server 52 receives, from the user terminal 6, the application number N of the application used in the user terminal 6, the type of the output process for the prepared user file, the log information, and the user ID of the user of the user terminal 6.

In a step S223, the add-up server 52 obtains the process number K and the log information D based on the type of the output process and the log information, received from the user terminal 6 in the step S222.

In a step S224, the add-up server 52 stores the "user ID" received in the step S222 and the "application name" corresponding to the application number N in the respective fields of the application use log shown in FIG. 26 and to be explained later. It also stores the use log derived from the process number K obtained in the step S223 and the log information D in the field of each output process, whereupon the sequence is terminated.

In the following there will be explained, with reference to FIGS. 24A and 24B, a charge table 82 used for calculating the application use fee in the present embodiment.

In FIGS. 24A and 24B, the fee is different depending on the type of the application and the content of the output process for the user file prepared using the application. More specifically, the fee is variable depending not only on tht type of the used application but also on the output process, for example whether the user file prepared using the application is printed, or it is transmitted by e-mail to another destination, or it is transmitted by facsimile or it is taken out as the electronic data (hereinafter called contents retrieval). Also in case plural applications are used for preparing a user file, fees are charged in overlapping manner. There may also be adopted other output processes other than those cited above, and such processes are also set in the charge table, together with the corresponding fees. Also the fee for an output process not listed in the charge table may be selected same as that for the file retrieval.

Furthermore, the fee may be made variable depending on the destination of output of the user file.

The charge table includes a standard charge table shown in FIG. 24A and a discount charge table shown in FIG. 24B, in which the fees in the latter are lower than those in the former. The add-up server 52 may hold a plurality of such charge tables and may select a charge table to be used according to the condition such as the destination of the output of the user file, whereby the charge setting can be easily altered.

Figure 25:
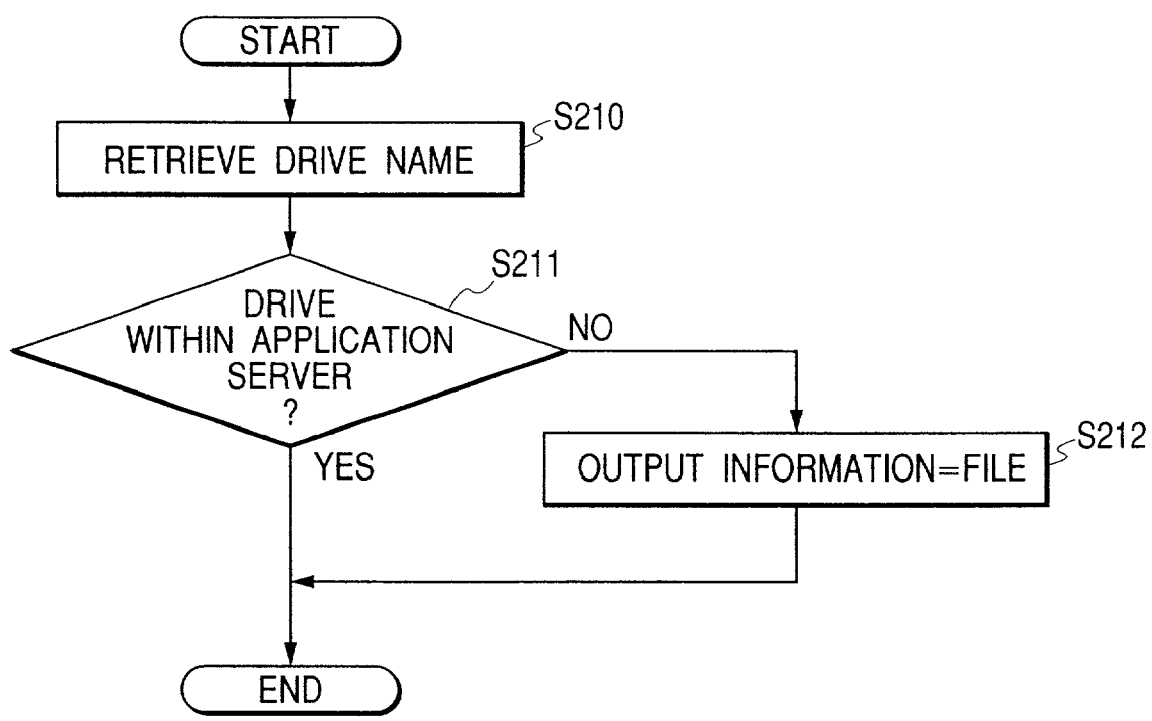
FIG. 25 is a flow chart showing a procedure for generating output processing information in the application charging system of the present invention.

In the following there will be explained, with reference to a flow chart shown in FIG. 25, an operation of the user terminal 6 for generating output information for outputting the user file prepared using the application.

At first, in a step S210, the user terminal 6 obtains the drive name at the destination of output.

In a step S211, the user terminal 6 discriminates, from the drive name of the destination of the output obtained in the step S210, whether the drive at the output destination is a drive on the application server 50. If the step S211 identifies that the drive is on the application server 50 (Yes), the sequence is terminated. If the step S211 identifies that the drive is not on the application server 50 (No), a step S212 stores that the output information is a file, whereupon the sequence is terminated.

In the following there will be explained an application use log 83 held by the add-up server 52, with reference to a schematic view shown in FIG. 26.

As shown in FIG. 26, there are provided an "application type" field for storing the type of the used application, a "user ID" for storing the ID of the user who has used the application, and a field for storing the log information for each kind of the output process for the product. In FIG. 26, the output processes for the product include "print process", "e-mail transmission", "facsimile transmission" and "file retrieval". FIG. 26 indicates that, for the user file prepared with the "application A", the "user ID 0001" has executed "print process" for 102 sheets, "e-mail transmission" for 42 kbytes, "FAX transmission" for 13 sheets, and "contents retrieval" for two times. There are other similar products. In FIG. 26, the application use log is sorted according to the "user ID", but such example is not restrictive.

In the following there will be explained, with reference to a schematic view shown in FIG. 27, the result of calculation of the application use fee in the add-up server 52.

In FIG. 27, there are stored, for each user file prepared with the application, the type of the use application, the user ID, the log information of the output process (number of printed sheets, number of bytes transmitted by e-mail etc.) for the user file, and the application use fee calculated according thereto.

In the following there will be explained the operation of the add-up server 52 for calculating the application use fee, with reference to FIGS. 28A and 28B.

Figure 28A:
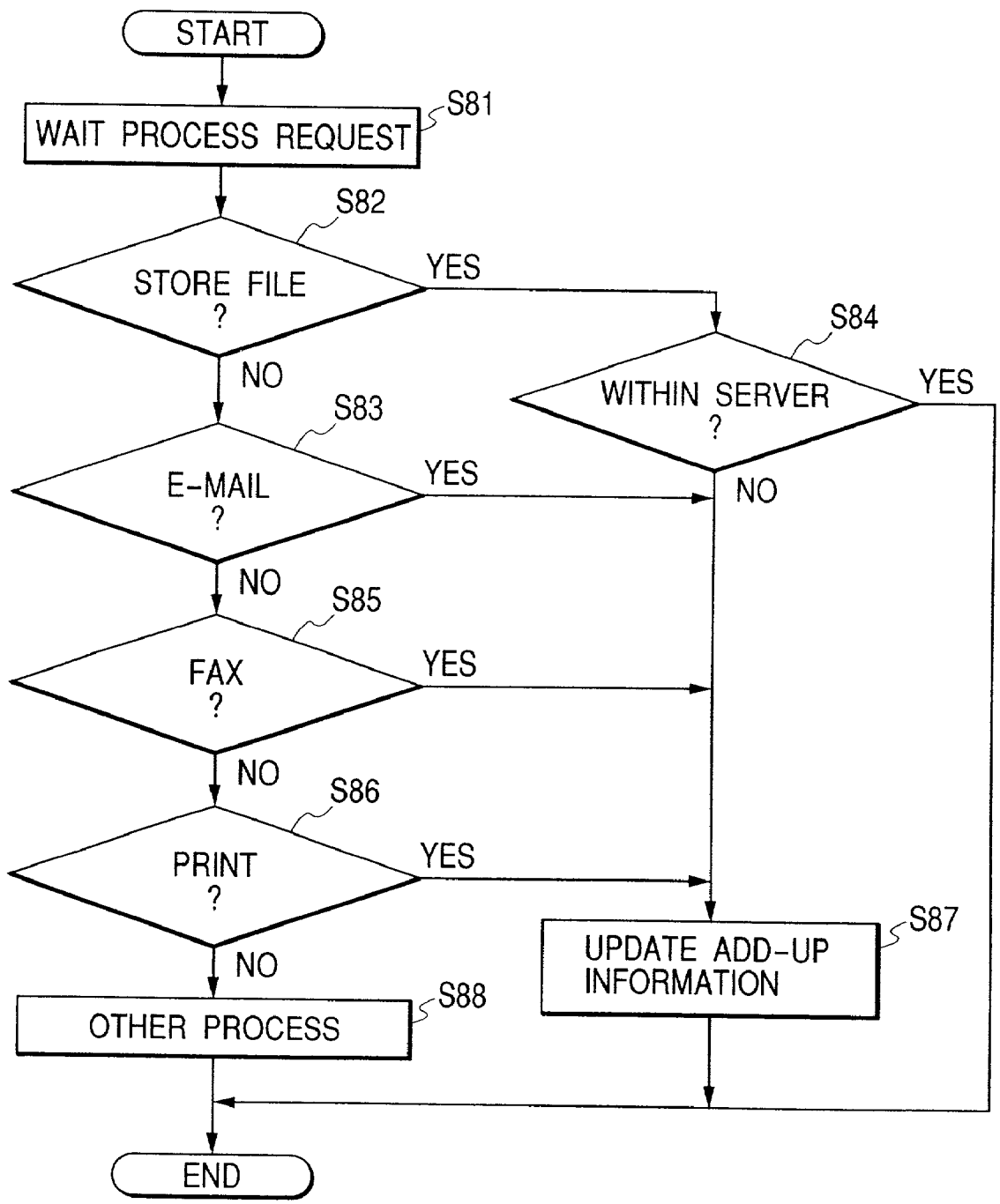
FIGS. 28A and 28B are flow charts showing a procedure for calculating the application use fee in the application charging system of the present invention.

At first reference is made to a flow chart in FIG. 28A.

In a step S81, the add-up server 52 awaits a request for process (S81).

In a step S82, the add-up server 52 discriminates whether the request is for storage of the user file. If the result of discrimination is affirmative (Yes), the sequence proceeds to a step S84, but, if negative (No), the sequence proceeds to a step S83.

Then a step S84 discriminates whether the destination of storage of the user file is within the application server 50. If the result of discrimination is affirmative (Yes), the sequence is terminated, but, if negative (No), the sequence proceeds to a step S87.

Also in a step S83, the add-up server 52 discriminates whether the request is for the e-mail transmission. If the result of discrimination is affirmative (Yes), the sequence proceeds to a step S87, but, if negative (No), the sequence proceeds to a step S85.

Also in a step S85, the add-up server 52 discriminates whether the request is for the FAX transmission. If the result of discrimination is affirmative (Yes), the sequence proceeds to a step S87, but, if negative (No), the sequence proceeds to a step S86.

Also in a step S86, the add-up server 52 discriminates whether the print process is selected. If the print process is selected (Yes), the sequence proceeds to a step S87, but, if not selected (No), the sequence proceeds to a step S88.

Thus the steps S83, S85 and S86 discriminate the output process to be applied to the user file, prepared using the application, for obtaining the product.

In case the product is obtained outside the application server 50 by an output process such as "printing", "e-mail transmission" or "FAX transmission", the step S87 renews the application use log information in order to charge the application use fee to the user.

Figure 28B:
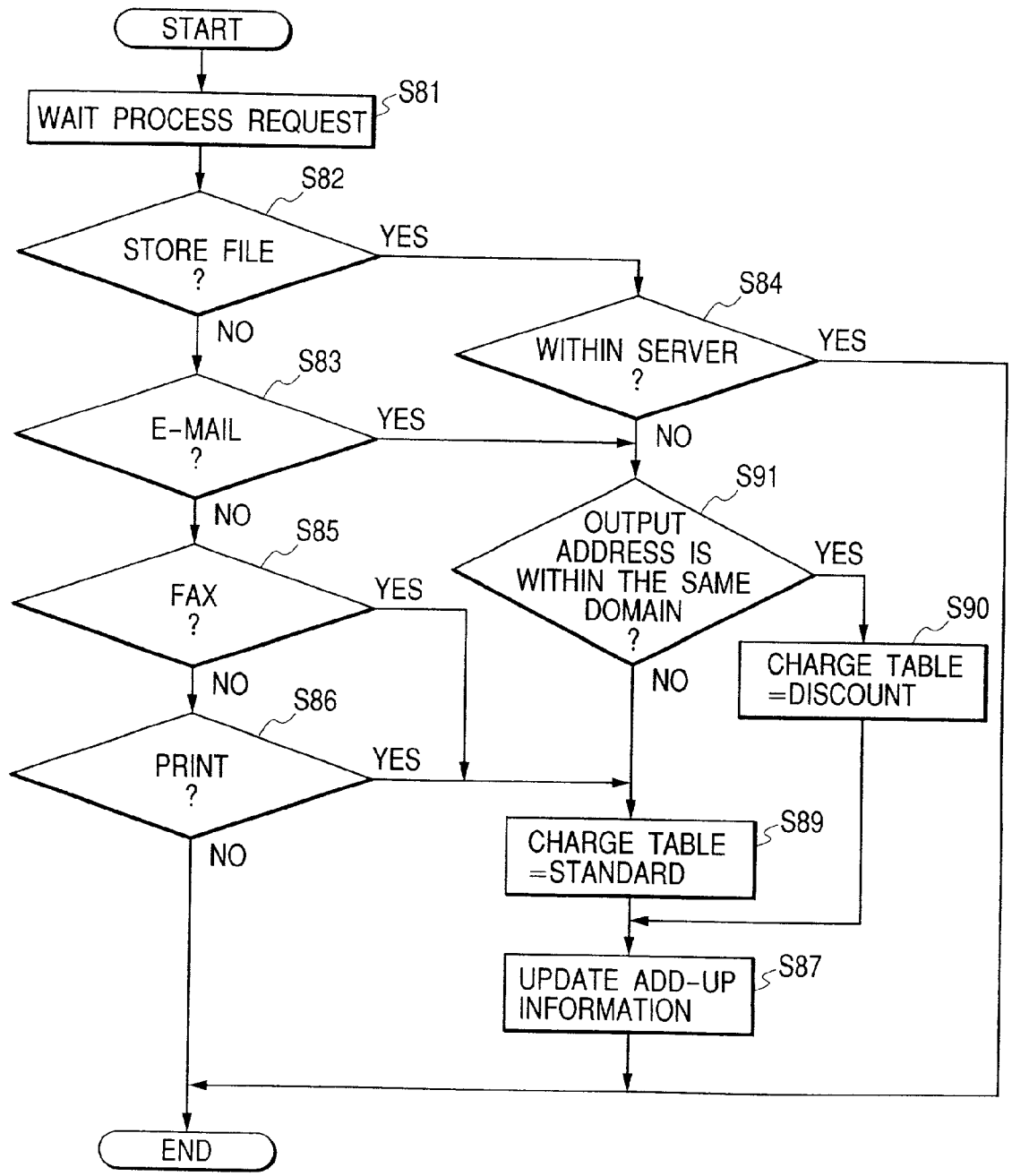

In the following reference is made to a flow chart of FIG. 28B, showing a case where the application use fee is different depending on the domain of the destination of output of the product. In the flow chart of FIG. 28B, the steps of the numbers same as those in the flow chart of FIG. 28A are equivalent in function, so that the following explanation will only be made on steps S89, S90 and S91 which are different in function from the flow chart FIG. 28A.

In case the step S83 discriminates that the request is for the e-mail transmission (Yes), or the step S84 discriminates that the destination of storage of the user file is not within the application server 50 (No), the sequence proceeds to a step S91, which discriminates whether the destination of output of the user file is within a domain same as that of the application server 50. If the step S91 identifies that the destination of output of the user file is within a domain same as that of the application server 50 (Yes), the step S90 selects the discount charge table in FIG. 24B for calculating the application use fee, and the sequence then proceeds to the step S87. On the other hand, if the step S91 identifies that the destination of output of the user file is not within a domain same as that of the application server 50 (No), a step S89 selects the standard charge table in FIG. 26A for calculating the application use fee, and the sequence then proceeds to the step S87.

In case the step S85 identifies the FAX transmission (Yes) or the step S87 identifies the printing (Yes), the application use fee is not related with the destination of output of the user file, so that the step S89 selects the standard charge table in FIG. 24A for calculating the application use fee.

Thus, in the flow chart in FIG. 28B, the charge table to be used for calculating the fee to be charged is selected according to whether the destination of output of the product of the output process by the user is within a domain same as that of the application server 50, whereby the application use fee can be easily calculated with different charge systems.

In the following there will be explained, with reference to a sequence chart shown in FIG. 29, an operation of storing the user file prepared with the application in the application server 50 or 51, an operation of printing the stored user file and an operation of FAX transmission or e-mail transmission of the user file. The following description will be made on the application server 50, but the operation will be the same for the application server 51.

Figure 29:
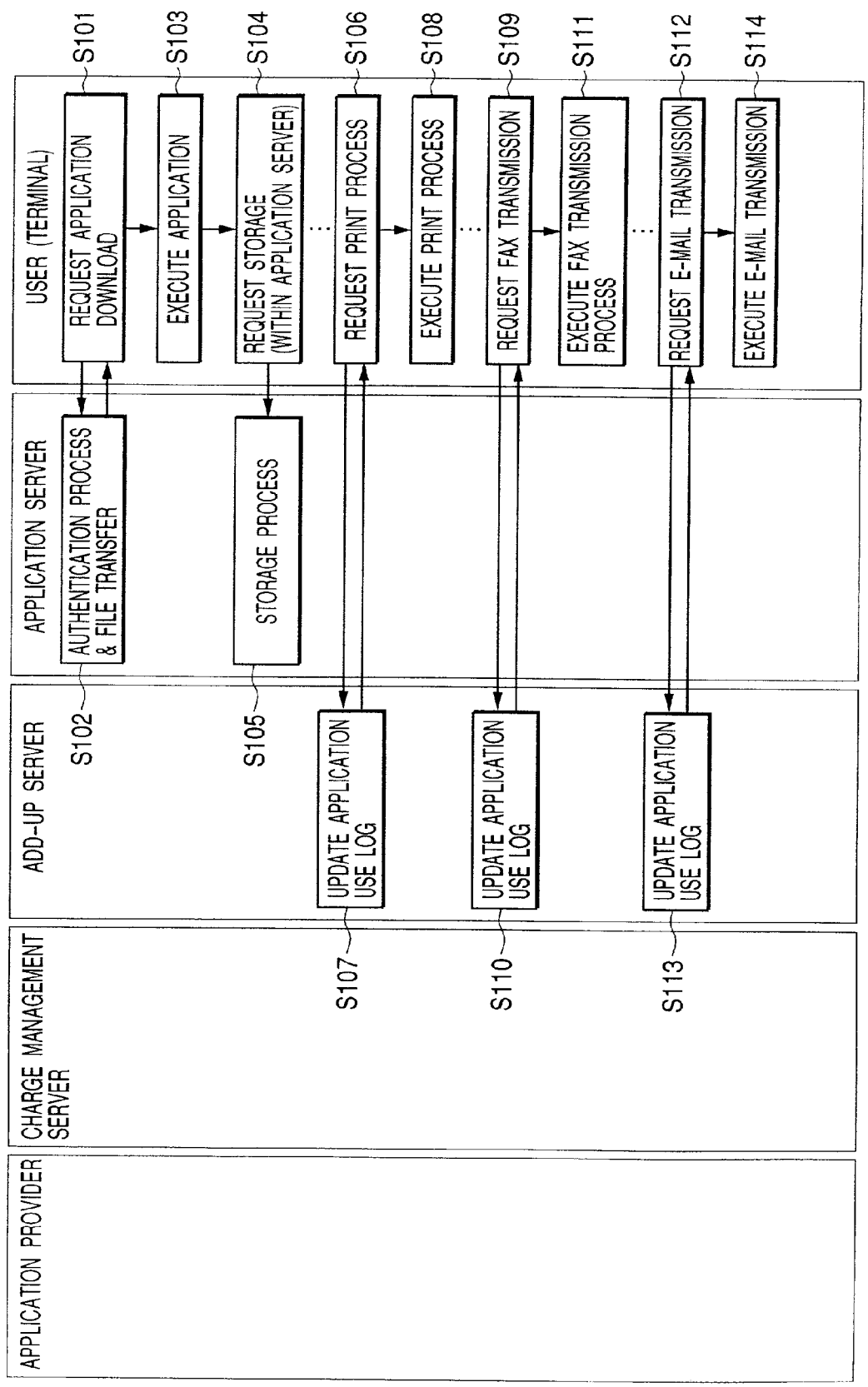
FIGS. 29 and 30 are views showing the operation sequence of the application charging system of the present invention.

Referring to FIG. 29, the user terminal 6 requests downloading of the appllication to the application server 50 and informs the user ID (S101). Based on the download request and the user ID transmitted from the user terminal 6 in the step S101, the application server 50 executes authentication of the user terminal 6 and application transfer to the user terminal 6 (S102).

Then the user terminal 6 downloads the application transmitted from the application server 50 in the step S102 and executes the application to prepare the user file (S103). In this operation, after the downloading of the application by the user terminal 6, the application server 50 may issue an execution instructing command to achieve execution of the application.

Then the user terminal 6 requests the storage of the user file prepared in the step S103 to the application server 50 (S104). Based on the request for storage of the user file from the user terminal 6 in the step S104, the application server 50 executes storage of the user file (S105).

Then the user terminal 6 arbitrarily combines one or plural of printing (S106, S108), FAX transmission (S109, S111) and e-mail transmission (S112, S114) and executes such process or processes on the prepared user file.

Then the add-up server 52 renews the application use log (S107, S110, S113), based on the requests for the above-mentioned output processes (S106, S109, S112) from the user terminal 6.

Figure 30:
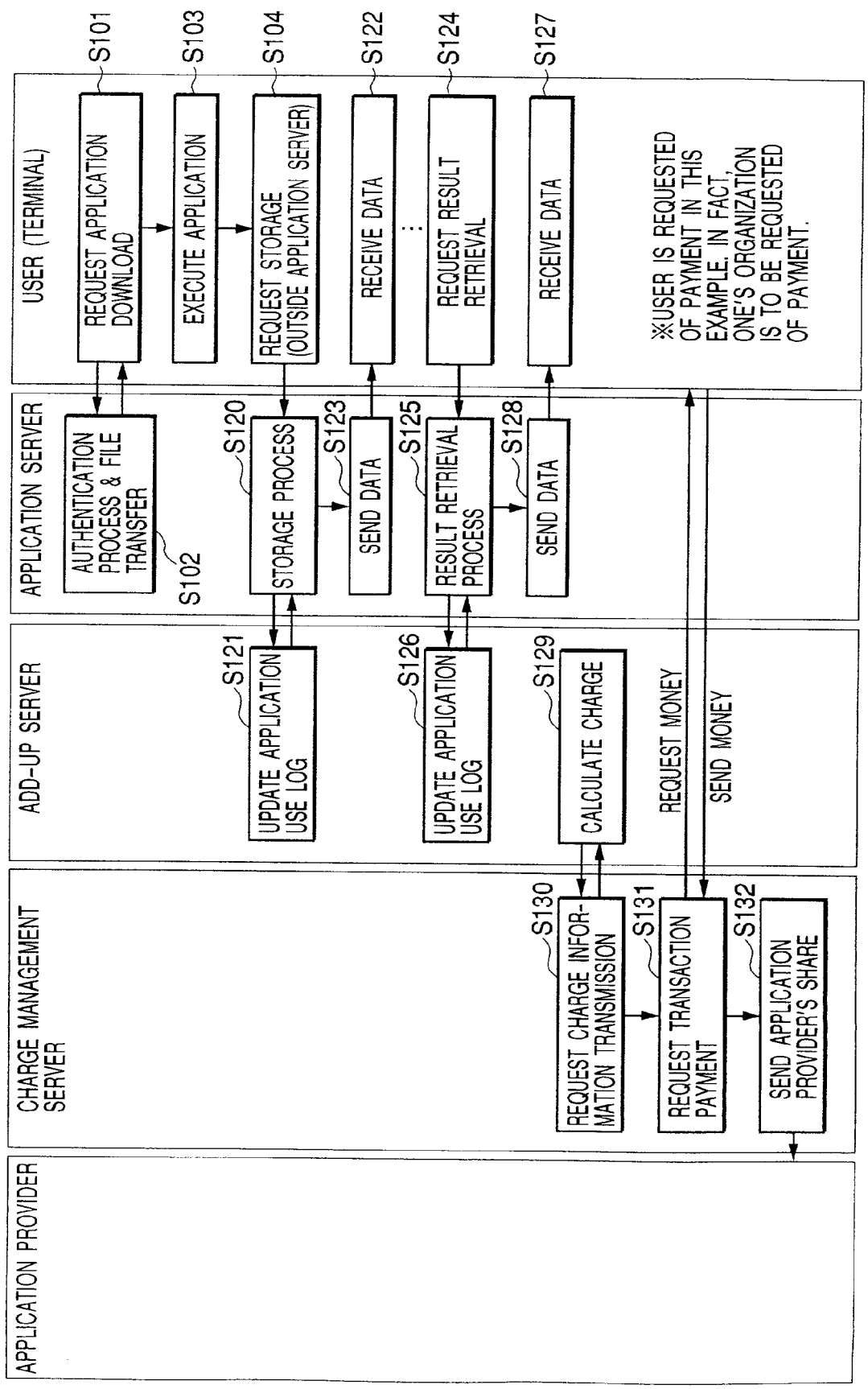

In the following there will be explained, with reference to a sequence chart shown in FIG. 30, an operation of storing the file outside the application server 50 or 51, retrieving the file, outputting the product and recovering the charge therefor, in contrast to the sequence shown in FIG. 29 in which the file is stored in the application server 50. As the steps S101 to S104 in FIG. 30 are same as those in FIG. 29, these steps will no longer be explained and the following explanation will be given only to steps S120 to S132 representing operations different from those in FIG. 29. The following description will be given on the application server 50, but the operations are same also for the application server 51.

In a step S105, based on the request for file storage from the user terminal 6 in the step S104, the application server 50 executes storage of the file and requests the renewal of the application use log to the add-up server 52. The destination of storage of the file is assumed to be outside the application server 50.

In a step S121, based on the request from the application server 50 in the step S120, the add-up server 52 renews the application use log.

In a step S123, the application server 50 transmits the file to the user terminal 6.

In a step S122, the user terminal 6 receives the file transmitted from the application server 50 in the step S123.

Then, in a step S124, the user terminal 6 request file output (product retrieval) to the application server 50. It is assumed that there is requested a process of retriving, as the product of the file, the file in a form reusable as electronic data (contents retrieval).

In a step S125, based on the request from the user terminal 6 in the step S124, the application server 50 executes output process of the file (product retrieval) and request the renewal of the application use log to the add-up server 52.

In a step S126, based on the request from the application server 50 in the step S125, the add-up server 52 renews the application use log 83.

In a step S128, the application server 50 transmits the file to the user terminal 6.

In a step S127, the user terminal 6 receives the file transmitted from the application server in the step S128.

In a step S129, the add-up server 52 calculates the application use fee based on the application use log renewed in the step S126.

In a step S130, the charge management server 1 request the transmission of the charge information to the add-up server 52.

In a step S129, the add-up server transmits, to the charge management server 1, the charge information on the application use fee, calculated according to the request from the charge management server 1 in the step S130.

Then, in a step S131, the charge management server 1 transmits, to the user terminal 6, a request for payment of the application use fee, based on the charge information received from the add-up server in the step S130. Also in a step S132, it transmits, to the application provider 2, an amount corresponding to the share thereof within the application use fee.

In the following there will be explained, with reference to flow charts shown in FIGS. 31A and 31B, an operation in the steps S129 and S130 in FIG. 30, where the add-up server 52 transmits the charge information on the application use fee to the charge management server 1 based on the request therefrom.

Figure 31A:
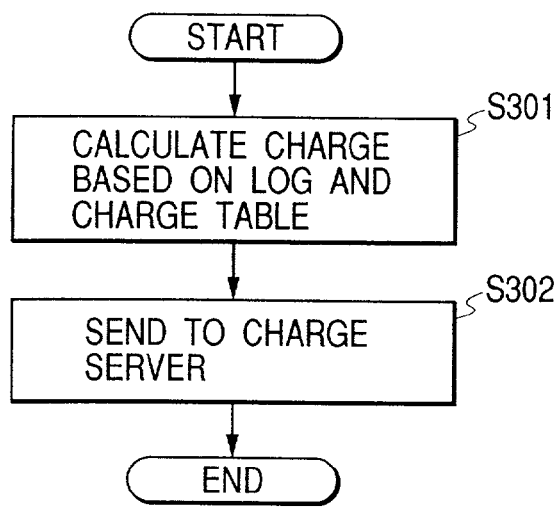
FIGS. 31A and 31B are flow charts showing a fee charging operation in the application charging system of the present invention.

FIG. 31A is a flow chart showing an operation in which the add-up server 52 transmits the charge amount calculated by the add-up server in the step S129 to the charge management server 1 based on the request for transmission from the charge management server 1 in the step S130 in FIG. 30.

At first the add-up server 52 calculates the application use fee for the file storage in the step S120 or the product retrieval in the step S125 by the application server 52, based on the charge table 82 and the application use log 83 (S301). Then the add-up server 52 transmits, to the charge management server 1, the charge information on the application use fee calculated in the step S301 (S302).

Figure 31B:
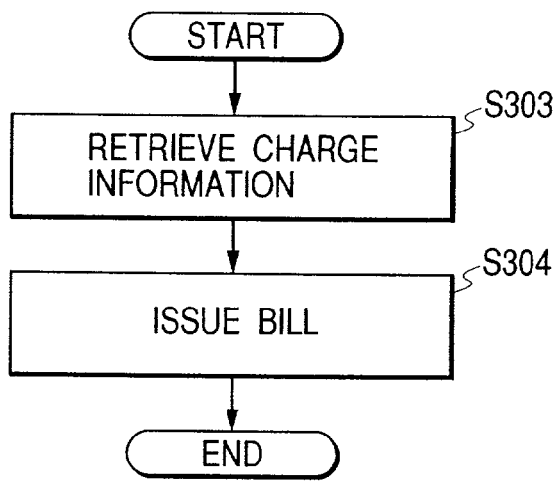

FIG. 31B indicates a flow chart showing an operation of the charge management server 1 for requesting payment to the user terminal 6 in the step 131 in FIG. 30.

The charge management server 1 obtains the charge information from the add-up server 52 (S303). Then the charge management server 1 prepares a bill based on the charge information obtained in the step S303, and transmits the bill to the user terminal 6 (S304).

Figure 32:
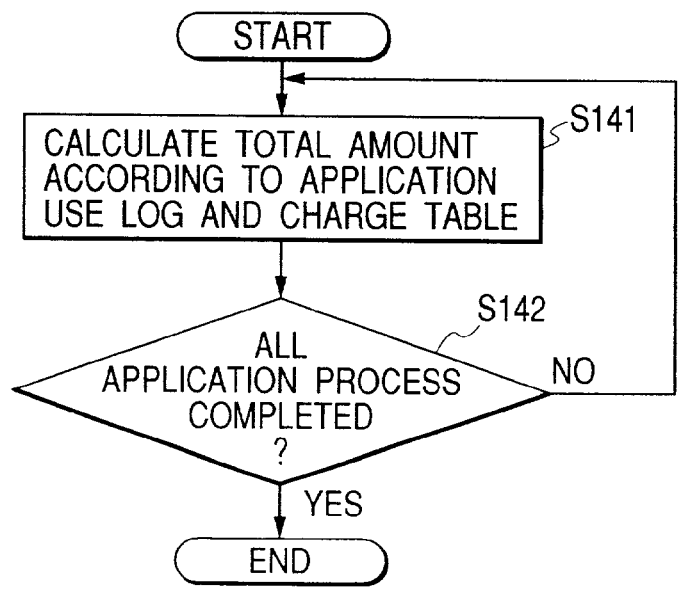
FIG. 32 is a flow chart showing a procedure for calculating the application use fee in the application charging system of the present invention.

In the following, there will be explained, with reference to a flow chart shown in FIG. 32, an operation of calculating the application use fee by the add-up server 52 in the step S129 shown in FIG. 30.

at first the total amount of the application use fee is calculated from the charge table 82 and the application use log 83 (S141). Then there is discriminated whether the calculation in the step S141 has been completed for all the applications (S142). If not completed (No), the sequence proceeds to a step S141, but, if completed (Yes), the sequence is terminated.

Thus the system of the present embodiment enables charging according to the product of the use of the application, by the calculation based on the application use log 83 recording the output process (product) of the file.

In the following there will be explained images displayed on the user terminal 6, with reference to FIGS. 33 to 42.

Figure 33:
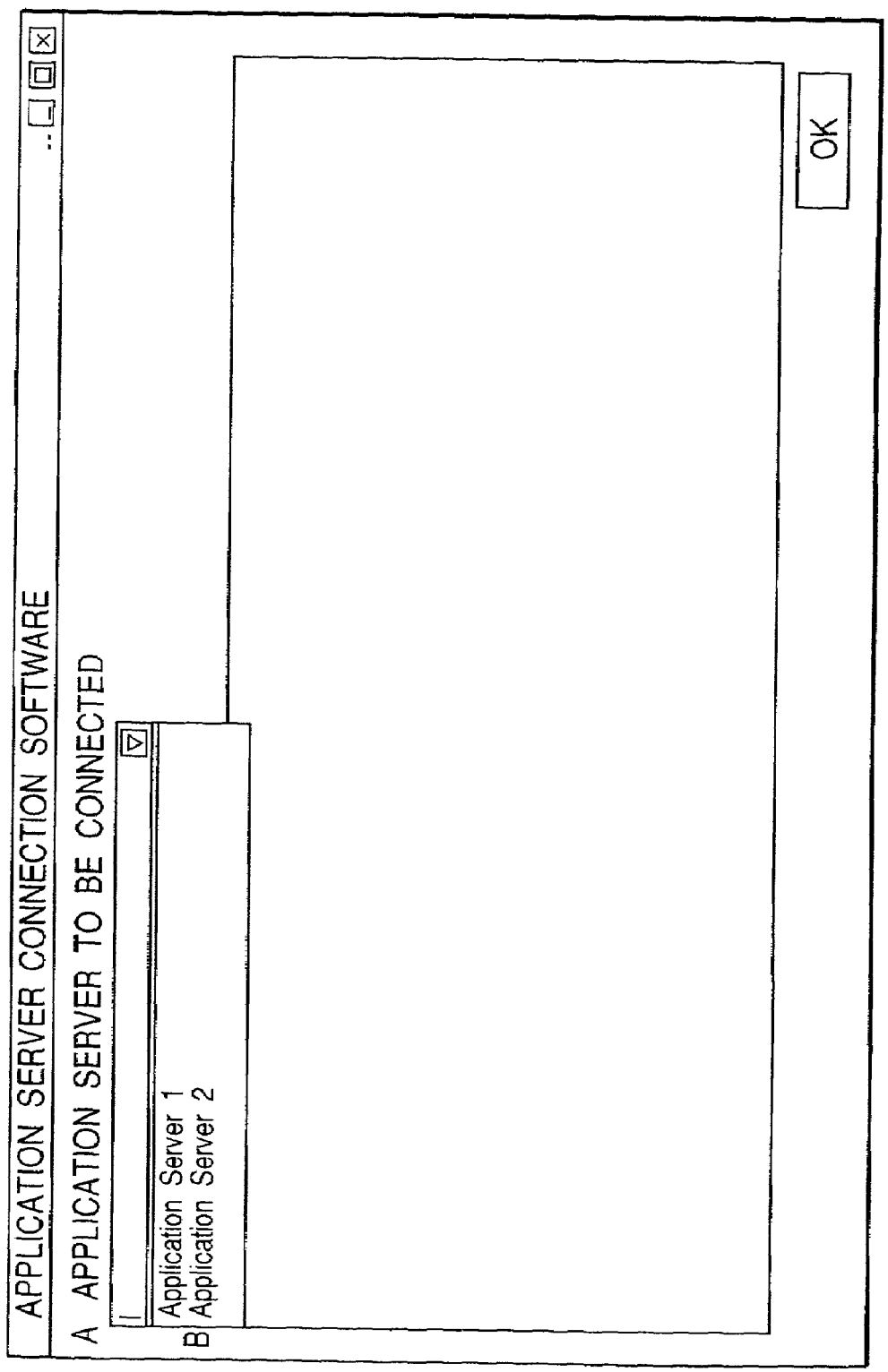

FIG. 33 schematically shows the user interface (UI) of an application downloading software functioning on the user terminal 6 in the step S101 in FIG. 29.

The application downloading software allows the user terminal 6 to download any desired application from the application servers 50, 51. FIG. 33 shows a state of selecting the application server 50 in a pull-down display on the UI of the application downloading software.

FIG. 34 shows a charge table indicating the types of the applications in the application server 50 selected in the UI shown in FIG. 33 and the fees for the products outputted from the files prepared with such applications. The image displayed in FIG. 34 allows the user to select an application matching the purpose of use and the budget. FIG. 34 shows a state in which an application B in the second row is selected. It is shown to the user that the fee for the product obtained with the application B is 30 Yen per sheet in case of printing, 100 Yen per kbyte in case of transmission as an attachment to an e-mail, 10 Yen per sheet in case of FAX transmission, and 2000 Yen per time in case of content retrieval as electronic data.

If satisfied with such fee, the user depresses an "OK" button in the lower right portion of the display shown in FIG. 34, thereby indicating the agreement for obtaining the product with the displayed fee. In this operation, the user ID of the user terminal is informed to the application server 50. The user ID is entered in an unrepresented log-in image, and thus entered user ID is informed to the application server 50. It is also possible to utilize the user ID entered in a log-in image of the OS (operating system) instead of the log-in image of the application downloading software.

Then the user terminal 6 executes downloading of the application B.

Figure 35:
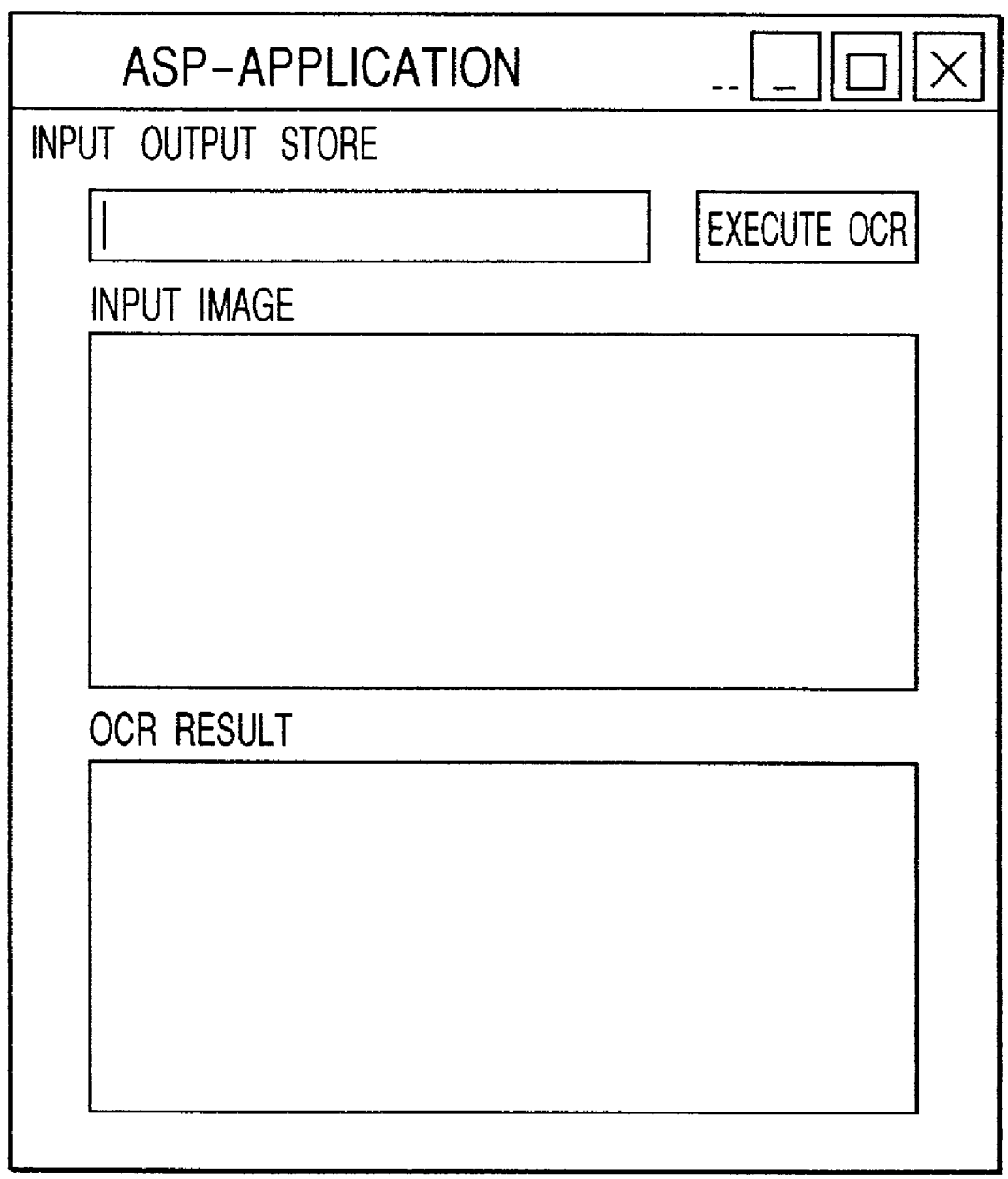
Figure 36:
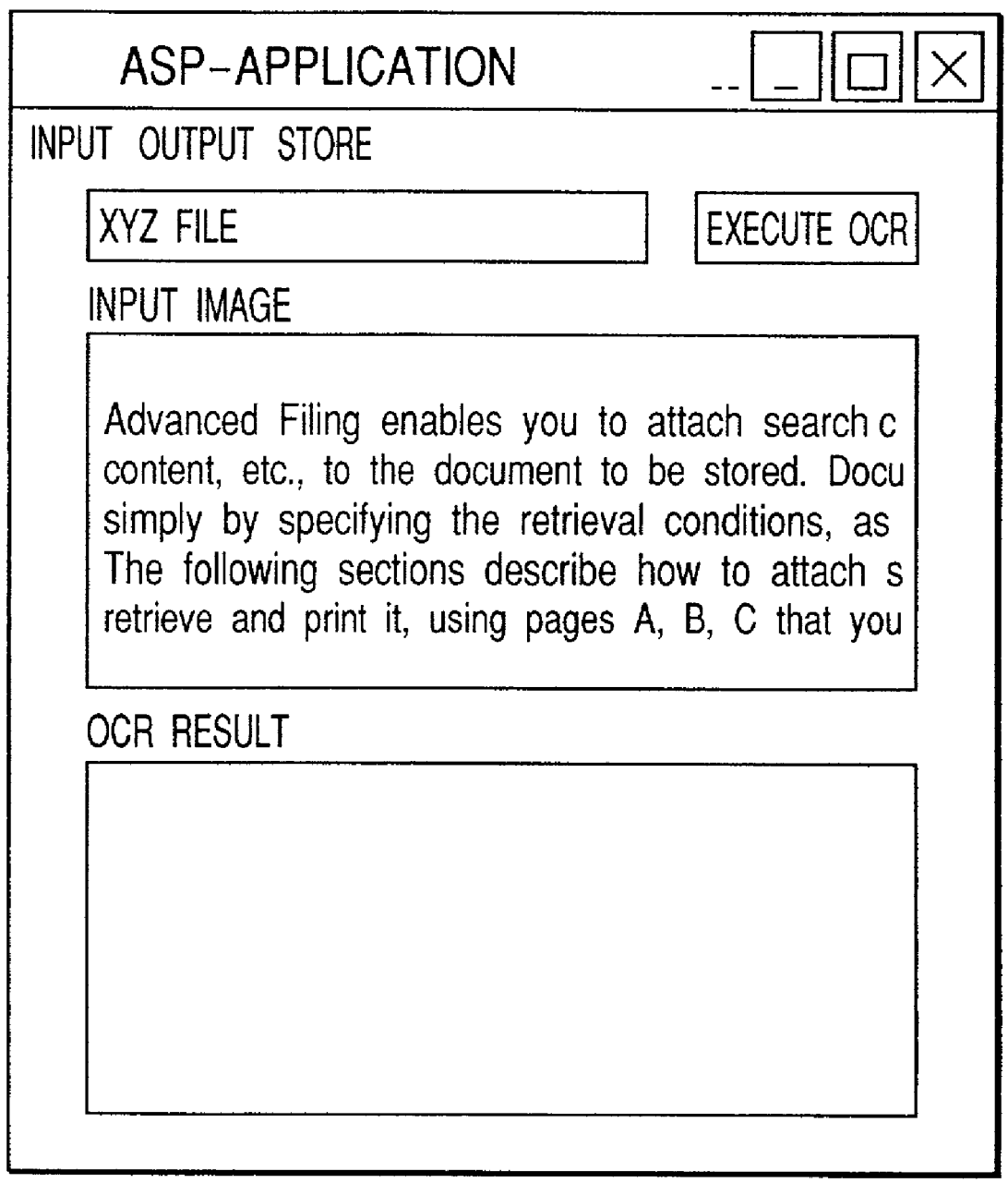

The application B downloaded into the user terminal 6 is self activated to display an initial image as shown in FIG. 35. In the present embodiment, there will be explained, as an example, a case where the application B is an OCR software.

The user terminal 6 selectes image data to be subjected to the OCR process from an "input" menu.

The image data displayed for input are those managed by a file server in the user terminal 6. In the present embodiment, there are only displayed the image data managed in the file server of the user terminal 6, but there may also be displayed image data outside the user terminal 6 if such image data can be entered.

Then the entered image data (file "XYZ") are displayed in an input image display field at the middle. Then, in response to the depression of an "OCR" button at the upper right portion of the image, the OCR process is executed on the image data "file XYZ".

Figure 37:
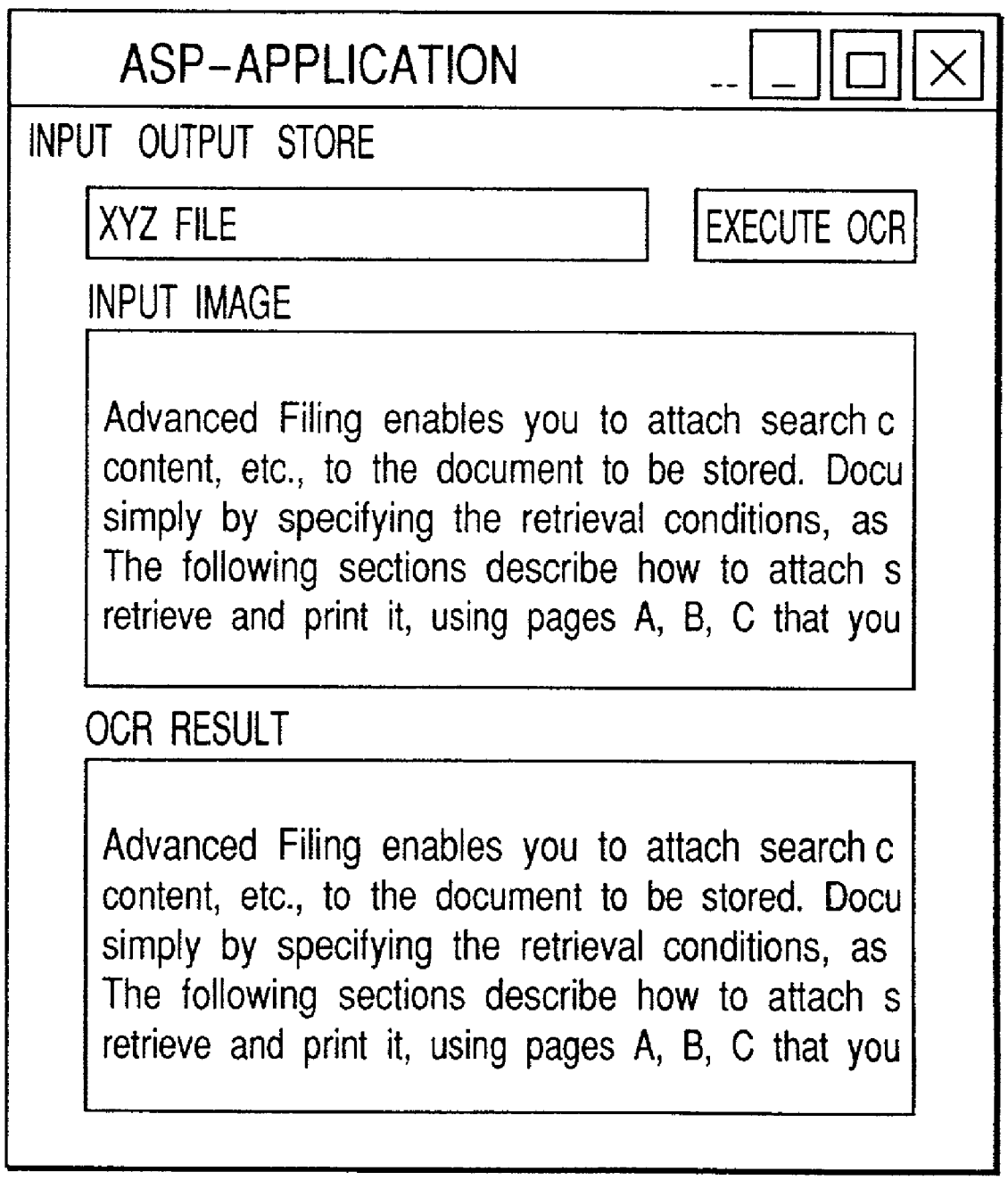

Then, as shown in FIG. 37, a text file obtained as the result of the OCR process on the image data "file XYZ" is displayed in the "OCR result" display field in the lower part of the image.

Figure 38:
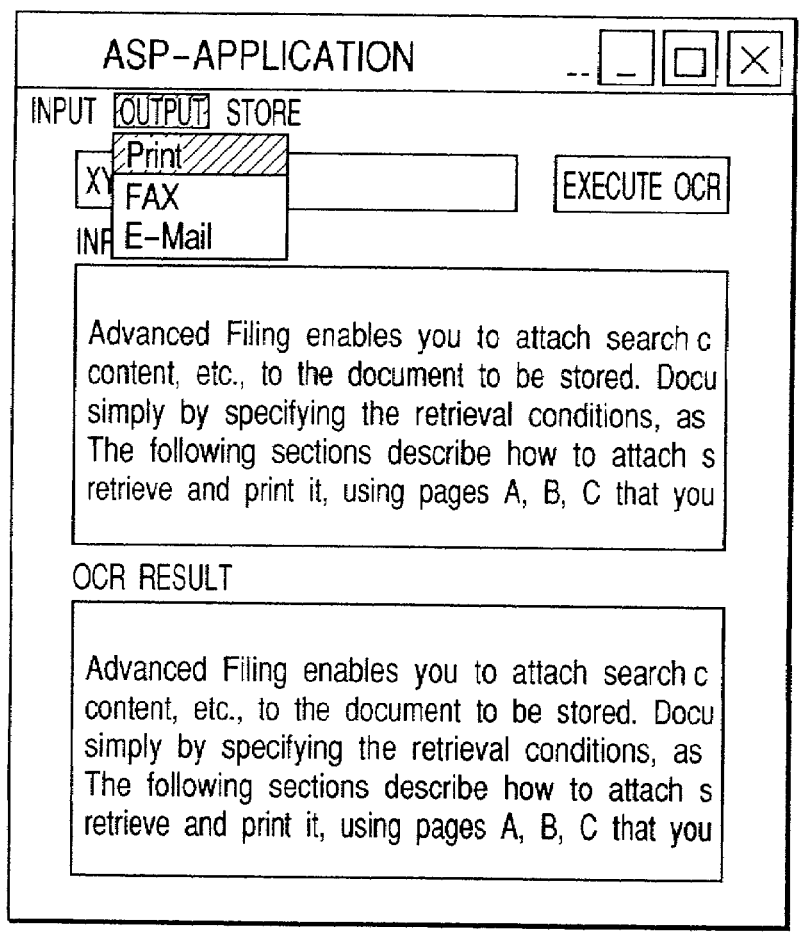

FIG. 38 shows a display image for selecting, from an output menu, an output method for obtaining, as the product, the text file indicating the result of the OCR process on the "file XYZ". FIG. 38 shows "printing", "FAX transmission" and "e-mail transmission" as the output methods and shows a state where the "printing" is selected.

Figure 39:
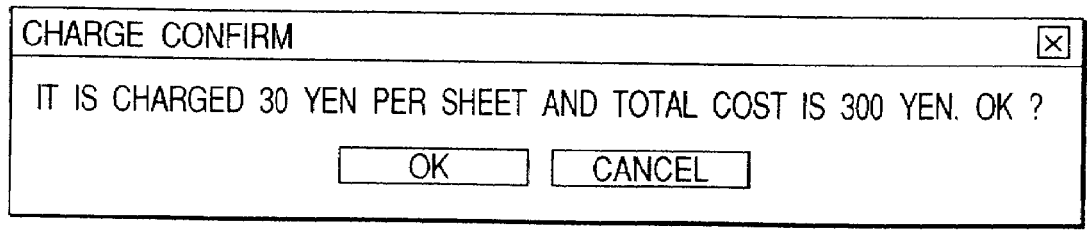

When the output method is selected in the display image shown in FIG. 38, there is displayed a fee confirming dialogue as shown in FIG. 39. This dialogue requests reconfirmation by the user for the output with the displayed fee, and, the print process of the text file is executed when the "OK" button is depressed by the user. Then the type of the executed output process ("printing" in this case) and the output log information therefor (number of prints, size of print sheet etc.) are informed to the add-up server 52 through the application server 50 or 51.

The content of such information includes "print", "FAX transmission", "e-mail transmission", "file retrieval" etc. as the types of the output process and "number of prints", "number of transmissions", "file size" etc. as the output log information therefor.

Figure 40:
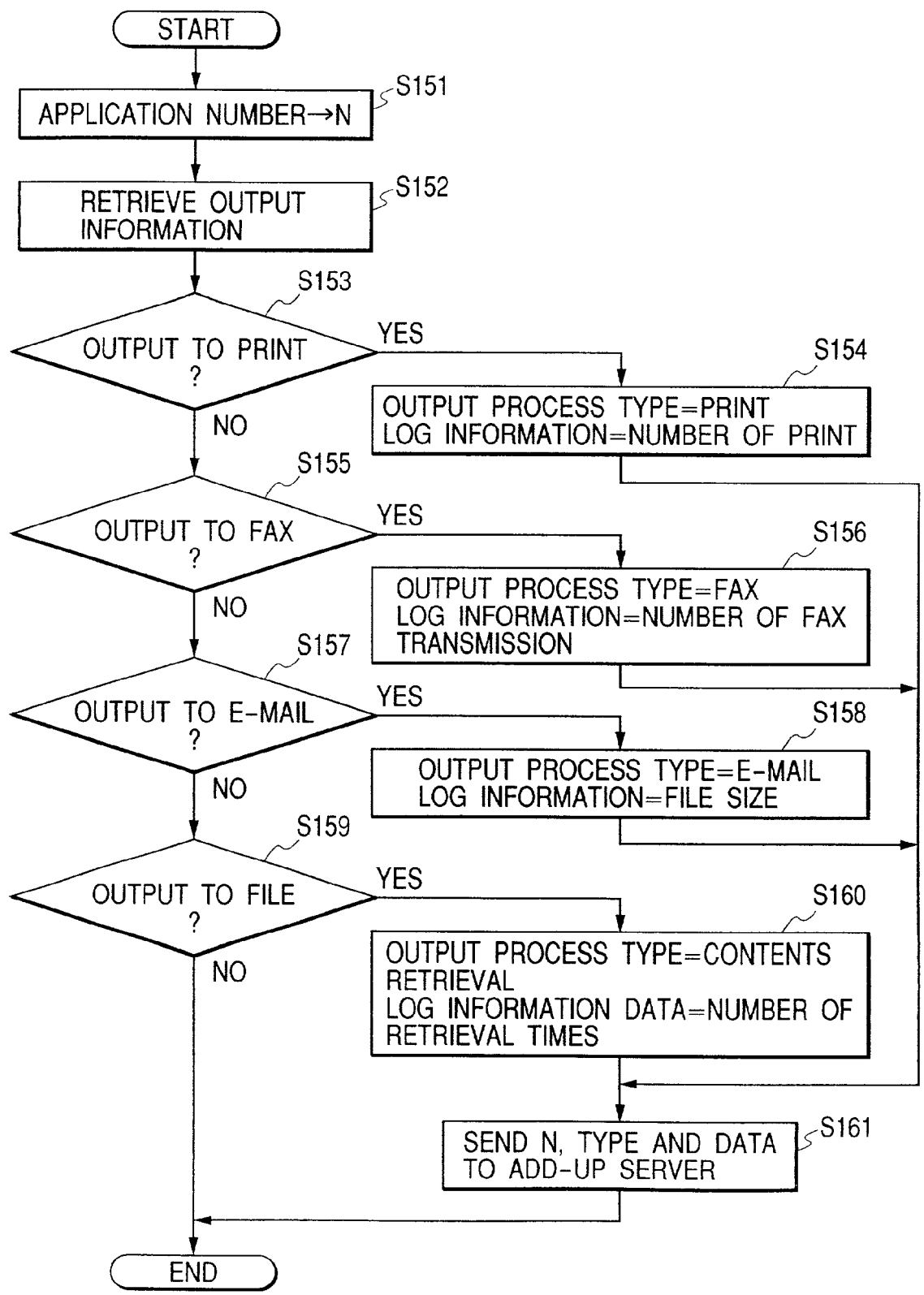
FIG. 40 is a flow chart showing an operation of transmitting output process information from the application server to the add-up server in the application charging system of the present invention.

In the following there will be explained, with reference to a flow chart shown in FIG. 40, the above-mentioned log information transmitting operation from the application servers 50, 51 to the add-up server 52.

At first the application server 50 enters, into the add-up server 52, an application number for identifying the type of the application (S151), and the application server 50 obtains the output information (S152).

In a step S153, the application server 50 discriminates whether the output process is "printing", based on the output information obtained in the step S152. If "printing" (Yes), the sequence proceeds to a step S154, but, if not (No), the sequence proceeds to a step S155.

In a step S154, the application server 50 sets "printing" as the type of the output process and "print number" as the log information, and then the sequence proceeds to a step S161.

In a step S155, the application server 50 discriminates whether the output process is "FAX transmission", based on the output information obtained in the step S152. If "FAX transmission" (Yes), the sequence proceeds to a step S156, but, if not (No), the sequence proceeds to a step S157.

In a step S156, the application server 50 sets "FAX transmission" as the type of the output process and "FAX transmission number" as the log information, and then the sequence proceeds to a step S161.

In a step S157, the application server 50 discriminates whether the output process is "e-mail transmission", based on the output information obtained in the step S152. If "e-mail transmission" (Yes), the sequence proceeds to a step S158, but, if not (No), the sequence proceeds to a step S159.

In a step S158, the application server 50 sets "e-mail transmission" as the type of the output process and "file size" as the log information, and then the sequence proceeds to a step S161.

In a step S159, the application server 50 discriminates whether the output process is "contents retrieval" (file retrieved as electronic data), based on the output information obtained in the step S152. If "contents retrieval" (Yes), the sequence proceeds to a step S160, but, if not (No), the sequence is terminated.

In a step S160, the application server 50 sets "contents retrieval" as the type of the output process and "retrieval number" as the log information, and then the sequence proceeds to a step S161.

In a step S161, the application server 50 transmits, to the add-up server 52, the application number N of the application used in the preparation of the file to be outputted and the output process type and the log information set in the foregoing steps.

In this manner the output process type (printing, FAX transmission, e-mail transmission or file retrieval) and the log information (print number, FAX transmission number, file size or file retrieval number) are informed from the application server 50 or 51 to the add-up server 52.

Figure 41:
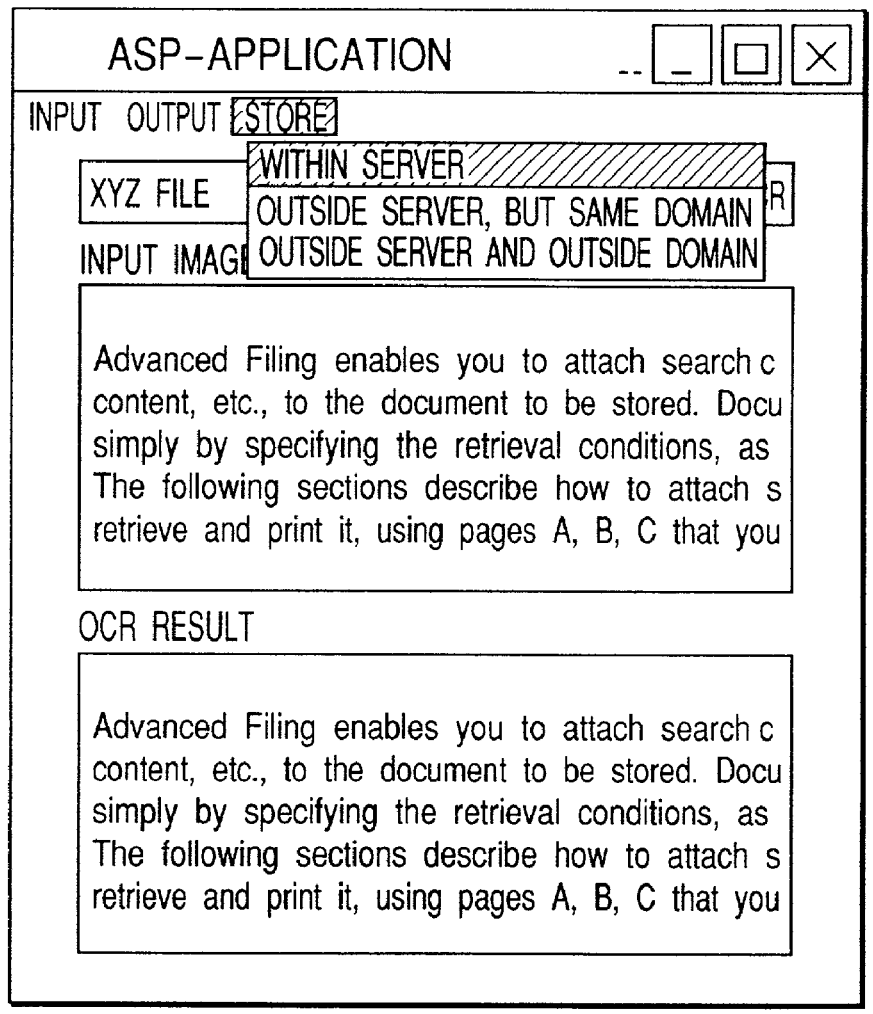
FIGS. 41 and 42 are schematic view showing a UI image displayed on a user terminal to be used in the application charging system of the present invention.

Also it is possible to store the file prepared with the application B, by selecting, as shown in FIG. 41, the destination of storage ("within server", "outside server but same domain" or outside server and "outside domain") in a "storage" menu.

Figure 42:
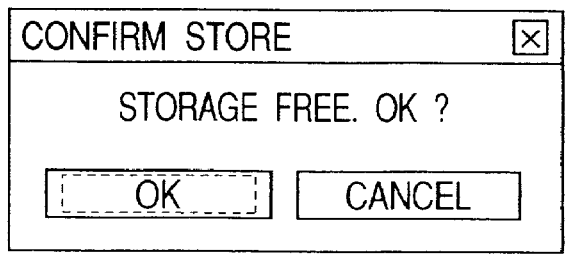

In case the file is not outputted but merely stored, the fee for the use of the application is not charged, so that there is displayed a dialog indicating that the storage is charge free, as shown in FIG. 42. Though the storage within the server is charge free, but the fee for the use of the application may be charged in case the storage is executed outside the server.

For example, in case the storage "outside the server but same domain" is selected, the file may be taken out from the application server 50 for any amount of printing. Therefore, the storage in such case is equivalent to the "contents retrieval", and the fee for the use of the application may be charged. However, for the "contents retrieval" in the same domain as shown in FIG. 24B, the fee may be calculated according to the discount charge table. For the storage "outside server and outside domain", the fee is calculated according to the standard charge table FIG. 24A, instead of the discount charge table FIG. 24B. Such fee is calculated according to the flow chart in FIG. 28B.

Also after the file is stored for free of charge, such file may be subjected to a subsequent file operation and outputted as a product such as printing which is subject of a fee. In such case, in order to avoid a situation where the output process is executed by another application and the fee for the foregoing use of the application B becomes zero, information indicating the use of the application B is stored, at the storage of the file, in "application information of file 1" shown in FIG. 43. The "application information of file 1" may record a plurality of the used applications.

Figure 43:
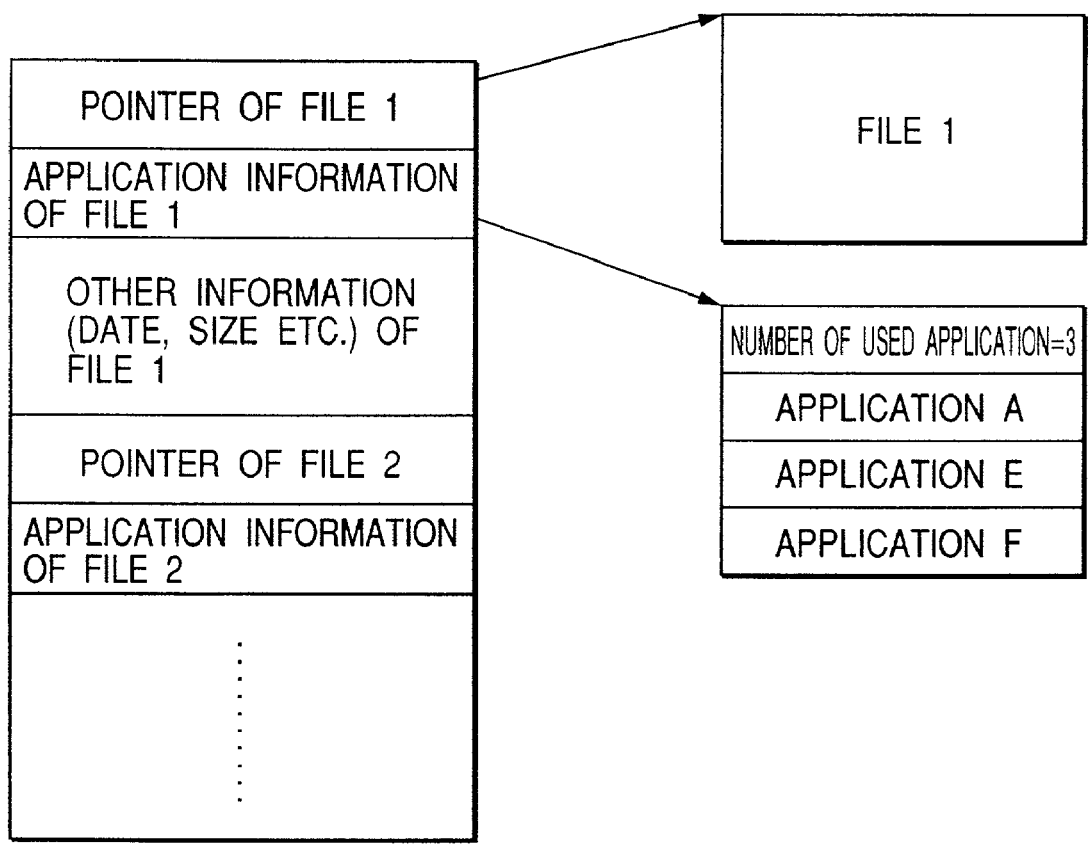
FIG. 43 is a view showing the concept of file management information in a file prepared in the application charging system of the present invention.

FIG. 43 conceptually shows the file management information in case plural applications are used in preparing the file.

As shown in FIG. 43, the application server 50 stores the pointer of each file and the application information thereof in a directory, as the file management information. The file can be referred to by the file pointer. The application information stores the number of the used applications, the types thereof etc.

In the present embodiment, as explained in the foregoing, even in a system in which the application server function storing the applications and the add-up server function for adding the status of use of the applications are provided separately, the fee for the use of the application can be charged when a product is obtained for the file prepared using the application, so that there can be advantages similar to those in the foregoing first embodiment.

[Third Embodiment] [OCR Process]

In the following there will be explained a third embodiment of the application charging system of the present invention.

In the present embodiment, the MFP 3 has the application server function and the add-up server function. Also the data to be processed by the application are image data read by a scanner of the MFP 3. Also, the fee is not charged unless the application is not used.

Figure 44:
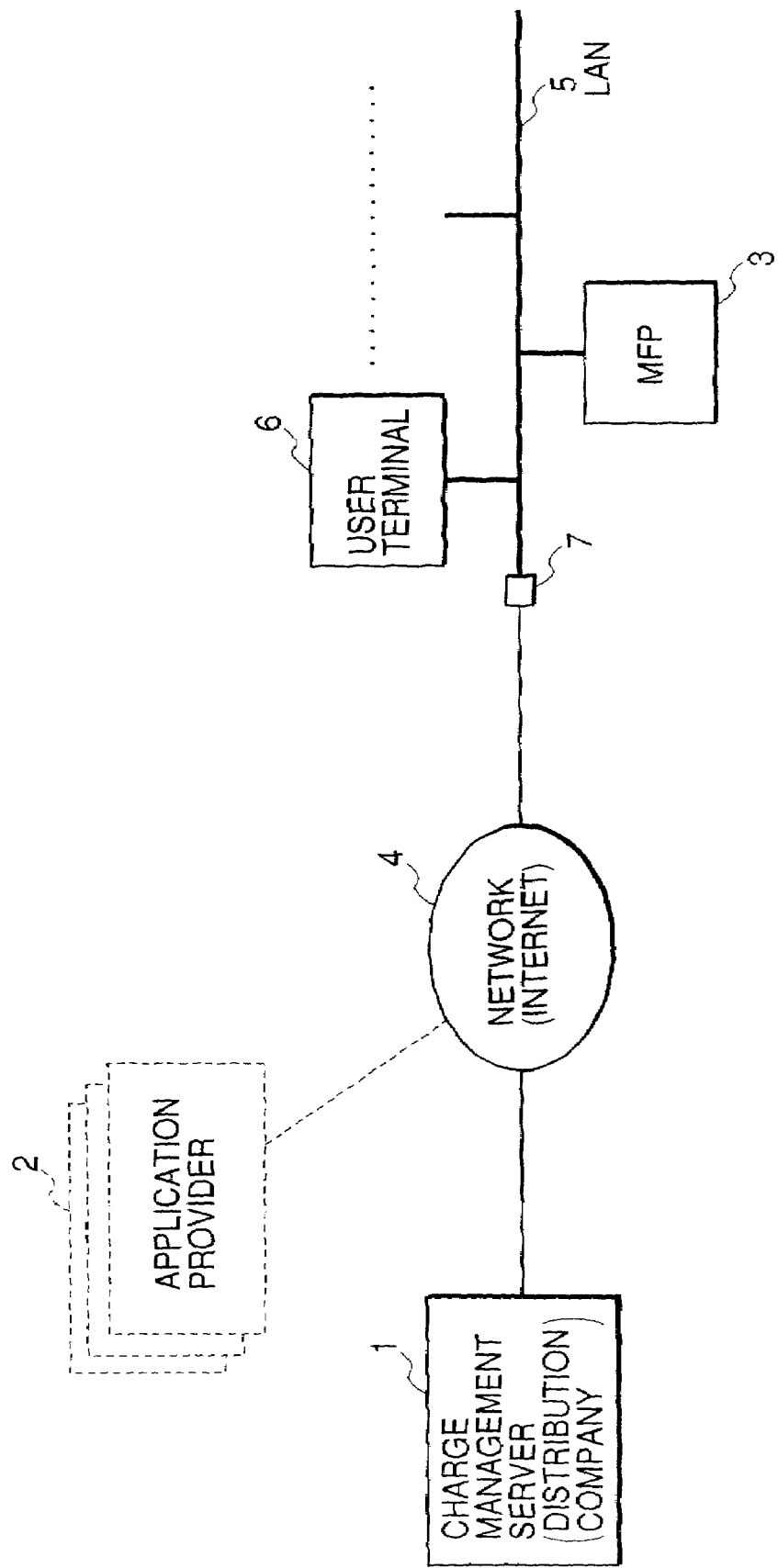
FIG. 44 is a view showing the system configuration of an application charging system of the present invention.

Now the entire configuration of the present embodiment will be explained with reference to FIG. 44 showing the system configuration.

An MFP 3 is connected to a LAN 5, through which it is connected to a user terminal 6. As the LAN 5 is connected to a network (Internet) 4 through a router 7, the MFP 3 can be connected to the exterior.

The MFP 3 need not necessarily connected to the external network. In such case, however, the charge information has to be transmitted to the distribution company by other means such as modem, through a telephone line or the like.

In the present embodiment, the MFP 3 with a scanner is similar in the external view to that shown in FIG. 9. However, it is further provided therein with devices achieving the application server function and the add-up server function such as a CPU and an HD, which are respectively connected to the network.

Figure 45:
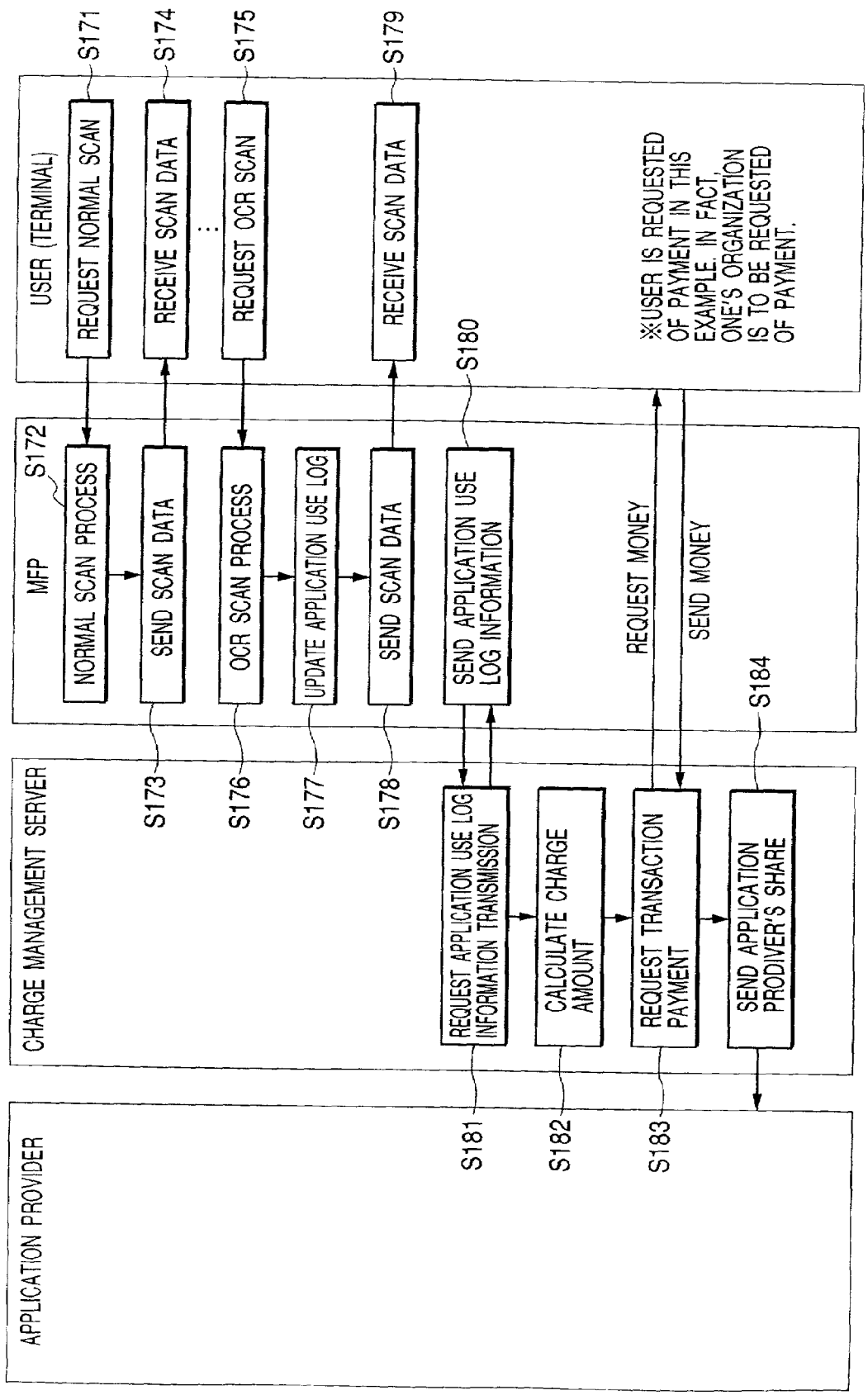
FIG. 45 is a view showing the operation sequence of the application charging system of the present invention.

In the following there will be explained the function of the present embodiment with reference to a sequency chart shown in FIG. 45, showing a case of executing an OCR process on the image data entered by scanning.

At first the user terminal 6 sends a request for normal scan to the MFP 3 (S171).

In response to the request from the user terminal 6 in the step S171, the MFP 3 executes normal scan process (S172) and the obtained scan data to the user terminal (S173). The user terminal 6 receives the scan data transmitted from the MFP 3 in the step S173 (S174).

Then the user terminal 6 outputs, to the MFP 3, an OCR scan request for the scan data received in the step S174 (S175). In response to the request from the user terminal 6 in the step S175, the MFP 3 executes an OCR scan process (S176), then renews the application use log (S177) and transmits a file, obtained by the OCR process on the scan data, to the user terminal 6 (S178). The user terminal 6 receives the file transmitted from the MFP 3 in the step S178 (S179).

Then, in response to a request for transmitting the application use log information from the charge management server 1 (S181), the MFP 3 transmits the application use log, renewed in the step S177, to the charge management server 1 (S181).

Based on the application use log information received from the MFP 3, the charge management server 1 calculates the application use fee (S182), and, based on the application use fee calculated in the step S182, transmits a request for payment to the user terminal 6 (S183). It is also possible to calculate the fee amount not for each user but for each organization to which plural users belong in the step S182 and to transmit, in the step S183, the request for payment for such organization.

Also the charge management server 1 calculates the share of the application provider 2, providing the application of OCR process, within the application use fee and transmits such share to the application provider (S184).

FIG. 46 shows a charge table to be employed by the charge management server 1 of the present embodiment. In the charge table shown in FIG. 46, there is shown a fee per impression for each type of the application. For example, the fee per impression is 0 Yen in case the type of application is normal scan, but is 100 Yen in case of OCR.

FIG. 47 shows the application use log employed in the present embodiment, showing the number of scan impressions for each type of the application. For example, there are shown 335 impressions for the normal scan and 258 impressions for the OCR process.

FIG. 48 shows a charge breakdown table employed in the present embodiment. In the example shown in FIG. 48, the fee is 0 Yen for the normal scan because the fee is not generated therefor, but the total amount is displayed for each of other applications because the application use fees are generated for such other applications.

In the following there will be explained the images displayed on the user terminal 6, with reference to schematic views shown in FIGS. 49 to 51.

Figure 49:
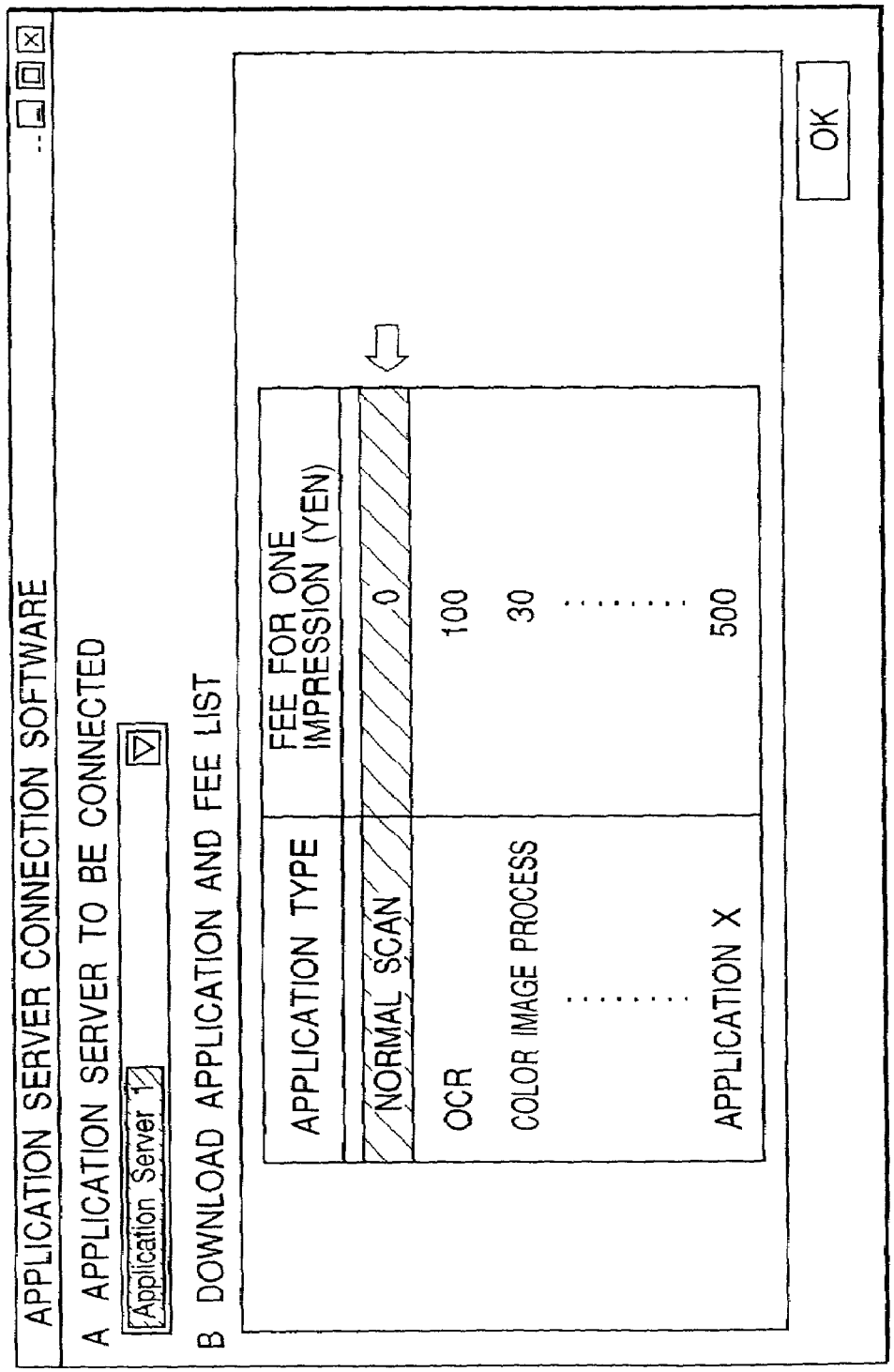
FIGS. 49, 50 and 51 are schematic views showing a UI image displayed on a user terminal to be used in the application charging system of the present invention.

FIG. 49 shows a UI of an application downloading software functioning on the user terminal 6. Based on the application downloaded by such software, the user terminal 6 can instruct the MFP 3 to scan the original, anc can transmit the scanned image data to the user terminal 6.

The image shown in FIG. 49 also serves to present, to the user, a list of fees for the original scanning by the MFP 3 and for receiving a product including an added value by applying the application to the image data obtained by such scanning.

FIG. 49 shows a state in which the "normal scan" in the first row is selected. In the system of the present embodiment, the "normal scan" process is set as charge free because no added value is included.

On the other hand, the "OCR" process is charged with a fee of 100 Yen because an added value is attached to the result of the scanning. Also the "color image process" is charged with a fee of 30 Yen.

Figure 50:
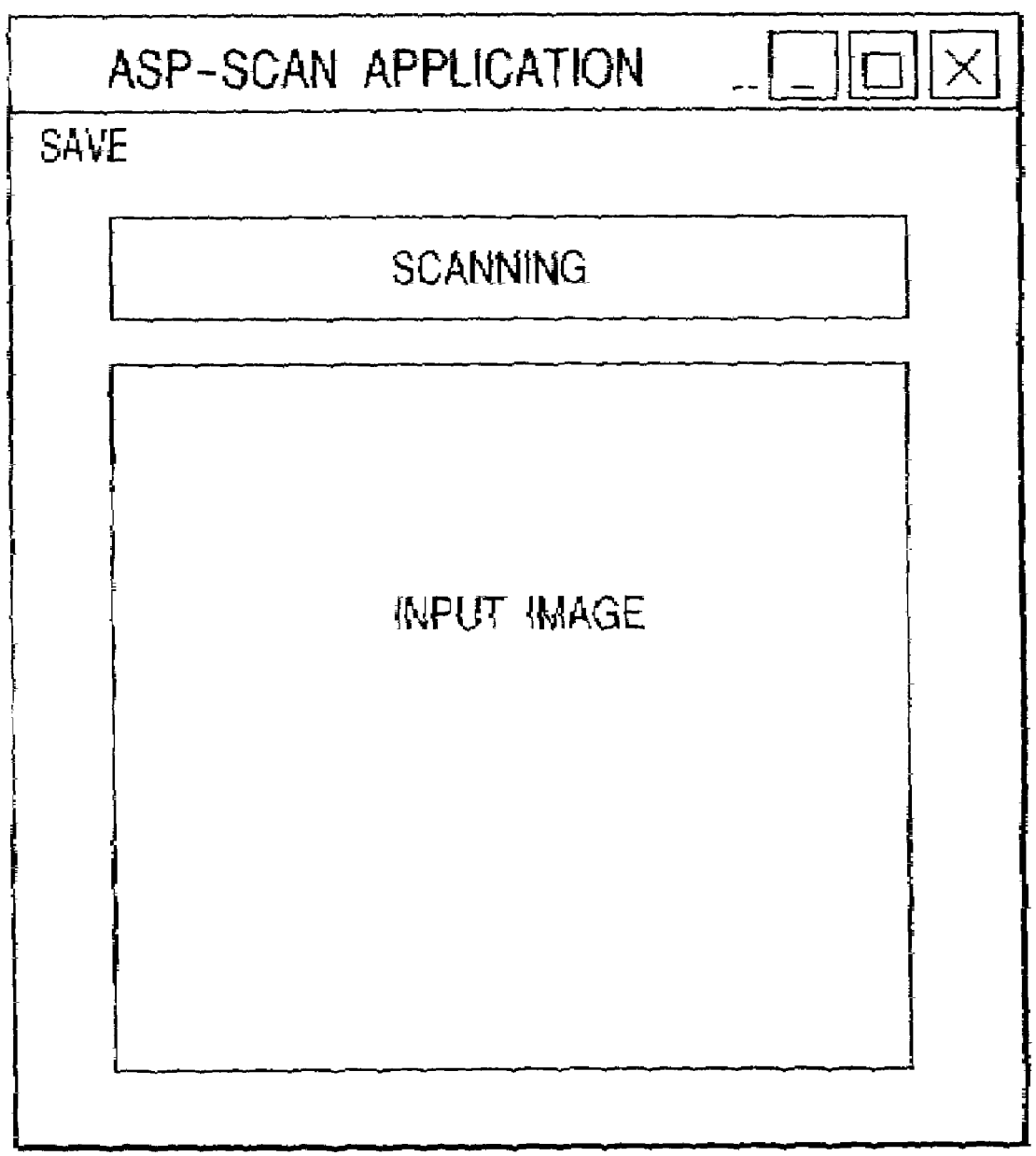

FIG. 50 shows an image for executing an application for the "normal scan" process, downloaded by the application downloading software. The MFP 3 executes scanning in response to the depression of a "SCAN" button.

The result of scanning can be stored in an arbitrary location by selecting the destination of storage in a "store" menu bar.

At this point, the application use log is recorded in the add-up server function through the application server function present in the MFP 3, and the stored result of the scanning is transmitted to the user terminal 6.

Figure 51:
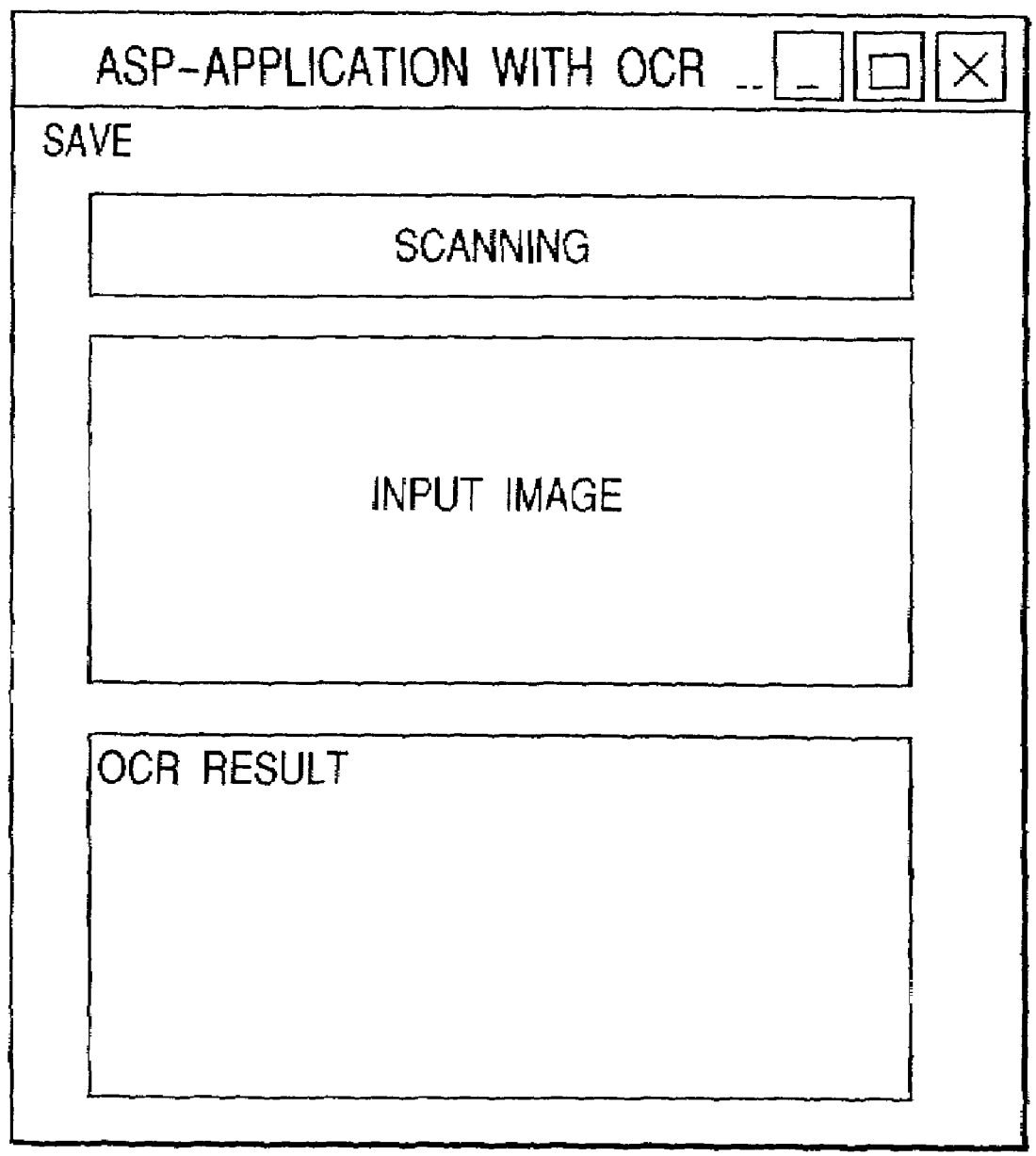

FIG. 51 shows an image for executing the "OCR scan". This operation is different from the "normal scan" explained in the foregoing, in that a fee is charged in the transmission of the result of scanning to the user terminal 6.

In the present embodiment, as explained in the foregoing, the fee for the use of the application is made free of charge for the execution of the "normal scan" in the MFP 3, but fees are charged on the image data scanned with certain applications such as "OCR scan" or "color image scan process". In this manner the fee is charged for the product utilizing the application, as in the foregoing first and second embodiments, and the user can pay the charge in reasonable manner.

[Fourth Embodiment]

In this embodiment, there will be explained, with reference to the accompanying drawings, a system in which charged is a fee variable according to the time zone in which the product is obtained, in the configurations of the foregoing embodiments.

At first reference is made to FIG. 52 for explaining a charge table to be employed in the present embodiment. The charge table in FIG. 52 shows application use fees variable depending on the time zone in which the file prepared with the application is outputted. Such application use fee also includes the fee for the normal output process.

In the example shown in FIG. 52, in case of the normal print process for the file not employing the fee-bearing application, the application use fee per sheet is 8 Yen in a time zone from 8 to 17 hours, 6 Yen from 17 to 22 hours and 4 Yen from 22 to 8 hours. Also in case of the print process for the file prepared with the application A, the application use fee per sheet is 15 Yen from 8 to 17 hours, 12 Yen from 17 to 22 hours and 8 Yen from 22 to 8 hours.

Figure 53:
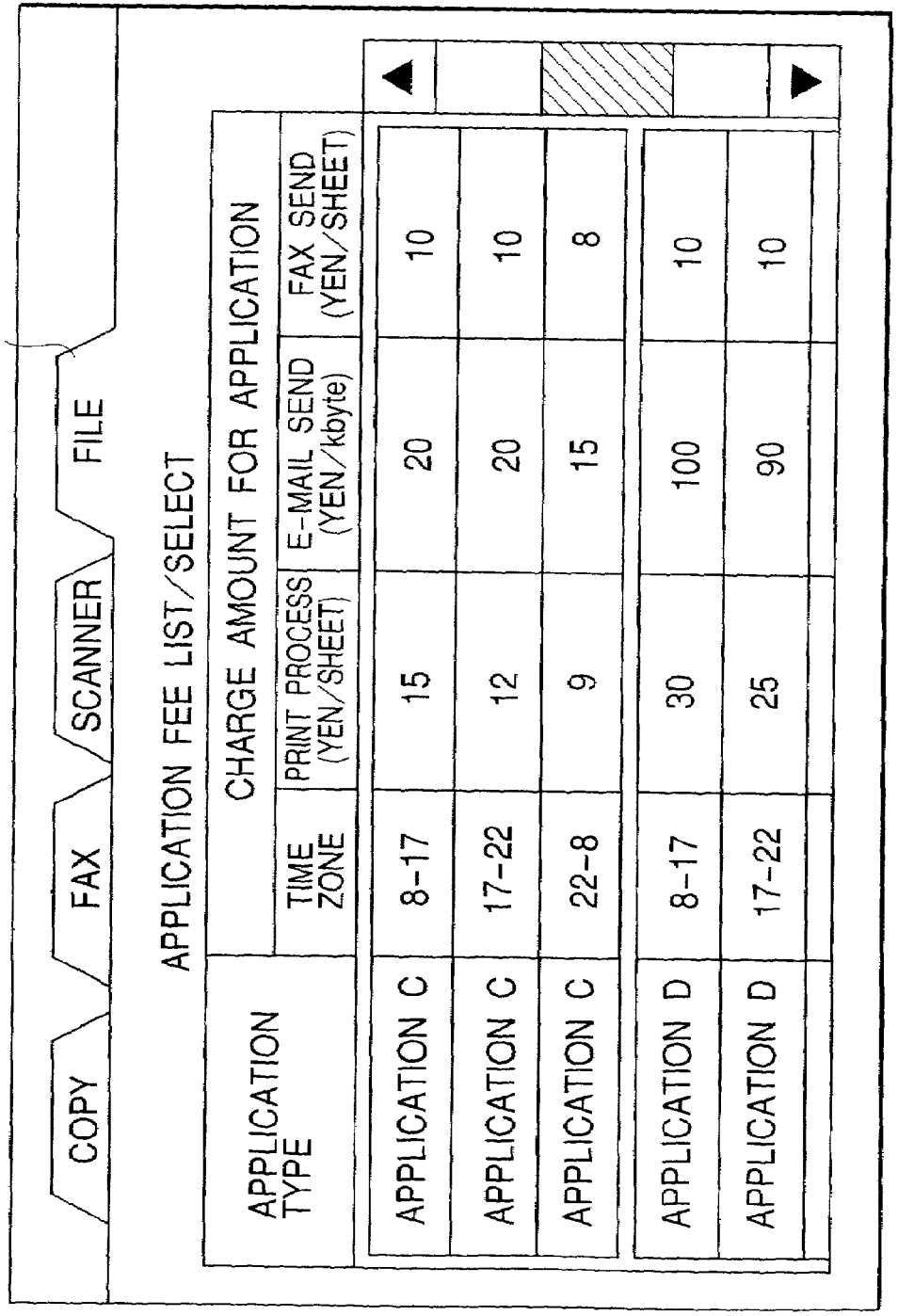
Figure 54:
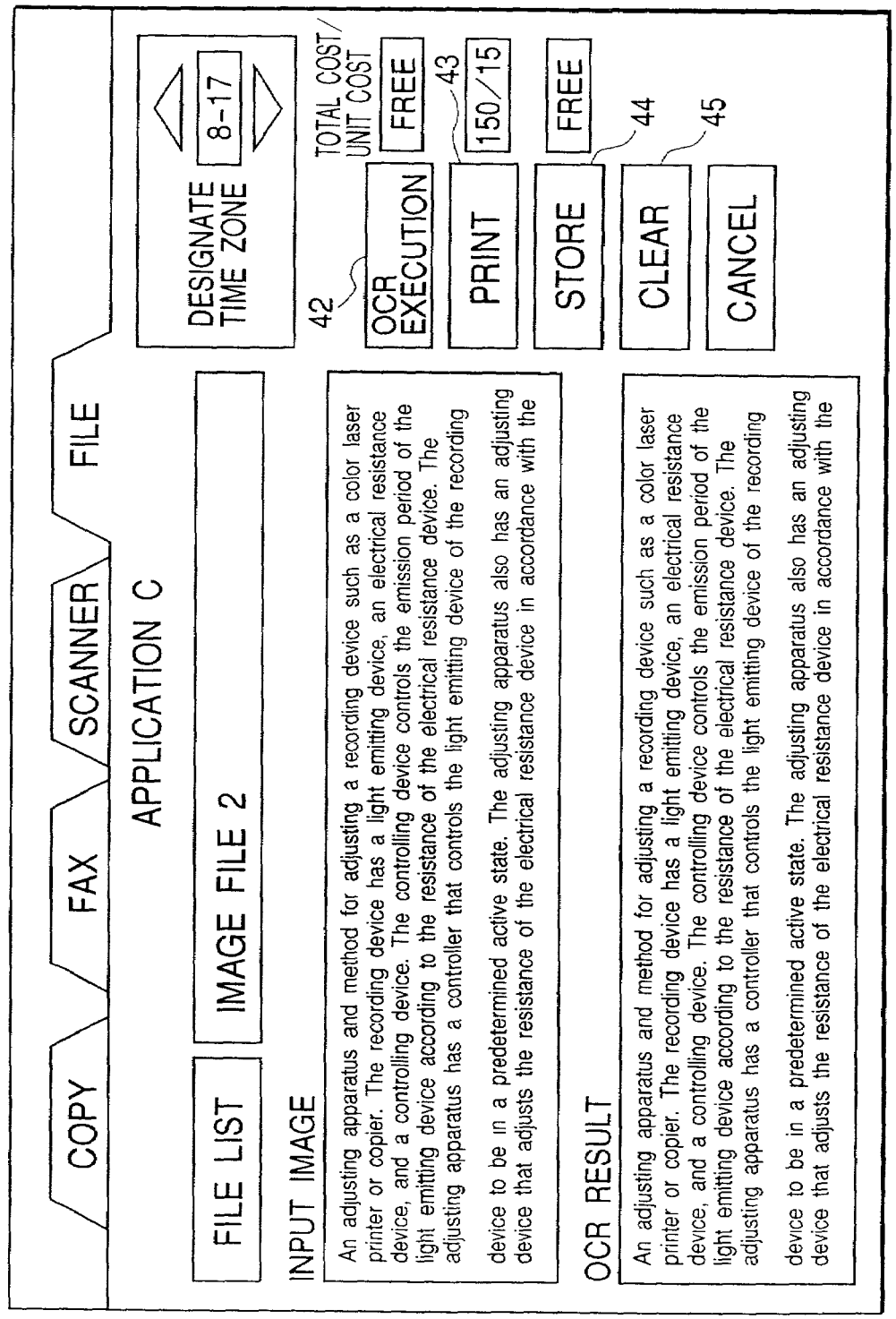
Figure 55:
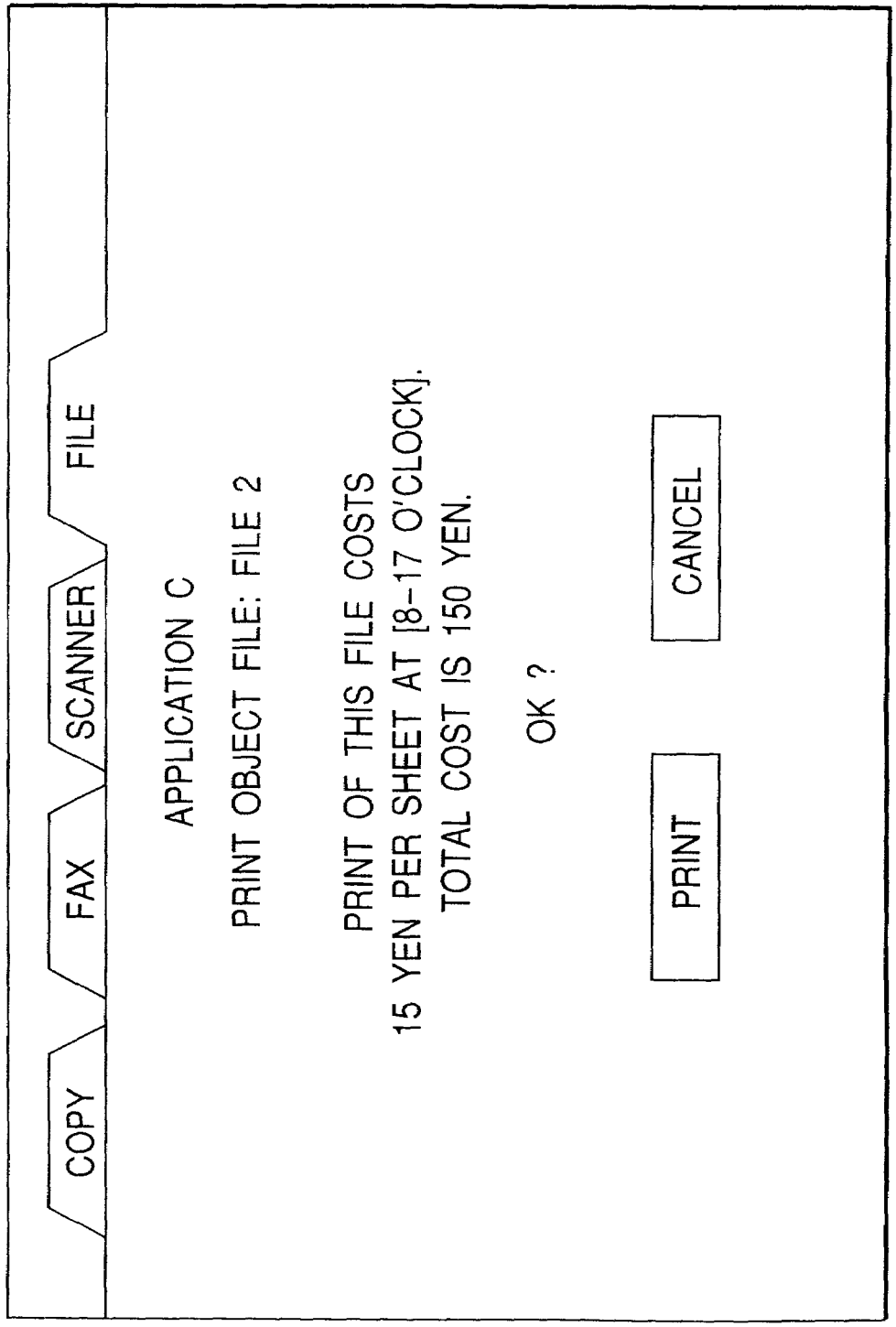

The charge table in FIG. 52 is displayed in a UI as shown in FIG. 53 on the operation panel of the user termianl 6 or the MFP 3. When the user selects the application C providing the OCR function on the display image as shown in FIG. 53, the display is shifted to a state as shown in FIGS. 13 and 14, and, in response to the operations same as in the foregoing embodiments, the result of the OCR process is displayed in the OCR result display field as shown in FIG. 54. In the present embodiment, the application use fee is not generated by the OCR process only. Consequently the user can repeat the OCR process by repeating the file designation any number of times without worrying about the application use fee. In FIG. 54, the user can designate the time zone for executing the output process. When the user touches the print button 43 in FIG. 54, the touch panel image is shifted to a state shown in FIG. 55, displaying the name of the used application, the name of the processed file and the time zone designated for the output process.

FIG. 56 shows an application use log stored in the MFP 3, storing, for each application, the time zone in which the output process is executed for the file prepared with the application (used time zone) and the output log (print number). Such application use log is valid for a predetermined period (for example one month), and is erased after the charging process.

The example in FIG. 56 shows that the normal print process for the file not employing the fee-bearing application has been executed for 3501 sheets in the time zone from 8 to 17 hours, 205 sheets from 17 to 22 hours and 115 sheets from 22 to 8 hours. Also the print process for the file prepared with the application A has been executed for 335 sheets from 8 to 17 hours, 20 sheets from 17 to 22 hours and 11 sheets from 22 to 8 hours.

FIG. 57 shows the application use fee calculated from the charge table shown in FIG. 52 and the application use log shown in FIG. 56. The application use fee includes the cost of the output process to be paid to the distribution company 1 for executing the sales, management and maintenance of the MFP 3, and the cost of the application to be paid to the application provider 2 providing the application. In the example in FIG. 57, the total amount of the print process executed in the time zone from 8 to 17 hours for the file prepared not employing the fee-bearing application is 28008 Yen, which does not include the application cost but is solely composed of the cost of the output process, so that the share of the distribution company is 28008 Yen. Also the total amount of the print process executed from 8 to 17 hours for the file prepared with application A is 5025 Yen, consisting of a share of the distribution company (cost of print process) of 2680 Yen and a share of the provider (cost of application) of 2345 Yen.

The present embodiment may also adopt a charge table as shown in FIGS. 58A and 58B, in which the fee is variable depending on the application, time zone and output process. The fee may also be made variable depending on the destination of the output.

In the charge tables shown in FIGS. 58A and 58B, the fee is different depending on whether the output process is printing, e-mail transmission, FAX transmission or contents retrieval (prepared file being retrieved in the electronic data). In case plural applications are used for preparing a file, there are charged fees in overlapping manner. The fee is also different depending on the time zone in which the output process for the file is executed. FIGS. 58A and 58B shows a standard charge table and a discount charge table, in which the fees are lower in the latter than in the former. In this manner, it is not necessary to employ a fixed charge table but plural charge tables may be selectively employed to adapt the charge system to various conditions such as the destination of the output.

FIG. 59 shows an application use log to be employed for the charge tables shown in FIGS. 58A and 58B. The example in FIG. 59 indicates that a user with a user ID 0001 has executed, in the time zone from 8 to 17 hours, for the file prepared with the application A, the print process for 102 sheets, e-mail transmission for 42 kbytes and FAX transmission for 13 sheets.

In the present embodiment, processes similar to those in the foregoing embodiments are executed with the charge tables shown in FIGS. 52 and 58 and the application use log shown in FIG. 56 or 59, and the application use fee is charged according to the use of the application in preparing the file, the output process for such file and the time zone of such output process.

The present embodiment employs a charge table as shown in FIG. 60, in case the application is applied to the image data read by the scanner of the MFP 3.

The charge table shown in FIG. 60 shows the application use fee per impression for each type of the application. For example, the fee per impression for the normal scan without employing the application is 0 Yen regardles of the time zone, but that with the OCR application is 100 Yen in the time zone from 8 to 17 hours, 80 Yen from 17 to 22 hours and 60 Yen from 22 to 8 hours.

FIG. 61 shows an application use log to be employed in case of using the charge table shown in FIG. 60. FIG. 61 shows the number of scan impressions for each type of application and each time zone of output process (used time zone). For example, it indicates that, in the time zone from 8 to 17 hours, the normal scan without the application has been executed for 335 impressions and the process employing the OCR application has been executed for 258 impression in the same time zone.

FIG. 62 shows the application use fee calculated from the charge table shown in FIG. 60 and the application use log shown in FIG. 61. FIG. 62 indicates that the application use fee is not generated in the normal scan not employing the application but is generated in a process utilizing an application, depending on the time zone of the output process (used time zone).

In the following there will be explained, with reference to the drawings, a configuration in which an observation device for monitoring the state of use of the network or the output device is attached to the system of the above-described embodiment.

Figure 63:
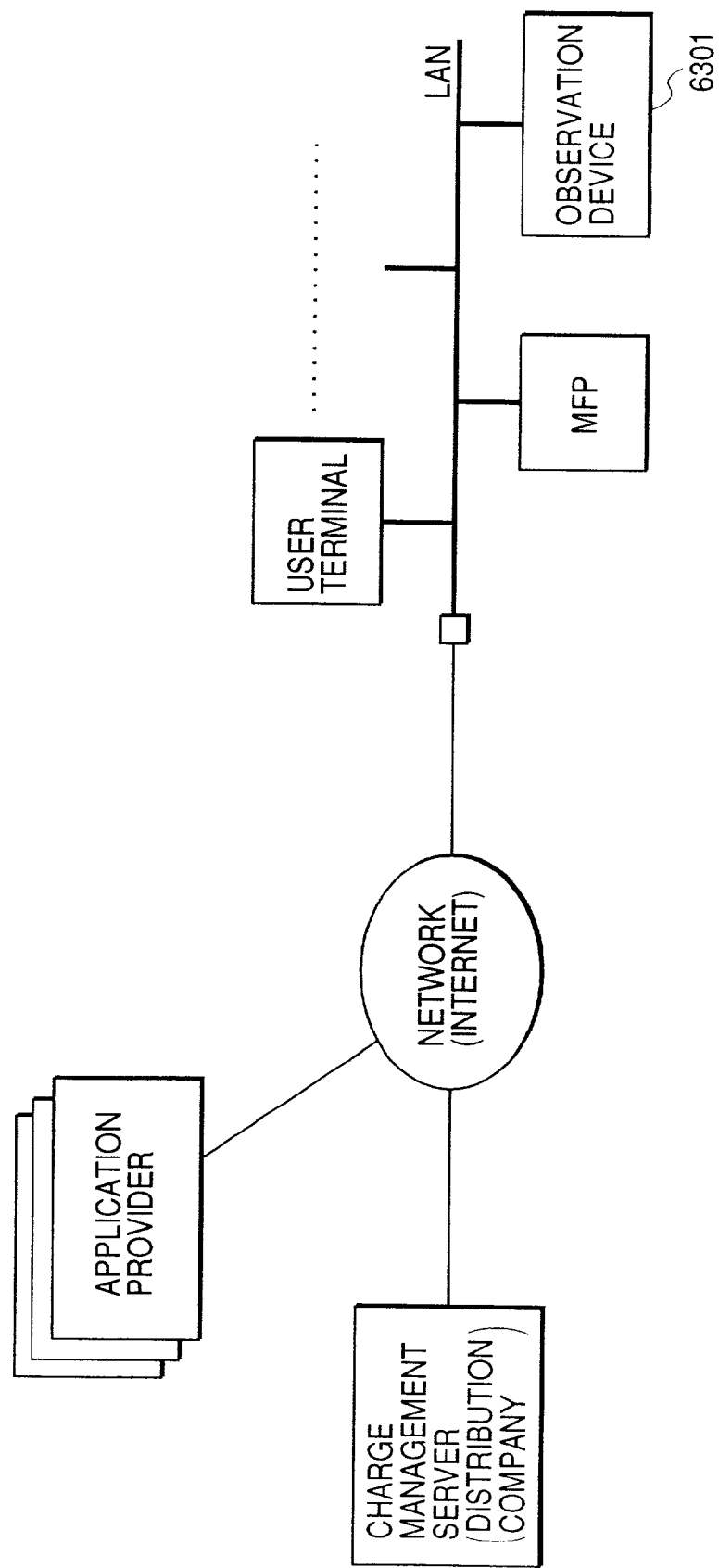
FIG. 63 is a view showing the system configuration of an application charging system of the present invention.

In a configuration shown in FIG. 63, an observation device 6301 is connected to the LAN 5 in the system of the above-described embodiment. The observation device 6301 monitors the status of use of the network 4 and the output devices such as the MFP 3, printer 54, scanner 55 and FAX 56, and transmits such status of use to the MFP 3.

Based on the status of use transmitted from the observation device, the MFP 3 can execute the designated output process in a time zone of a lower frequency of use.

Figure 64:
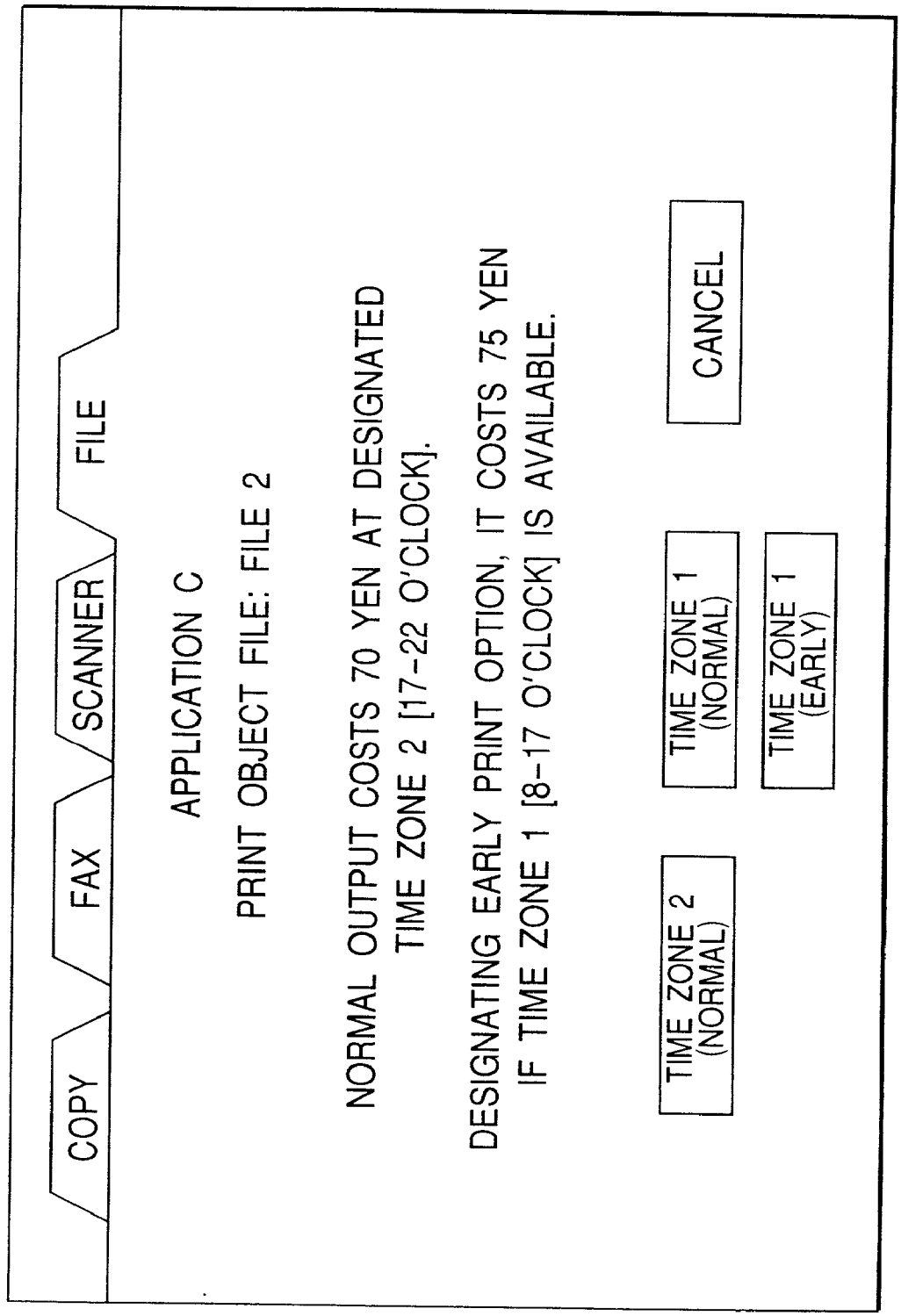
FIG. 64 is a schematic view showing a touch panel image displayed on an operation panel of an MFP to be used in the application charging system of the present invention.

Also in case the user designates the time zone for the output process as shown in FIG. 64, the MFP 3 suspends the output process until the designated time zone, but there may also be selected an "early output option" in which the output process is executed in a time zone earlier than the designated time zone if a vacancy is present in the status of use.

In the example shown in FIG. 64, for the output process of the file prepared with application B, the standard fee is 80 Yen for a time zone 1 (8 to 17 hours) and 70 Yen for a time zone 2 (17 to 22 hours), and, with the "early output option", the output is executed earlier if the use in the time zone 1 (8 to 17 hours) is limited, with a fee of 75 Yen. Such fee setting allows to avoid the deterioration of the system performance by the contentration of the file output process in a time zone of lower fee, thereby achieving effective utilization of the entire system.

In the present embodiment, as explained in the foregoing, in case a file is prepared using an application, the fee for the use of such application is calculated and charged according to the result (product) of the output process for the file and to the time zone of the output process. Thus the user can pay a reasonable charge according to the obtained product and the used time zone. Also the system providing such output service, in case the output process is concentrated in certain time zones, can collect the fees corresponding to the load for such output process.

[Fifth Embodiment]

In the present embodiment there will be explained, with reference to the drawings, a system in which the fee is charged according to the date and time at which the product is obtained, in the configuration of the foregoing embodiment. The fee corresponding to the date and time at which the product is obtained means that the discount rate is set according to the day of the week or the time zone at which the product is obtained.

In the present embodiment, the aforementioned application use log shown in FIG. 26 further stores the date and time of the output process for the file prepared with the application.

Figure 65:
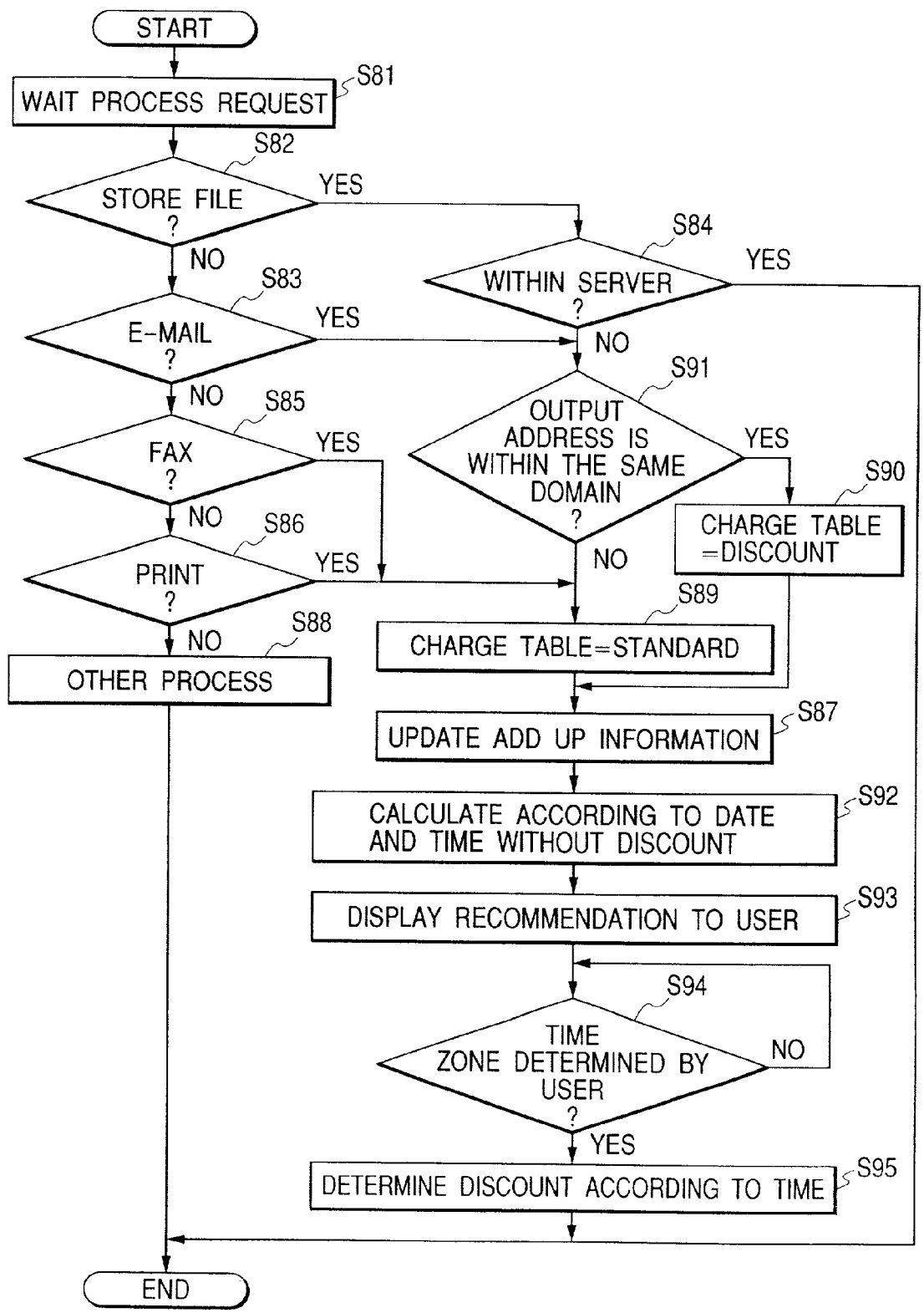
FIG. 65 is a flow chart showing an operation for calculating the application use fee in the application charging system of the present invention.

Now reference is made to a flow chart in FIG. 65 for explaining the calculating operation for the application use fee by the add-up server 52 in the system of the present embodiment. However, in the flow chart shown in FIG. 65, steps of numbers same as those in the flow chart in FIG. 28B are same in operation. Therefore, the following description will be made solely on steps S92 to S95 which are different in functions from those in the flow chart in FIG. 28B.

In a step S92, the add-up server 52 obtains the current date and time and calculates the application use fee in case the output process is executed currently.

The application use fee is calculated by calculating the discount rate therefor, based on discount rates by time zones as shown in in FIG. 66A and those by day of the week as shown in FIG. 66B. For example, if the current date and time are "14:30 hours, Tuesday", the time zone in in FIG. 66A is type "A" type without discount and the day of the week in FIG. 66B is "a" type without discount. Therefore, the discount is not applied for "14:30 hours, Tuesday".

On the other hand, for example for "19:00 hours, Saturday", the time zone in FIG. 66A is "B" type with a discount rate of 20% and the day of the week in FIG. 66B is "c" type with a discount rate of 30%, so that a total discount rate of 44% is applicable.

A step S93 displays a charge selecting image as shown in FIG. 67, for presenting the application use fees and the discount rates depending on the date and time of the output process thereby causing the user to execute selection. As the candidates of the date and time to be displayed in this operation, there may be displayed, for example, the application use fee in case the output process is executed currently and appropriately selected examples of dates and times with large discount rates.

As the discount is applied according to the date and time of the output process as explained in the foregoing, the user not having particular date and time for designation or not requiring urgent output can set the output process at date and time of a lower fee with a large discount rate.

A step S94 discriminates whether the date and time have been selected by the user in the step S93, and, if selected, the sequence proceeds to a step S95.

A step S95 executes the charging process, applying a discount to the application use fee based on the date and time selected by the user. The date and time selected by the user are stored in the application use log.

In the present embodiment, as explained in the foregoing, in case a file is prepared using an application, the fee for the use of such application is calculated according to the result (product) of the output process for such file, and is charged with a discount rate according to the date and time of the output process. Therefore the user can pay a reasonable fee according to the obtained product and according to the date and time of output. Also the system providing such output service, in case the output process is concentrated in certain date and time, can collect the charge corresponding to such load.

[Sixth Embodiment]

In the present embodiment there will be explained, with reference to the drawings, a system in which the fee for use the of the application is discounted according to the application provider providing such application, in the configurations of the foregoing embodiments.

FIG. 68 shows a charge table to be used in the system of the present embodiment, in which the application use fees are classified into a "basic application" and "sub applications" according to the state of use thereof.

The "basic application" means, within a group of applications used for preparing a file and within the pages constituting the prints obtained by printing such file:
(1) an application of the highest page occupancy rate;
(2) in case application (1) of the highest page occupancy rate is present in plurality at the same time, an application with the highest use fee per sheet of print; or
(3) in case the use fee in (2) is same in plural applications, an arbitrary one of such applications.

Also sub applications means all applications other than the basic application in the group of applications used for preparing the file.

For example, among the plural applications used for preparing a file to be printed, if an application A provided by an application provider "X company" becomes the basic application according to the above-described definition, all other applications used for the preparation of such file become the sub applications. Then, if the sub applications are provided from the "X company" providing the basic application, a discount is applied to the use fees for such sub applications. Thus, FIG. 68 shows that the use fee for the sub application is discounted if it is provided by an application provider same as that for the basic application. For example, if the application A of the "X company" is the basic application, discount fees are set for the applications B and C provided by the same "X company" if they become sub applications.

The basic application and the sub application are identified, as will be explained later in more details, according to information recorded in a temporary log for each file to be explained later.

FIG. 69 shows an application use log stored in the MFP 3 and recording the output log such as printer number for each used application. The application use log records the output log within a predetermined period (for example one month), and the output log is erased after the corresponding charging process.

In the application use log shown in FIG. 69, the output log is recorded separately for a case where each application is used as the basic application and a case where it is used as the sub application. In case of use as the sub application, the output log of the application is recorded for each basic application. More specifically, the example shown i FIG. 69 indicates that the print number in case the "normal print" is used as the basic application is 3180 sheets and in case the "application A" is used as the basic applicatiion is 1442 sheets. Also in case the application A is used as the basic application, the print number with the application used as the sub application is 31 sheets.

In the following there will be explained, with reference to a flow chart shown in FIG. 70, a renewing operation for the application use log by the MFP 3.

At first, in a step S201, the MFP 3 discriminates whether a recording sheet bearing an image thereon has been discharged. If not discharged (No), the sequence enters a sheet discharge awaiting state, but, if discharged (Yes), the sequence proceeds to a step S202.

In a step S202, the MFP 3 discriminates whether the discharged sheet is an output from an application.

If the step S202 identifies that the sheet discharge is not from the application (No), the MFP 3 in a step S7001 renews the "print number" of the "normal print" in a temporary log, which temporarily stores the information on the output process.

On the other hand, if the step S202 identifies that the sheet discharge is from the application (Yes), the MFP 3 in a step S203 obtains, from the application, the application number N for identifying the application.

In a step S7002, the MFP 3 stores, in the temporary log, the "print number" of an "application type" corresponding to the application number N obtained in the step S203.

After the process in the step S7001 or S7002, the MFP 3 discriminates, in a step S7003, whether the print process has been completed for all the pages. If not completed, the sequence proceeds to the step S201, but, if completed, the sequence proceeds to a step S7004.

In a step S7004, the MFP 3 extracts the types of the basic application and the sub applications from the information recorded in the temporary log in the steps S7001 and S7002.

In a step S7005, the MFP 3 renews the application use log based on the content of the temporary log, for each basic application or sub application, extracted in the step S7004.

FIG. 71 shows a table indicating the application use fees, calculated from the charge table in FIG. 68 and the application use log in FIG. 69 and summed for each basic or sub application. The application use fee shown in FIG. 71 is calculated, for each "application type", by multiplying the "fee per sheet" in the charge table (FIG. 68) with the "print number" in the application use log (FIG. 69) for each column.

FIG. 72 shows a table indicating the sum of the print numbers for each application type, without separating the basic application and the sub application. The information recorded in this table is merely an intermediate product for generating the final charge information and is not indispensable in realizing the present invention, but is introduced for the purpose of simplifying the calculation and the description.

Figure 70:
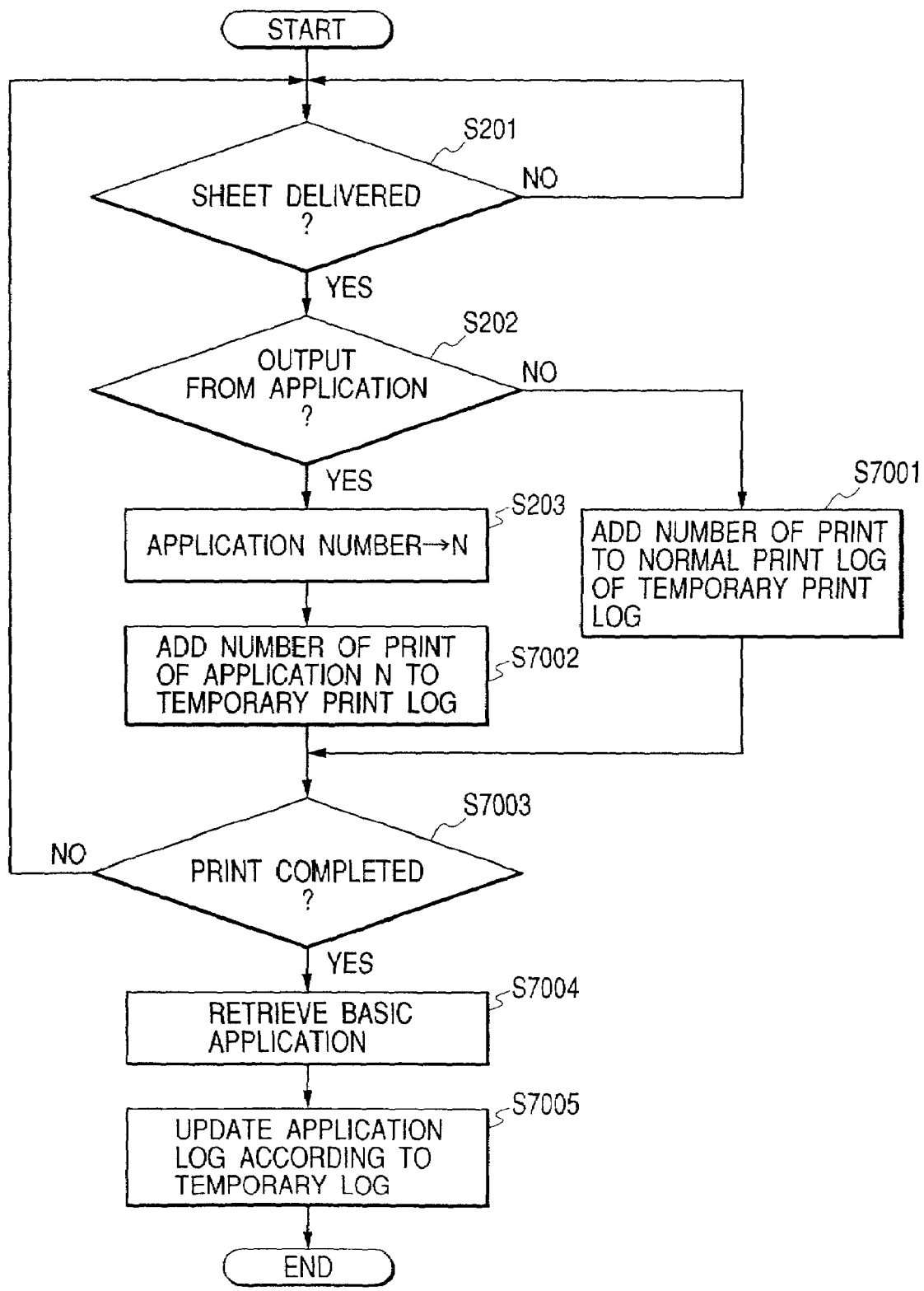
FIG. 70 is a flow chart showing an operation for renewing the application use log to be used in the application charging system of the present invention.

FIG. 73 shows a table indicating the sum of the charge amount for each application type, summed from the result of calculation of the application charge amount shown in FIG. 70, without separating the basic application and the sub application. As in the case of FIG. 72, the information recorded in this table is merely an intermediate product for generating the final charge information and is not indispensable in realizing the present invention, but is introduced for the purpose of simplifying the calculation and the description.

FIG. 74 shows a table indicating the result of calculation of the application use fee derived from the charge table in FIG. 68 and the information recorded in the tables shown in FIGS. 72 and 73. In FIG. 74, the "share of the distribution company" is a charge applicable for the normal print process and to be paid to the distribution company executing the sales, management and maintenance of the MFP 3, while the "provider's share" is the cost of the application to be paid to the ASP 2 after the deduction of the share of the distribution company from the application use fee. In the table shown in FIG. 74, values are stored according to the information in the table shown in FIG. 73.

Figure 75:
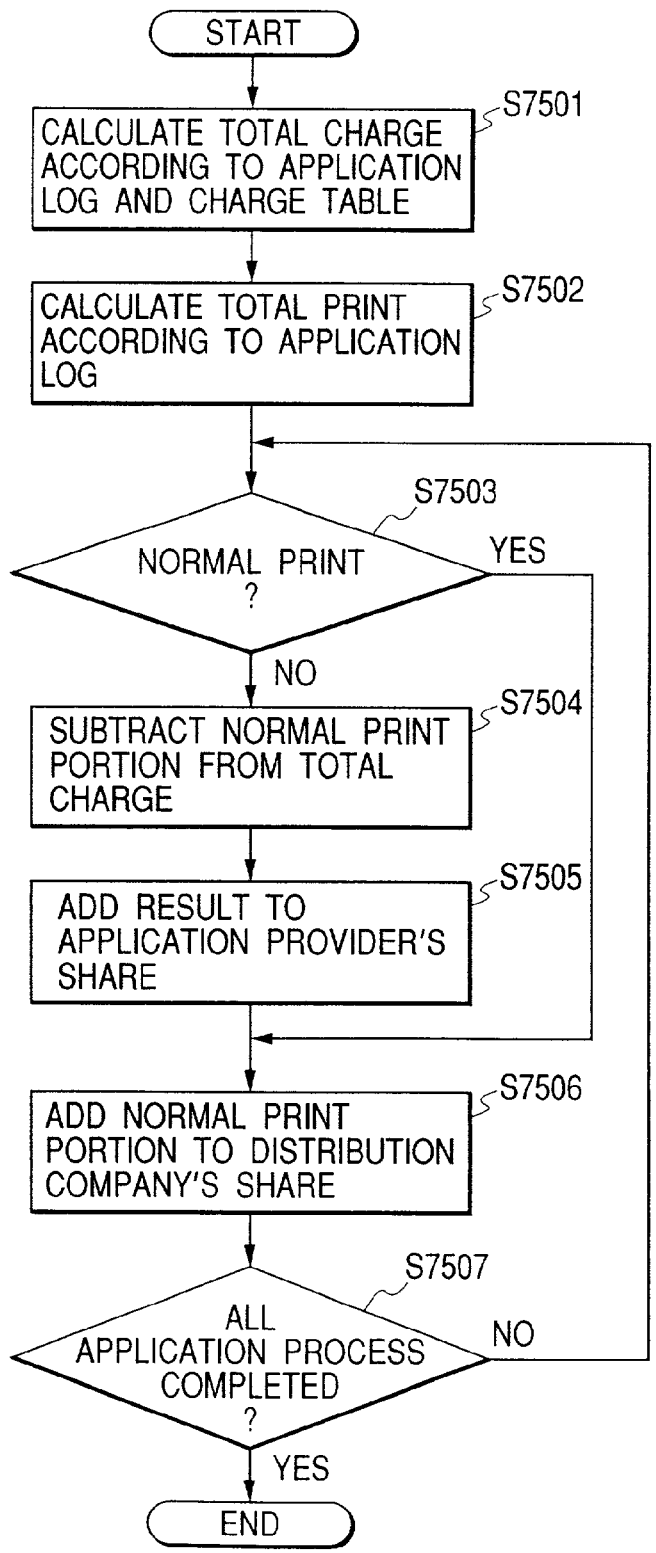
FIG. 75 is a flow chart showing an operation for calculating the application use fee in the application charging system of the present invention.

In the following there will be explained the method of calculating the application use fee shown in the table in FIG. 74, with reference to a flow chart shown in FIG. 75.

At first, based on the application use log, the add-up server 52 sums the table shown in FIG. 72 in a step S7501, and also sums the table shown in FIG. 73 in a step S7502. The subsequent steps are executed for each application, based on these tables.

At first, in a step S7503, the add-up serer 52 discriminates whether the output is the "normal print" not utilizing the application. If the normal print" is identified (Yes) in the step S7503, the sequence proceeds to a step S7506.

If the step S7503 identifies that the output is not the "normal print" (No), the add-up server 52 subtracts, in a step S7504, the fee for the normal print from the application use fee. Then the add-up server 52, in a step S7505, adds the result of subtraction in the step S7504 to the provider's share, and adds, in a step S7506, the fee for the normal print to the distribution company's share.

Then a step S7507 discriminates whether the process has been completed for all the applications. If not completed (No), the sequence proceeds to the step S7503, but, if completed (Yes), the sequence is terminated.

In the present embodiment, as explained in the foregoing, in case a file is prepared using an application, the fee for the use of such application is calculated according to the result (product) of the output process for such file, and, in case plural applications are used, the fee is calculated with a discount according to the providers of such applications for charging to the user. Therefore the user can pay a reasonable fee according to the obtained product and according to the providers of the applications. Also the provider of the applications encourages the user to use a larger number of applications by such discount.

[Seventh Embodiment]

In the present embodiment there will be explained a case where the application is supplied from a recording medium such as a CD-ROM in the system of the foregoing embodiments.

Figure 76:
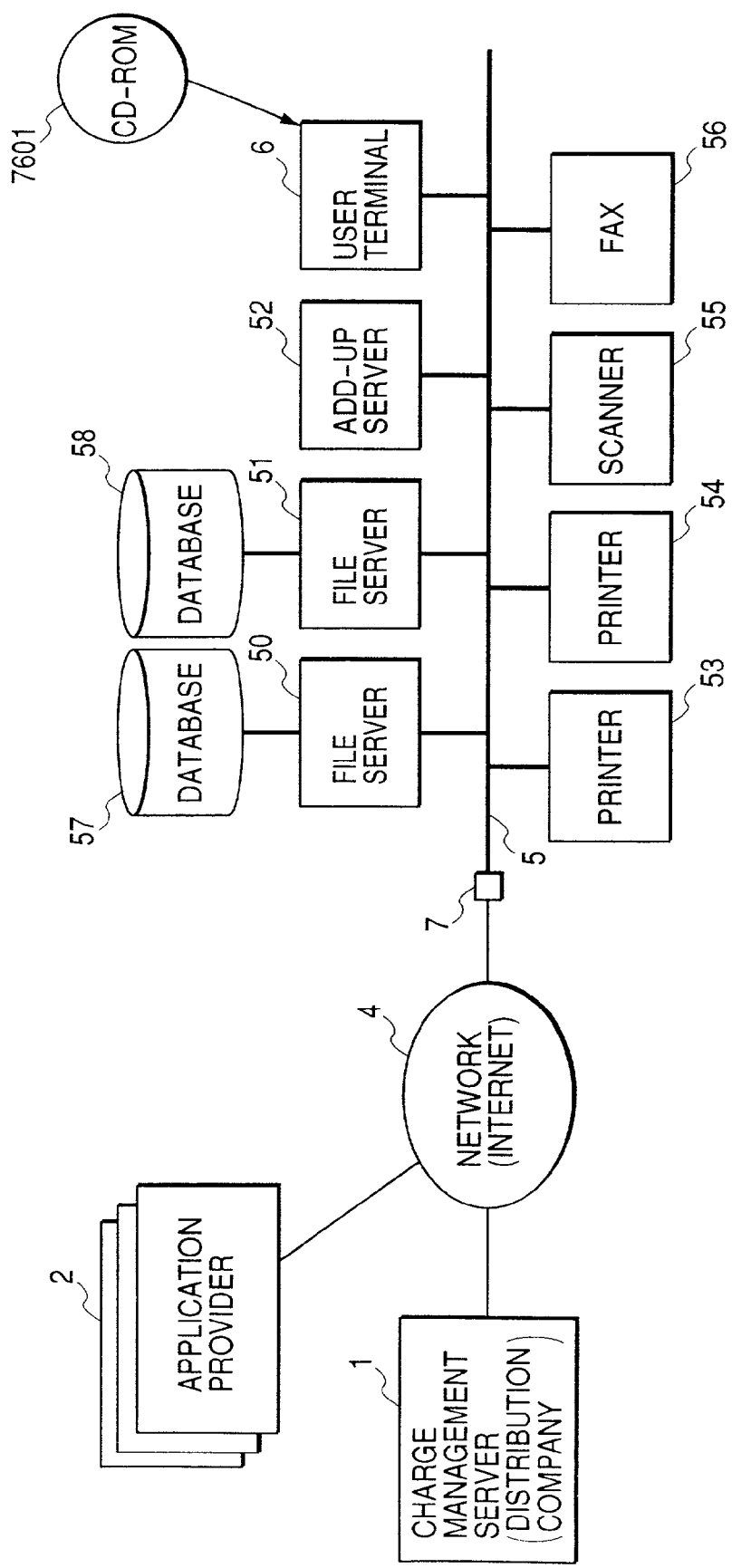
FIG. 76 is a view showing the system configuration of an application charging system of the present invention.

FIG. 76 shows the configuration of a system of the present embodiment, which is composed of the system shown in FIG. 18 and a CD-ROM 7601 storing applications. The user terminal 6 installs the applications through the CD-ROM 7601. The user terminal 6 may also obtain an application from the application provider 2 through the network 4.

The CD-ROM 7601 is merely a recording medium storing applications, which is not limited to a CD-ROM but can also be composed for example of a CD-R, a DVD-R, a CD-RW, a DVD-RAM, a DVD-RW, an MO, a floppy disk, a compact flush memory (CF), a smart media (SM), a memory stick (MS), a multimedia card, an SD memory card or a PC card (foregoing including registered trade names or trade names).

Now the function of the system of the present embodiment will be explained with reference to a sequence chart shown in FIG. 77.

Figure 77:
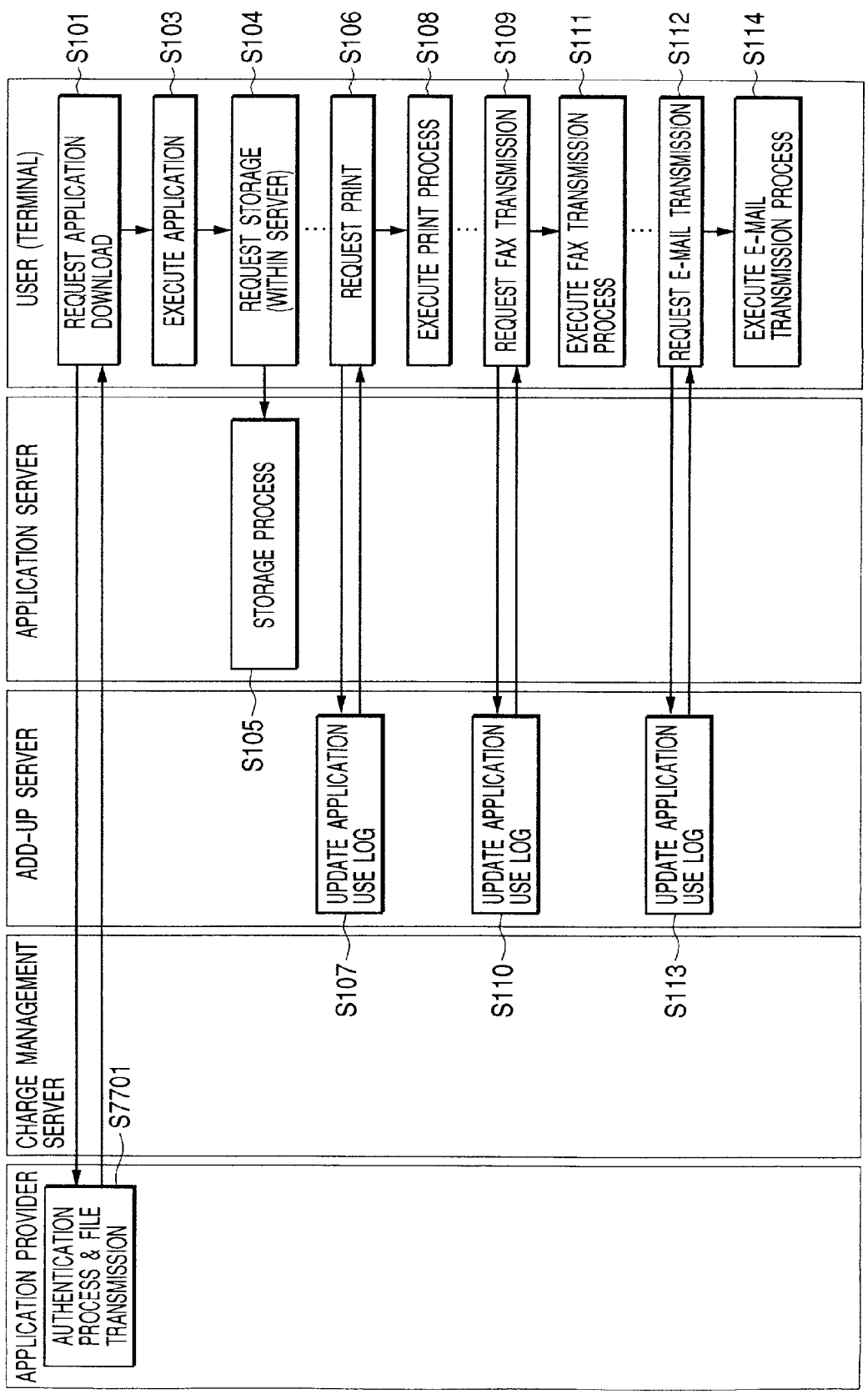
FIGS. 77 and 78 are views showing the operation sequence of the application charging system of the present invention.

In FIG. 77, since steps of numbers same as those in FIG. 29 are same in function, the following description will be made only on steps for executing different processes. Also the following description will be made on the application server 50, but the function will be same also for the application server 51.

In a step S101, as in the function in FIG. 29, the user terminal 6 request the downloading of the application through the network 4, to the application provider 2.

In a step S7701, in response to the request from the user terminal 6 in the step S101, the application provider 2 executes an authentification process for the user terminal 6. Upon completion of the authentification, the user terminal 6 downloads the application from the CD-ROM 7601. The user terminal 6 may also obtain the application from the application servers 50, 51.

The application provided from the application servers 50, 51 or from the CD-ROM 7601 can be all or a part of the applications for directly executing the processes, an application required for downloading or installing applications for use on the user terminal 6 or a combination thereof.

The authentification of the user terminal 6 by the application provider 2 through the network 4 allows to manage the use of the applications also in case the applications are locally provided for example from the CD-ROM. Also in case the applications are locally provided for example from the CD-ROM, the application use fee can be calculated according to the product, by the management of the file output process executed in the user terminal 6 by the application servers 50, 51 or by the add-up server 52.

Figure 78:
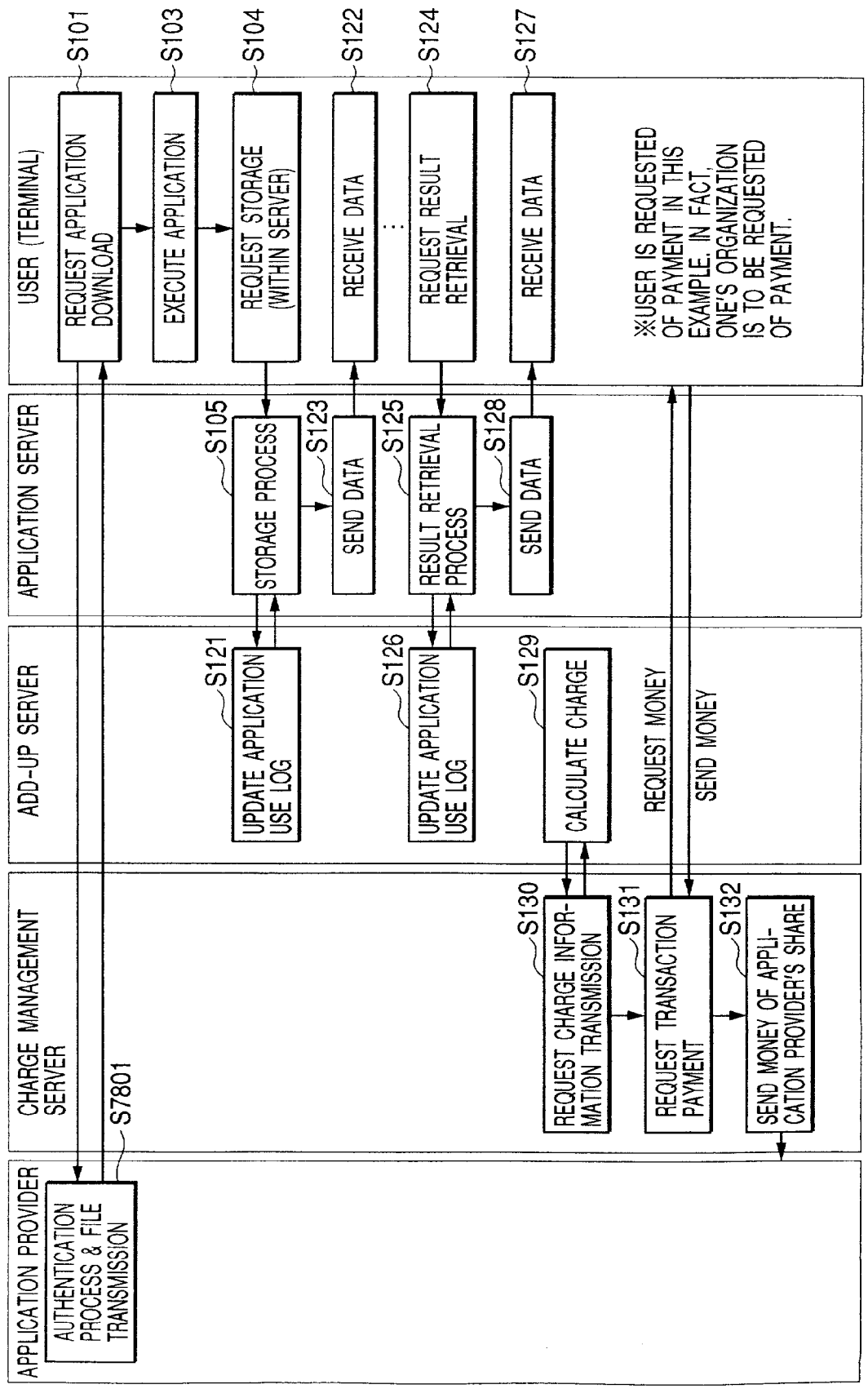

In the following there will be explained, with reference to a sequence chart shown in FIG. 78, an operation of storing the file outside the application server 50 or 51, retrieving the file, outputting the product and recovering the charge therefor, in contrast to the sequence shown in FIG. 77 in which the file is stored in the application server 50. In FIG. 78, operations are same for the steps of numbers same as those in FIG. 77 or 30.

In the following, there will be explained the UI displayed on the user terminal 6 in the present embodiment.

Figure 79:
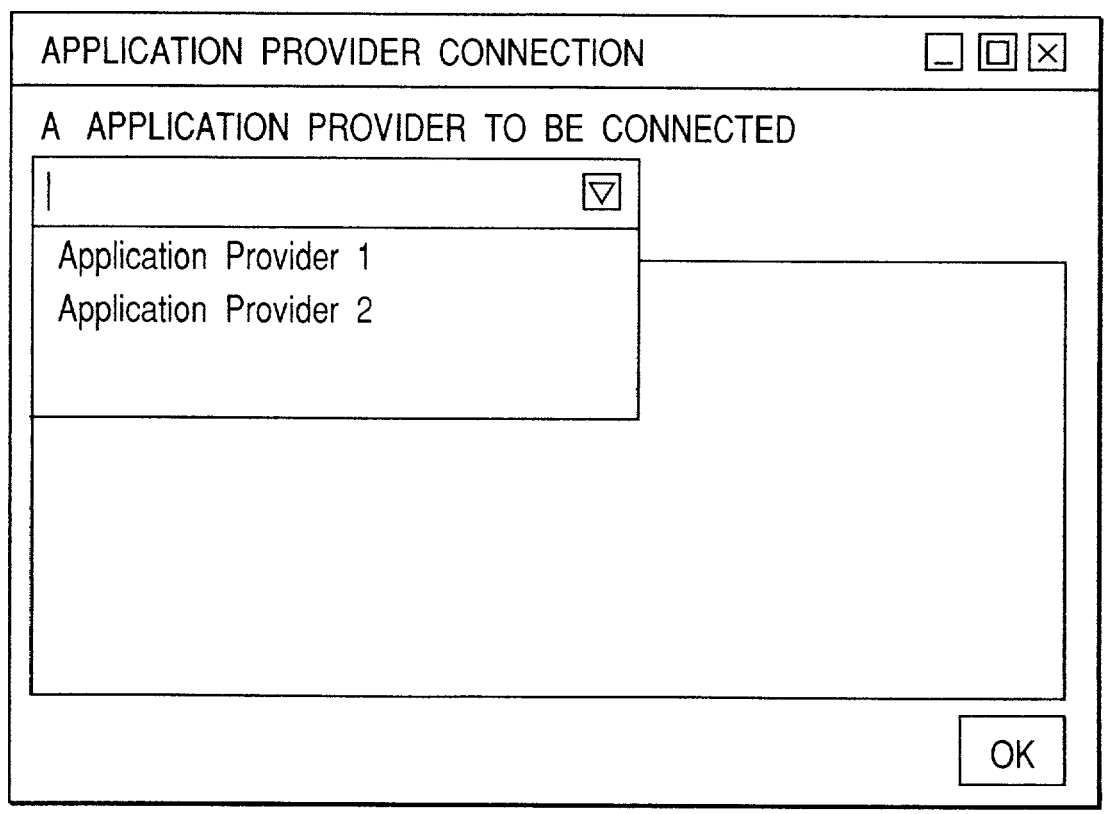

FIG. 79 shows the UI of an application downloading software functioning on the user terminal 6.

The application downloading software allows the user terminal 6 to select and download any desired application from the application provider 2. FIG. 79 shows a state of selecting the application provider 2 in the UI of the application downloading software. The application provider 2 may be selected also in case the application is locally downloaded from the recording medium such as the CD-ROM 7601.

FIG. 34 is a schematic view of a UI providing a list of the applications selectable by the user and the fees for the products outputted from the files prepared with such applications. The UI displayed in FIG. 80 allows the user to select an application matching the purpose of use and the budget. FIG. 80 shows a state in which an "application provider 1" is selected as the application provider 2 and an application B in the second row is selected as the application to be downloaded. It is shown that the fee for the product obtained with the application B is 30 Yen per sheet in case of printing, 100 Yen per kbyte in case of e-mail transmission, 10 Yen per sheet in case of FAX transmission, and 2000 Yen per time in case of content retrieval.

If satisfied with such fee, the user depresses an "OK" button in the lower right part, thereby indicating the agreement for the fee, and the user terminal 6 executes downloading of the application B. In this operation, the user ID of the user terminal is informed to the application server 50. The user ID is entered in an unrepresented log-in image, and thus entered user ID is informed to the application server 50. It is also possible to utilize the user ID entered in a log-in image of the OS (operating system) instead of the log-in image of the application downloading software.

In the present embodiment, as explained in the foregoing, the application providere can manage the product of the file prepared with the application even in case the user terminal locally downloads the application by a recording medium such as a CD-ROM, whereby the application use fee can be charged according to such product.

[Eighth Embodiment]

In the following, there will be explained an embodiment in which, at the printing process for a file prepared with an application, the application use fee is different depending on the method of the printing method (such as interruption printing or normal printing) in the configurations of the foregoing embodiments.

In the system of the present embodiment, at the request for file printing to the MFP 3 in the step S4 in the flow chart shown in FIG. 3, the user terminal 6 designated a printing method. Such printing method includes, for example, "normal printing" (without designation of printing method), "interruption printing", "slow printing", "two-side printing", and "stapled printing", but there may also included other printing methods.

In response to the print request from the user terminal 6 in the step S4, the MFP 3 judges the application used for file preparation and the printing method therefor (S5), then executes the printing process (S6) and renews the application use log (S7).

Now reference is made to FIG. 81 for explaining the charge table to be employed in the present embodiment and representing application use fees, including the printing cost and the application cost.

In FIG. 81, the fee per sheet is 8 Yen for the "normal print" without using the application, and 15 Yen in case of a printing method B for the file prepared with the application A. In the example shown in FIG. 81, the fee for "normal print" remains constant regardless of the printing method, but it may also be made different depending thereon.

The print methods can be, for example, "normal printing", "rush printing", "slow printing" etc. It is assumed that the printing method A indicates the "rush printing", the printing method B indicates the "normal printing" and the printing method X indicates the "slow printing". In the "rush printing", the printing is executed in preference to another printing job requested before, so that, for the application A, the fee per sheet is set at 30 Yen which is higher than 15 Yen for the "normal printing". On the other hand, the "slow printing" is printed after a print job designated for the "normal print" even if requested prior thereto, so that the fee per sheet is set at 10 Yen which is lower than 15 Yen for the "normal print".

The application A can be, for example, the Microsoft Word (registered trade name).

FIG. 82 shows an application use log held in the MFP 3 and recording the used application, the printing method and the number of prints in case the file prepared with such application is printed. In FIG. 82, for the "normal print", the print number is not recorded for each printing method, but such print number may also be recorded.

FIG. 82 indicates that the print number is 3501 sheets for the "normal print" in which the application is not used and the printing method is not designated, and 335 sheets for a case where the application A is used and the printing is executed with the printing method B.

In the following there will be explained a renewing operation for the application use log in the MFP 3, with reference to a flow chart shown in FIG. 83. In FIG. 82, operations are same as in FIG. 6 in steps of numbers same as those in FIG. 6, so that such same steps will be omitted from the following description.

In a step S205, the MFP 3 renews the "print number" for each of the "application type" and the "print method" corresponding to the application number N and the printing method M obtained in the step S203 of the application use log (FIG. 82), whereupon the sequence is terminated.

In the following there will be explained the UI displayed on the MFP 3. In the image shown in FIG. 84, tabs 100 representing various functions of the MFP 3 are displayed in the upper part of the image, and the user can select a desired function by touching a corresponding tab with a finger. FIG. 84 shows a state where a "file function" is selected. FIG. 84 also provides a list of the types of applications held in the MFP 3 and the fees for obtaining the products of the files prepared with such applications. FIG. 84 also shows, in case the file prepared with the application is outputted by printing as a print product, the fees for each of the "normal printing" without designating the printing method, the "priority printing" which interrupts other print jobs, and the "later printing" allowing a longer time to the output.

Such image display allows the user to select an application matching the purpose of use and the budget, by touching a virtual button with a finger.

Figure 85:
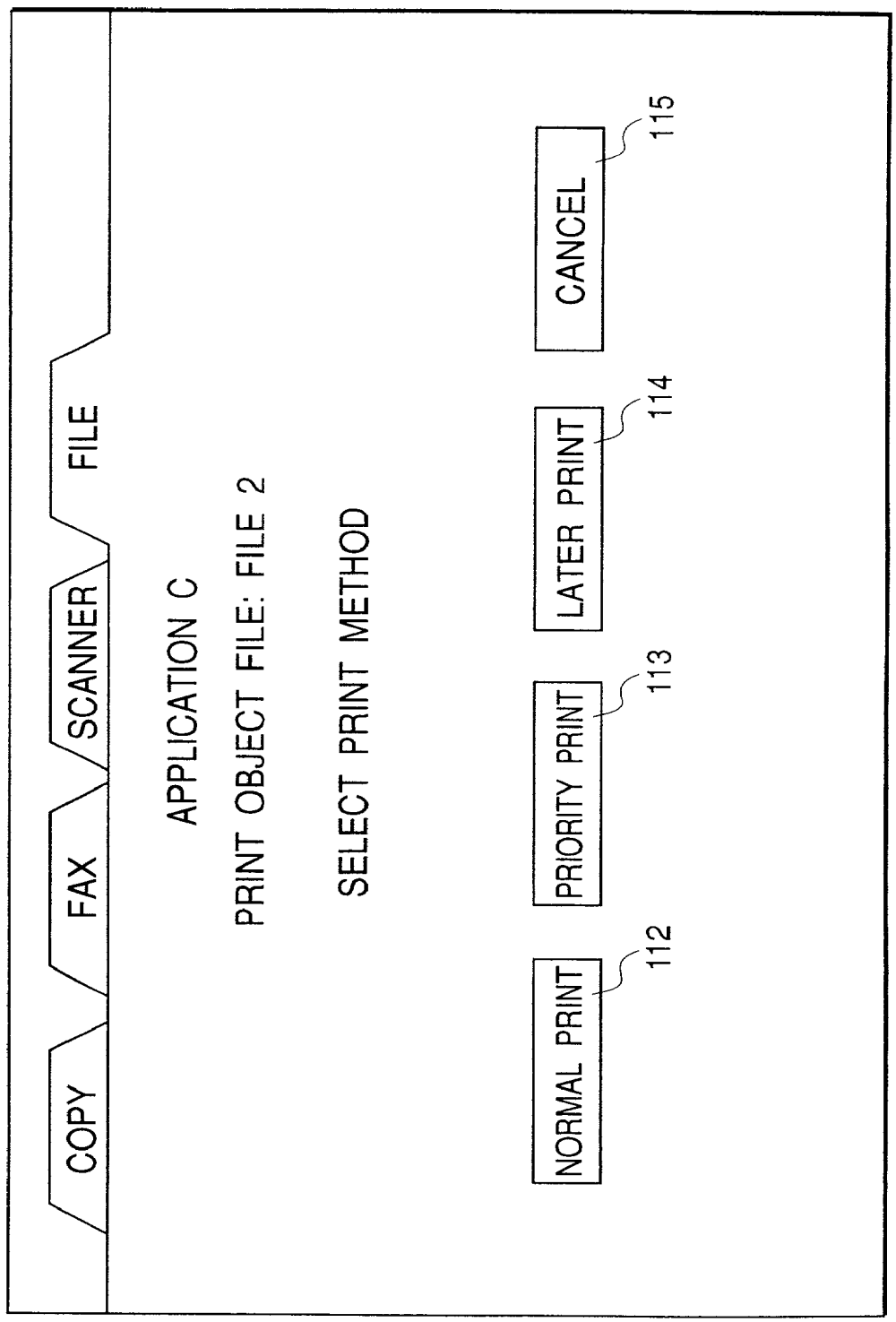

FIG. 85 shows a touch panel image for selecting the printing method. The user can designate the printing method by toucing a normal print button 112, a priority print button 113 or a later print button 114.

Figure 86:
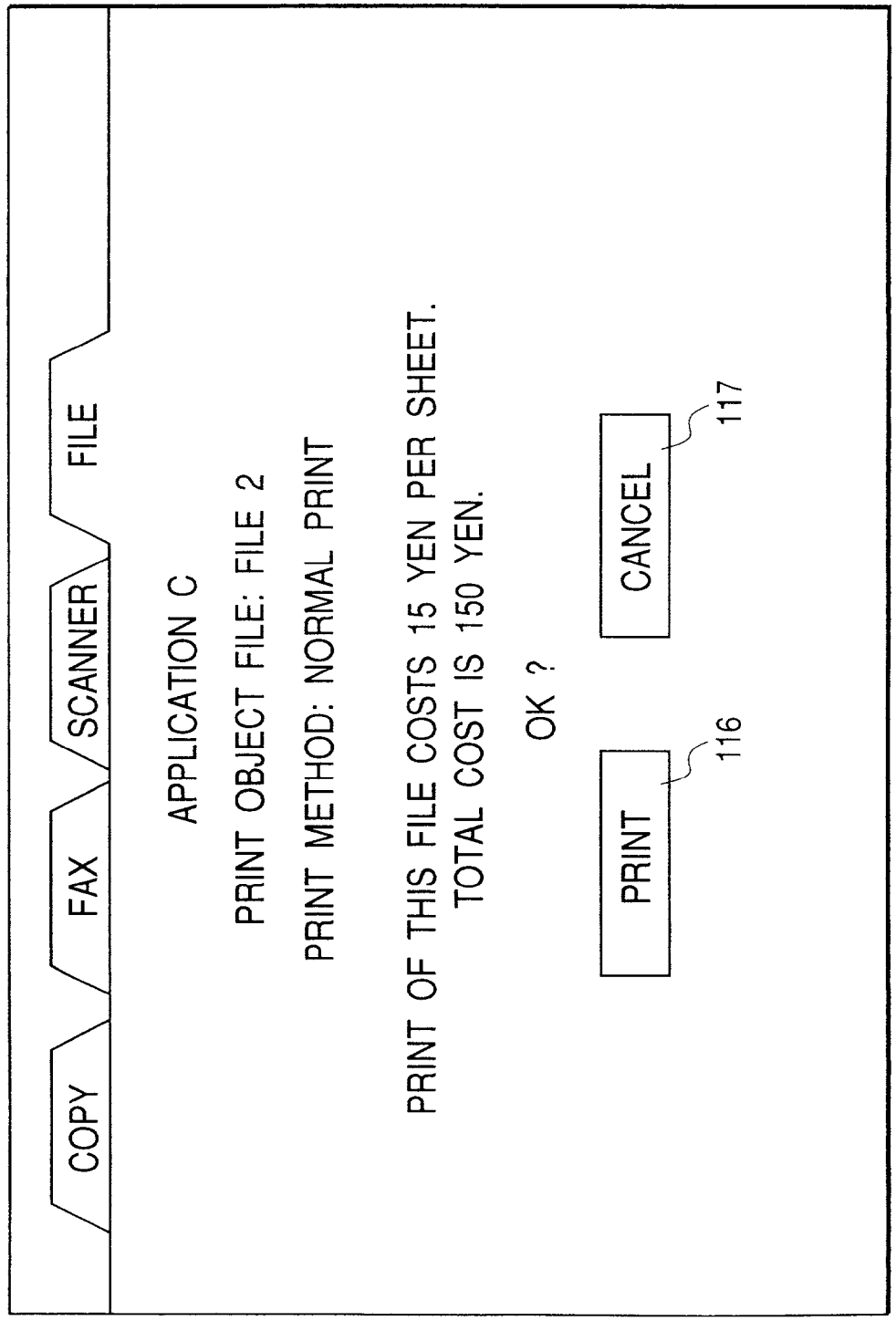

If the user for example touches the normal print button 112, the display is shifted to a state shown in FIG. 86.

The display shown in FIG. 86 is used for instructing the printing of the file prepared with the application C, and shows a UI for causing the user to confirm that the used application is "application C", that the file processed by the application C is "file 2" and that the "normal printing" is designated for printing the result obtained by processing the file 2 with the application C. There are also displayed the unit fee and the total charge of the print process. If satisfied with these displays, the user touches a print button 116, whereby the printing process is executed. If the user wishes to interrupt the printing process, the user touches a cancel button 117.

In the present embodiment, as explained in the foregoing, in case a file is prepared using an application, the fee for the use of such application is calculated according to the result (product) of the output process for such file and the output method of such output process. Therefore, the user can pay a reasonable fee according to the obtained product and the output method.

[Nineth Embodiment]

In the following there will be explained an embodiment in which, in case a file prepared with applications is outputted, the application use fee is variable according to the cumulative amount of the products obtained by such output process, in the configurations of the foregoing embodiments.

Now reference is made to FIG. 87 for explaining the charge table to be employed in the present embodiment and representing the application use fees, including the output process costs and the application costs. However, the output process costs may be excluded. In FIG. 87, for the "normal print" not using the application, the use fee is not set for each total print number, but such setting may also be made. Also in FIG. 87, the printing process alone is explained as the output process for the file prepared with the application, but the FAX transmission, e-mail transmission or OCR process may also be processed in a similar manner.

In the example shown in FIG. 87, the application use fee for the "normal print" is 8 Yen per sheet. Also the application use fee for printing the file prepared with the application A is 30 Yen per sheet in case the print number is 1 to 1000 sheets, and 15 Yen per sheet in case the print number is 1001 to 2000 sheets. Thus, the application use fee varies according to the cumulative print number for each application. Consequently the application use fee is 30 Yen for the first sheet but becomes 15 Yen for the 1001st sheet. For example, in case of printing a file prepared with the application A for 10 sheets, and if 998 sheets are already printed, the application use fee is 30 Yen per sheet for the first two sheets (total print number 1 to 1000) and 15 Yen per sheetg for the remaining eight sheets (total print number 1001 to 2000), and becomes 180 Yen in total.

The application A can be, for example, the Microsoft Word (registered trade name).

FIG. 88 shows an application use log held in the MFP 3 to be used in the present embodiment and storing the relationship between the total print number and the print number for each application type. This application use log records the information within a predetermined period 8 for example one month), and is erased when the charging process is executed after the lapse of the predetermined period, but the cumulative result of print for each application is retained without erasure.

The application use log in FIG. 88 includes the "normal print" without the use of the application, but such normal print may be excluded. Also the total print number is recorded for the "normal print", but such total print number may also be recorded.

The example shown in FIG. 88 indicates that the print number is 3501 sheets for the "normal print" and, for the printing of the file prepared with the application A, the print number is 21 sheets in the total print number range of 1 to 1000 and 435 sheets in the total print number range of 1001 to 2000.

Figure 89:
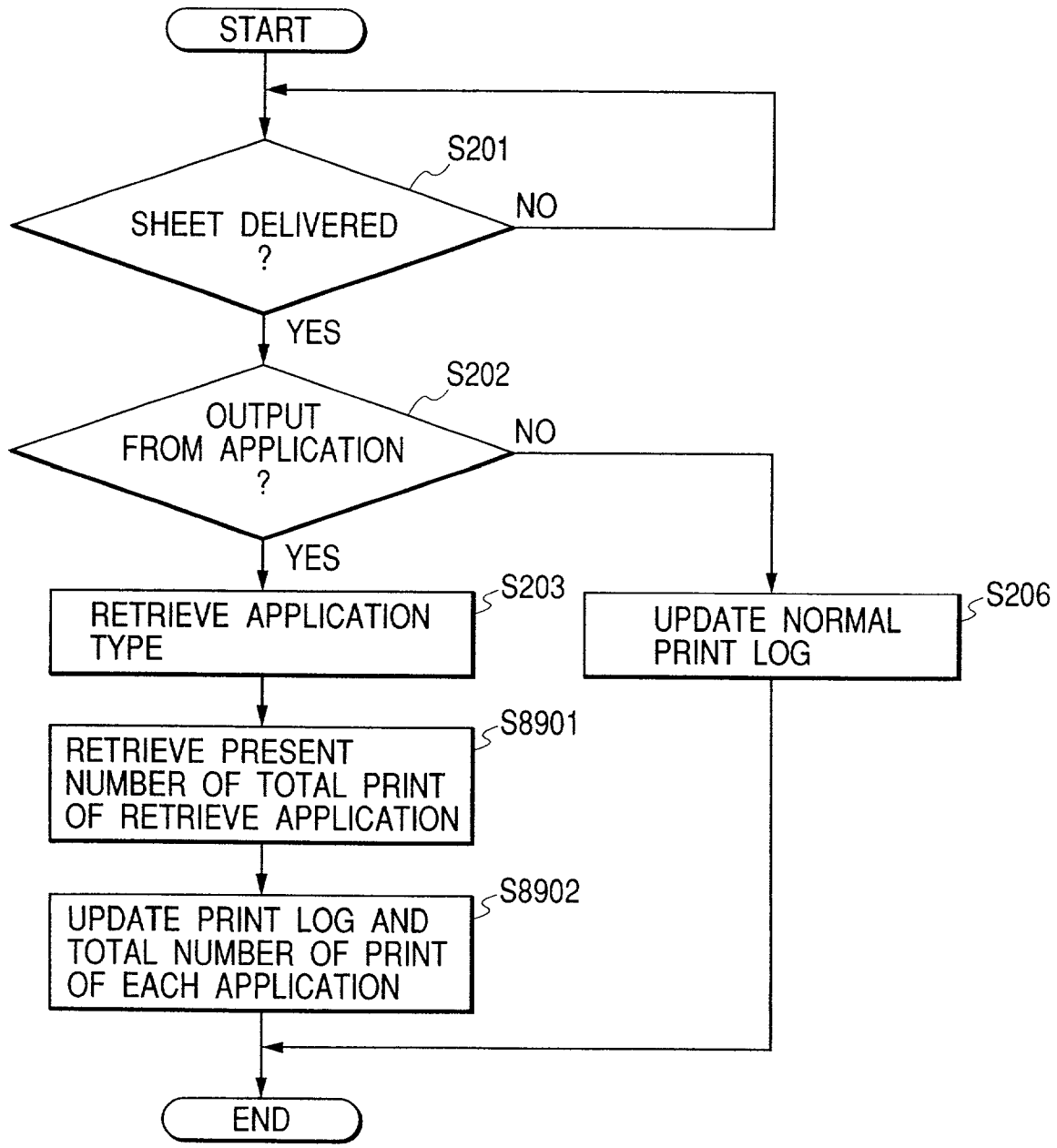
FIG. 89 is a flow chart showing an operation for renewing the application use log to be used in the application charging system of the present invention.

In the following there will be explained a renewing operation for the application use log by the MFP 3 in the system of the present embodiment, with reference to a flow chart in FIG. 89. In FIG. 89, the operations are same as in FIG. 6 in steps of numbers same as those in FIG. 6, so that such same steps will be omitted from the following description.

In a step S8901, the MFP 3 obtains, from the application use log, the cumulative print number of the application obtained in the step S203.

In a step S8902, the MFP 3 renews the application use log based on the information obtained in the steps S203 and S8901.

Figure 83:
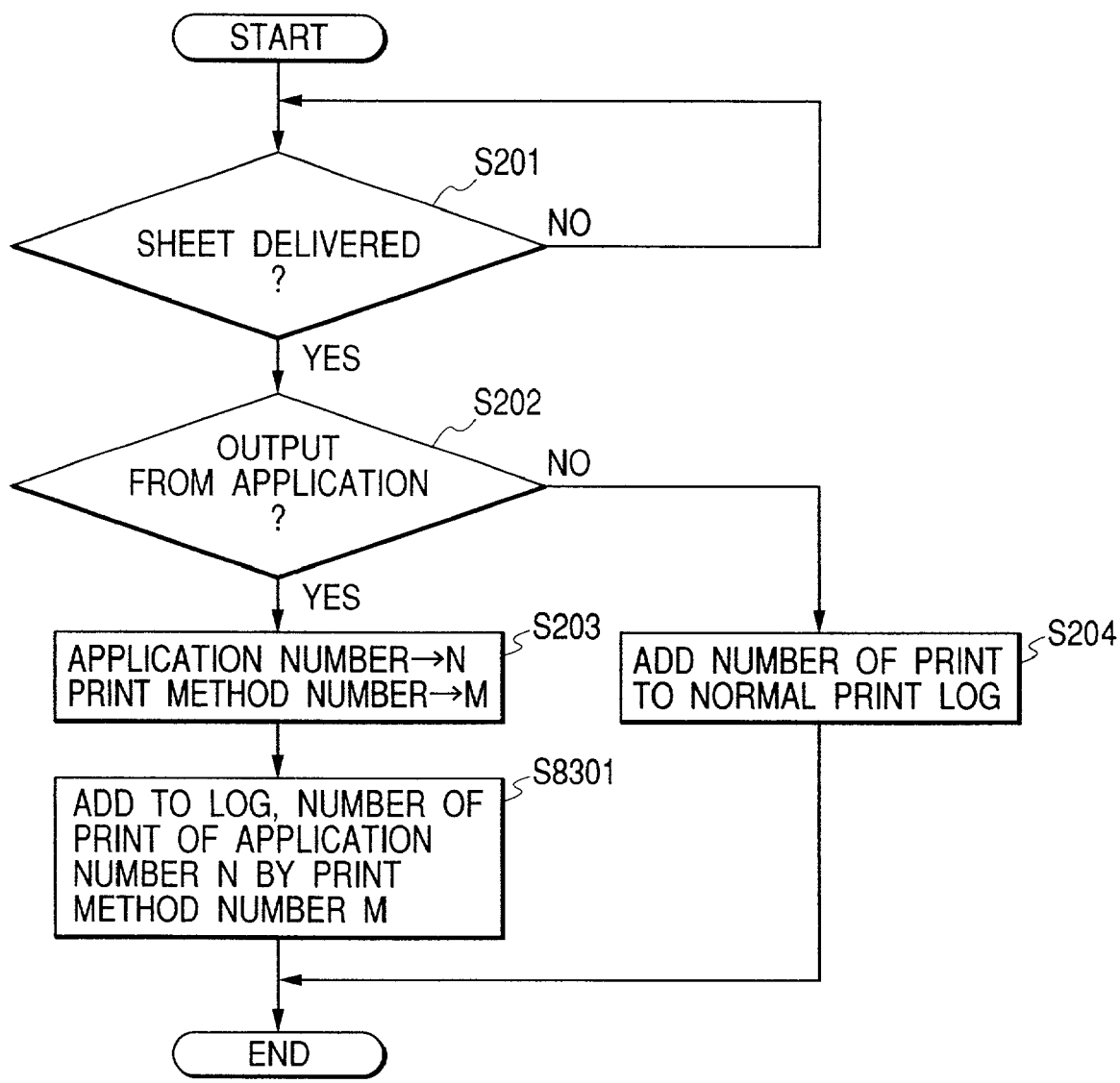
FIG. 83 is a flow chart showing an operation for renewing the application use log to be used in the application charging system of the present invention.

For example if the total print number obtained in the step S8901 is 995 sheets and if the currently instructed print number is 20 sheets, "5" sheets are added to the total print number 1 to 1000 and "15" sheets are added to the total print number 1001 to 2000 in the application use log in FIG. 83.

The charge table to be employed in the system of the present embodiment may assume a form as shown in FIG. 90. In FIG. 90, in case of printing the file prepared with the application A, the application use fee per sheet is 22 Yen in a print number range of 1 to 1000, 7 Yen in a print number range of 1001 to 2000, and 0 Yen exceeding XXXX sheets (arbitrary number). For example, in case of printing the file prepared with the application A for 100 sheets, there will be required 2200 Yen if the total print number is 0. However, if the cumulative print number is 960 sheets, the fee per sheet is 22 Yen for 40 sheets and 7 Yen for the remaining 60 sheets, so that 1300 Yen is required in total.

The present embodiment has been explained by a system in which the application is provided from the application server, but the present embodiment is applicable also to a system in which the application is provided for example from a CD-ROM as in the seventh embodiment.

In the present embodiment, as explained in the foregoing, in case a file is prepared using an application, the fee for the use of such application is calculated according to the result (product) of the output process for such file and the cumulative output amount already subjected to the output process. Therefore, the user can pay a reasonable fee according to the obtained product and the output amount.

What is claimed is:

1. A print apparatus for holding an application program provided from an application service provider apparatus, comprising:

downloading means for downloading the application program to a user terminal apparatus;

receiving means for receiving, from said user terminal apparatus, a file produced when said user terminal apparatus executes the application program, and a print request of the produced file;

discriminating means for discriminating a type of the application program used to produce the file;

print processing means for executing print processing of the received file;

recording means for recording, in a log, a print amount caused by the print processing, in correspondence with the type of the application program;

calculating means for calculating a charge on the basis of a cost for use of the log and a cost for use of the application program; and notifying means for notifying an accounting management server of the calculated charge, wherein said accounting management server effects processing for sending money to said application service provider apparatus, on the basis of the calculated charge.

2. An apparatus according to claim 1, wherein said receiving means receives a user ID for uniquely identifying said user terminal apparatus, wherein said recording means records the print amount in correspondence with the user ID, and wherein said calculating means calculates the charge for every user ID.

3. An apparatus according to claim 1, further comprising erasing means for erasing the log when said accounting management server completes the accounting processing.

4. An apparatus according to claim 1, wherein said downloading means downloads a plurality of application programs to said user terminal apparatus, wherein said receiving means receives a file produced when said user terminal apparatus executes the plurality of application programs, and wherein said calculating means calculates the charge on the basis of the cost for use of the log and the cost for use of each of combinations of the plurality of application programs.

5. A control method for a print apparatus for holding an application program provided from an application service provider apparatus, comprising:

a downloading step of downloading the application program to a user terminal apparatus;

a receiving step of receiving, from said user terminal apparatus, a file produced when said user terminal apparatus executes the application program, and a print request of the produced file;

a discriminating step of discriminating a type of the application program used to produce the file;

a print processing step of executing print processing of the received file;

a recording step of recording, in a log, a print amount caused by the print processing, in correspondence with the type of the application program;

a calculating step of calculating a charge on the basis of a cost for use of the log and a cost for use of the application program; and a notifying step of notifying art accounting management server of the calculated charge, wherein said accounting management server effects processing for sending money to said application service provider apparatus, on the basis of the calculated charge.

6. A computer-readable storage medium on which is stored a computer-executable program for causing a computer to execute a control method for a print apparatus for holding an application program provided from a application service provider apparatus, said control method comprising:

a downloading step of downloading the application program to a user terminal apparatus;

a receiving step of receiving, from said user terminal apparatus, a file produced when said user terminal apparatus executes the application program, and a print request of the produced file;

a discriminating step of discriminating a type of the application program used to produce the file;

a print processing step of executing print processing of the received file;

a recording step of recording, in a log, a print amount caused by the print processing, in correspondence with the type of the application program;

a calculating step of calculating a charge on the basis of a cost for use of the log and a cost for use of the application program; and a notifying step of notifying an accounting management server of the calculated charge, wherein said accounting management server effects processing for sending money to said application service provider apparatus, on the basis of the calculated charge.

* * * * *

UNITED STATES PATENT AND TRADEMARK OFFICE
CERTIFICATE OF CORRECTION

| | | |
|---|---|---|
| PATENT NO. | : 7,154,616 B2 | |
| APPLICATION NO. | : 09/840157 | |
| DATED | : December 26, 2006 | |
| INVENTOR(S) | : Watanabe et al. | |

It is certified that error appears in the above-identified patent and that said Letters Patent is hereby corrected as shown below:

IN THE DRAWINGS:
SHEET 10:
FIG. 11, in block 33, "PRINT DRIVVER" should read -- PRINT DRIVER --.

COLUMN 2:
Line 62, "ve" should read -- be --.

COLUMN 5:
Line 8, "shape" should read -- shape, --;
Line 9, "etc." should read -- etc., --;
Line 28, "applicational," should read -- application --;
Line 40, "standalone" should read -- stand-alone --; and
Line 53, "in" should read -- in the --.

COLUMN 7:
Line 7, "sheets" should read -- sheets, --; and
Line 10, "erared" should read -- erased --.

COLUMN 8:
Line 24, "apparatus" should read -- apparatus, --; and
Line 44, "MFP 3" should read -- MFP 3, --.

COLUMN 9:
Line 26, "where by" should read -- whereby --; and
Line 51, "listg" should read -- list --.

COLUMN 10:
Line 48, "process" should read -- processes --;
Line 58, "strage" should read -- stage --; and
Line 59, "process" should read -- processes --.

COLUMN 11:
Line 30, "whihc" should read -- which --; and
Line 31, "which" should read -- which the --.

COLUMN 12:
Line 31, "acumulated" should read -- accumulated --;
Line 35, "inn" should read -- in --; and
Line 61, "tht" should read -- the --.

UNITED STATES PATENT AND TRADEMARK OFFICE
CERTIFICATE OF CORRECTION

PATENT NO. : 7,154,616 B2
APPLICATION NO. : 09/840157
DATED : December 26, 2006
INVENTOR(S) : Watanabe et al.

It is certified that error appears in the above-identified patent and that said Letters Patent is hereby corrected as shown below:

COLUMN 13:
Line 1, "in" should read -- in an --;
Line 38, "ID"" should read -- ID" field --; and
Line 56, "e-mail" should read -- e-mail, --.

COLUMN 14:
Line 35, "numbers" should read -- numbers the --; and
Line 38, "chart" should read -- chart of --;

COLUMN 15:
Line 47, "same also" should read -- also the same --;
Line 61, "request" should read -- requests --; and
Line 63, "retriving," should read -- retrieving, --.

COLUMN 16:
Line 1, "request" should read -- requests --;
Line 13, "request" should read -- requests --; and
Line 57, "at" should read -- At --.

COLUMN 18:
Line 4, "sheet" should read -- sheet, --.

COLUMN 19:
Line 2, "or outside server and "outside domain"" should read -- or "outside server and outside domain" --;
Line 40, "thereof" should read -- thereof, --; and
Line 66, "necessarily" should read -- necessarily be --.

COLUMN 20:
Line 2, "as" should read -- as a --.

COLUMN 21:
Line 4, "anc" should read -- and --; and
Line 40, "in" should read -- in a --.

COLUMN 22:
Line 56, "in" should read -- in an --; and
Line 58, "shows" should read -- show --.

UNITED STATES PATENT AND TRADEMARK OFFICE
CERTIFICATE OF CORRECTION

PATENT NO. : 7,154,616 B2
APPLICATION NO. : 09/840157
DATED : December 26, 2006
INVENTOR(S) : Watanabe et al.

It is certified that error appears in the above-identified patent and that said Letters Patent is hereby corrected as shown below:

COLUMN 23:
Line 65, "contentration" should read -- concentration --.

COLUMN 24:
Line 28, "numbers" should read -- numbers the --; and
Line 37, "in" (second occurrence) should be deleted.

COLUMN 25:
Line 17, "the" (first occurrence) should be deleted;
Line 27, "occupany" should read -- occupancy --;
Line 31, "is" should read -- is the --;
Line 57, "recording the" should read -- the recording --; and
Line 67, "i" should read -- in --.

COLUMN 26:
Line 3, "applicatiion" should read -- application --.

COLUMN 27:
Line 21, "normal" should read -- "normal --.

COLUMN 28:
Line 1, "numbers" should read -- numbers the --;
Line 5, "be" should read -- be the --;
Line 8, "request" should read -- requests --;
Line 12, "authentification" should read -- authentication --;
Line 13, "authentification," should read -- authentication, --;
Line 22, "authentification" should read -- authentication --;
Line 37, "are" should read -- are the --; and
Line 37, "numbers" should read -- numbers the --.

COLUMN 29:
Line 8, "providere" should read -- provider --;
Line 26, "also" should read -- also be --; and
Line 44, "printing" (second occurrence) should read -- printing", --.

COLUMN 30:
Line 6, "are" should read -- are the --;
Line 6, "numbers" should read -- numbers the --; and
Line 57, "[Nineth" should read -- [Ninth --.

UNITED STATES PATENT AND TRADEMARK OFFICE
CERTIFICATE OF CORRECTION

PATENT NO. : 7,154,616 B2
APPLICATION NO. : 09/840157
DATED : December 26, 2006
INVENTOR(S) : Watanabe et al.

It is certified that error appears in the above-identified patent and that said Letters Patent is hereby corrected as shown below:

COLUMN 31:
Line 19, "sheetg" should read -- sheet --;
Line 28, "8 for" should read -- (for --;
Line 47, "are" should read -- are the --; and
Line 48, "numbers" should read -- numbers the --.

COLUMN 33:
Line 15, "art" should read -- an --; and
Line 24, "a" should read -- an --.

Signed and Sealed this

Eleventh Day of March, 2008

JON W. DUDAS
*Director of the United States Patent and Trademark Office*